United States Patent
Barker et al.

(10) Patent No.: US 11,734,496 B2
(45) Date of Patent: Aug. 22, 2023

(54) SYSTEMS AND METHODS FOR GENERATING WEBPAGE DATA FOR RENDERING A DESIGN

(71) Applicant: Canva Pty Ltd, Surry Hills (AU)

(72) Inventors: Nicholas Anthony Barker, Christchurch (NZ); Camellia Wong, Sydney (AU); Benjamin James Morris, Sydney (AU); David Nicholas Copley, Sydney (AU)

(73) Assignee: CANVA PTY LTD, Surry Hills (AU)

( * ) Notice: Subject to any disclaimer, the term of this patent is extended or adjusted under 35 U.S.C. 154(b) by 0 days.

(21) Appl. No.: 17/985,221

(22) Filed: Nov. 11, 2022

(65) Prior Publication Data
US 2023/0153516 A1 May 18, 2023

(30) Foreign Application Priority Data
Nov. 16, 2021 (AU) .............................. 2021903677

(51) Int. Cl.
*G06F 40/10* (2020.01)
*G06F 40/14* (2020.01)
*G06F 40/177* (2020.01)

(52) U.S. Cl.
CPC ............ *G06F 40/14* (2020.01); *G06F 40/177* (2020.01)

(58) Field of Classification Search
None
See application file for complete search history.

(56) References Cited

U.S. PATENT DOCUMENTS

| 8,751,924 | B2 * | 6/2014 | Carper | G06F 40/177 |
| | | | | 715/234 |
| 10,042,935 | B1 * | 8/2018 | Perkins | G06F 16/532 |
| 10,726,081 | B2 * | 7/2020 | Perkins | G06F 16/50 |
| 10,789,413 | B2 * | 9/2020 | Lenzner | G06F 3/04847 |

(Continued)

FOREIGN PATENT DOCUMENTS

| CN | 113536179 A | 10/2021 |
| EP | 1612655 A2 | 1/2006 |

OTHER PUBLICATIONS

"CSS Grid Layout Module", [retrieved from internet on Jul. 28, 2022], URL: https://web.archive.org/web/20190805004821/https://www.w3schools.com/css/css_grid.asp published on Aug. 5, 2019 as per Wayback Machine.

(Continued)

*Primary Examiner* — Maikhanh Nguyen
(74) *Attorney, Agent, or Firm* — GrowIP Law Group LLC

(57) ABSTRACT

Described herein is a computer implemented method for generating webpage data. The method includes processing a set of design element objects to generate a set of element-grid records, each record corresponding to a design element and including a unique column start, a unique column end, a column start offset and a column end offset. The set of element-grid records is processed to generate a webpage grid definition that defines a grid including a plurality of columns and a plurality of rows. A first design element and a second design element have a same horizontal start position and the webpage grid definition defines: a unique column start gridline for the first design element; a unique column start gridline for the second design element; and a zero-width first column between the first and second column gridlines.

19 Claims, 24 Drawing Sheets

(56) References Cited

U.S. PATENT DOCUMENTS

| | | | |
|---|---|---|---|
| 10,802,680 B2* | 10/2020 | Edmunds | G06F 40/103 |
| 2014/0372874 A1* | 12/2014 | Marseille | G06F 40/174 |
| | | | 715/243 |
| 2017/0091152 A1 | 3/2017 | Antipa et al. | |
| 2017/0102927 A1* | 4/2017 | Gunther, Jr. | G06F 8/38 |
| 2018/0210864 A1* | 7/2018 | Zhang | G06F 40/30 |
| 2020/0125631 A1 | 4/2020 | Seel et al. | |
| 2020/0372206 A1 | 11/2020 | Fialkow et al. | |

OTHER PUBLICATIONS

International-type search for provisional patent application, AU patent application No. 2021903677, dated Aug. 5, 2022.

Extended European Search Report for EP 22207307 dated Apr. 6, 2023 (Entire Document, pp. 1-11).

Hampton-Smith Sam: "CSS Grid Layout" In: "Pro CSS3 Layout Techniques", Apr. 27, 2016 (Apr. 27, 2016), Apress, Berkeley, CA, XP093036154, ISBN: 978-1-4302-6503-0, pp. 1-183, DOI: 10.1007/978-1-4302-6503-0, http://link.springer.com/content/pdf/10.1007/978-1-4302-6503-0.pdf.

House Chris: "A Complete Guide to Grid", CSS-Tricks, Nov. 9, 2021 (Nov. 9, 2021), pp. 1-41, XP093036173, http://web.archive.org/web/20211115021945/https://css-tricks.com/snippets/css/complete-guide-grid.

Morris Benjamin: "CSS: Absolutely positioning things relatively", Canva Engineering Blog, May 22, 2022 (May 22, 2022), pp. 1-13, XP093036152, https://canvatechblog.com/css-absolutely-positioning-things-relatively-964898de886b.

* cited by examiner

SYSTEMS AND METHODS FOR GENERATING WEBPAGE DATA FOR RENDERING A DESIGN

CROSS-REFERENCE TO RELATED APPLICATION

This application is a U.S. Non-Provisional Application that claims priority to Australian Patent Application No. 2021903677, filed Nov. 16, 2021, which is hereby incorporated by reference in its entirety.

TECHNICAL FIELD

Certain aspects of the present disclosure are directed to systems and methods for generating webpage data for rendering a design.

BACKGROUND

Various computer applications for creating, editing and publishing graphic designs exist. Generally speaking, such applications allow users to create a design by, for example, creating a page and adding design elements to that page.

Once a design has been created, an application will typically provide mechanisms by which a user can publish the design—e.g. by printing the design, publishing as a web page, publishing on a social media site, or publishing in an alternative way.

In some cases, a user may wish to publish a design with the same resolution the design was created with. For example, a user may create a design on an 800×600 canvas with the intention of publishing the design to an 800×600 display screen or window. In this case publishing the design is relatively straight forward in the sense that no changes to the design are required.

In other cases, however, a user may create a design on a canvas that has a particular size (e.g. 800×600) but may wish for the published design to be displayed at one or more alternative resolutions. As an example, the design may be intended for publication as a webpage and the designer may want to provide different versions of the design to be displayed at different resolutions (depending on the device and/or web browser in question).

Background information described in this specification is background information known to the inventors. Reference to this information as background information is not an acknowledgment or suggestion that this background information is prior art or is common general knowledge to a person of ordinary skill in the art.

SUMMARY

Described herein are systems and methods for generating webpage data for rendering a design.

In one aspect, the present disclosure provides a computer implemented method for generating webpage data corresponding to a design, wherein the webpage data is generated based on a webpage grid definition and the method comprises: accessing a set of design element objects, each design element object corresponding to a design element of the design and including data allowing a horizontal start position, a horizontal end position, a vertical start position, and a vertical end position of that design element to be determined; processing the set of design element objects to generate a set of element-grid records, the set of element-grid records including an element-grid record corresponding to each design element, the element-grid record corresponding to a given design element including: element data identifying the given design element; a unique column start gridline for the given design element; a unique column end gridline for the given design element; a column start offset for the given design element; and a column end offset for the given design element; and processing the set of element-grid records to generate the webpage grid definition, the webpage grid definition defining a grid including a plurality of columns and a plurality of rows, and wherein: a first design element and a second design element have a same horizontal start position; and the webpage grid definition defines: a first column gridline as the unique column start gridline of the first design element; a second column gridline as the unique column start gridline of the second design element; and a first column between the first column gridline and the second column gridline, the first column having a column width of zero.

Also described herein are systems and methods for automatically grouping design elements.

Also described herein are systems and methods for automatically ordering design elements.

Also described herein are systems and methods for automatically reflowing a design.

Figure 1:
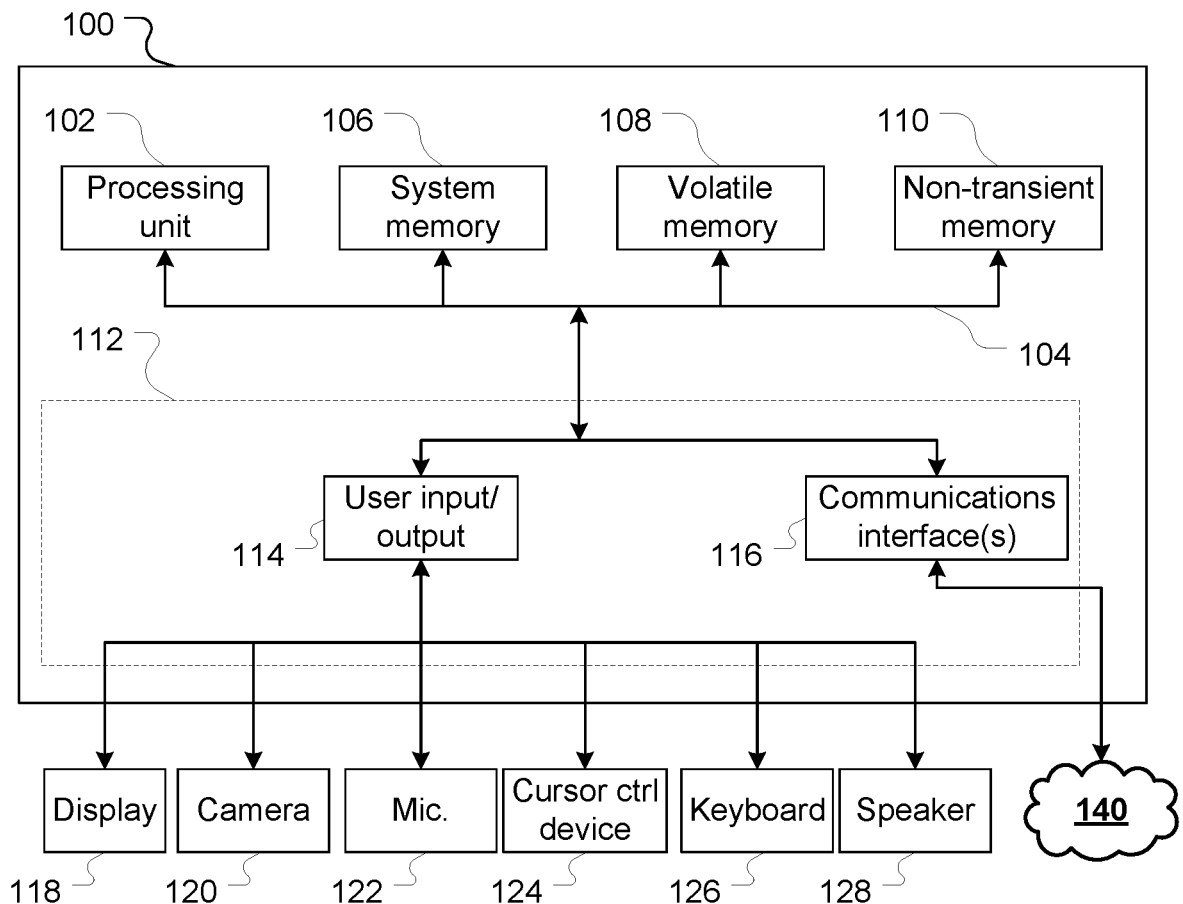
FIG. 1 is a block diagram of a computer processing system configurable to perform various features of the present disclosure.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present disclosure.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, computer applications for use in creating designs are known. Such applications will typically provide mechanisms for a user to create, edit, and publish designs. As also noted above, situations will often arise where a design is created on a canvas that has a particular resolution (or, at least, a particular width) but is to be finally displayed at alternative resolutions (or widths).

A common example of such designs are webpages. A designer creating a webpage will typically create the webpage design on a canvas that has a particular width. When the webpage is published, however, it may end up being displayed on differently sized screens. For example, a web browser running on a desktop computer screen may have a maximum width of 2560 pixels while a web browser running on a smart phone may have a maximum width of 750 pixels. To account for this, a designer may in fact explicitly create different versions of a webpage—for example a "mobile" version and a "desktop" version.

In order to account for this, the present disclosure describes systems and methods for automatically reflowing a design so it can be displayed at different resolutions.

In particular, the present disclosure describes systems and methods for generating a hierarchical design representation that provides both ordering and grouping of a design's elements. The hierarchical design representation (or, at least, the element ordering and grouping information it provides) may be used in any scenario where the semantic ordering of design elements and/or groupings of design elements is useful.

As one example, when creating or editing a design a user will often apply style and/or other format changes to elements. In many cases where a user applies a change to one element they may also wish to apply that change to additional elements. By automatically determining element groups an editor can either automatically apply certain changes made to one element of a group to the other elements of the group or suggest/provide a shortcut for making such changes to a user.

As another example, a user or application may be processing a document (such as a PDF document) in order to extract its text—e.g. in order to put that text into a new document or design. In this case automatically identifying a semantic (or reading) order of the PDF document's text blocks allows the text to be inserted into a new document in an order that should make sense.

The present disclosure also describes systems and methods for generating reflowed design data using a hierarchical design representation.

The present disclosure also describes systems and methods for generating webpage data that can be used by a web browser application (or any other application that can interpret and render webpage data) to render reflowed design data.

While the disclosure describes an end-to-end process for processing an original design's data and rendering a reflowed version of the design, it will be appreciated that the techniques described herein (or adaptations of those techniques) can be implemented and used independently. For example, the element ordering and grouping provided by the hierarchical design representation may be used for purposes other than generating reflowed design data. Similarly, reflowed design data may be used to render a design in alternative ways to the example provided.

Graphic Design Platform

The techniques described herein are performed by one or more computer processing systems. An example computer processing system 100 which is configurable to implement the embodiments and features described herein will be described with reference to FIG. 1.

System 100 is a general purpose computer processing system. It will be appreciated that FIG. 1 does not illustrate all functional or physical components of a computer processing system. For example, no power supply or power supply interface has been depicted, however system 100 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 100 includes at least one processing unit 102. The processing unit 102 may be a single computer processing device (e.g. a central processing unit, graphics processing unit, or other computational device), or may include a plurality of computer processing devices. In some instances, where a computer processing system 100 is described as performing an operation or function all processing required to perform that operation or function will be performed by processing unit 102. In other instances, processing required to perform that operation or function may also be performed by remote processing devices accessible to and useable by (either in a shared or dedicated manner) system 100.

Through a communications bus 104 the processing unit 102 is in data communication with a one or more machine readable storage (memory) devices which store computer readable instructions and/or data which are executed by the processing unit 102 to control operation of the processing system 100. In this example system 100 includes a system memory 106 (e.g. a BIOS), volatile memory 108 (e.g.

random access memory such as one or more DRAM modules), and non-transient memory 110 (e.g. one or more hard disk or solid state drives).

System 100 also includes one or more interfaces, indicated generally by 112, via which system 100 interfaces with various devices and/or networks. Generally speaking, other devices may be integral with system 100, or may be separate. Where a device is separate from system 100, connection between the device and system 100 may be via wired or wireless hardware and communication protocols, and may be a direct or an indirect (e.g. networked) connection.

Wired connection with other devices/networks may be by any appropriate standard or proprietary hardware and connectivity protocols. For example, system 100 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 100 may be configured for wireless connection with other devices/communications networks using one or more of: BlueTooth; WiFi; near field communications (NFC); Global System for Mobile Communications (GSM); and/or other wireless connections.

Generally speaking, and depending on the particular system in question, devices to which system 100 connects—whether by wired or wireless means—include one or more input devices to allow data to be input into/received by system 100 and one or more output device to allow data to be output by system 100. Example devices are described below, however it will be appreciated that not all computer processing systems will include all mentioned devices, and that additional and alternative devices to those mentioned may well be used.

For example, system 100 may include or connect to one or more input devices by which information/data is input into (received by) system 100. Such input devices may include keyboard, mouse, trackpad, microphone, accelerometer, proximity sensor, GPS, and/or other input devices. System 100 may also include or connect to one or more output devices controlled by system 100 to output information. Such output devices may include devices such as a display (e.g. a LCD, LED, touch screen, or other display device), speaker, vibration module, LEDs/other lights, and/or other output devices. System 100 may also include or connect to devices which may act as both input and output devices, for example memory devices (hard drives, solid state drives, disk drives, and/or other memory devices) which system 100 can read data from and/or write data to, and touch screen displays which can both display (output) data and receive touch signals (input).

By way of example, where system 100 is an end user computer it will typically include at least a display 118 and one or more input devices—e.g. a cursor control device 124 (such as a mouse, trackpad, or other device) and a keyboard 126. In contrast, where system 100 is a server computer it typically will not include a display/mouse/keyboard, though will be controllable over a network or other connection.

System 100 also includes one or more communications interfaces 116 for communication with one or more networks 140 (e.g. one or more local area networks, wide area networks, or public networks such as the Internet). Via the communications interface(s) 116, system 100 can communicate data to and receive data from networked systems and/or devices.

System 100 may be any suitable computer processing system, for example, a server computer system, a desktop computer, a laptop computer, a netbook computer, a tablet computing device, a mobile/smart phone, a personal digital assistant, or an alternative computer processing system.

System 100 stores or has access to computer applications (also referred to as software or applications)—e.g. computer readable instructions and data which, when executed by the processing unit 102, configure system 100 to receive, process, and output data. Instructions and data can be stored on non-transient machine readable medium such as 110 accessible to system 100. Instructions and data may be transmitted to/received by system 100 via a data signal in a transmission channel enabled (for example) by a wired or wireless network connection over an interface such as communications interface 116.

Typically, one application accessible to system 100 will be an operating system application. In addition, system 100 will store or have access to applications which, when executed by the processing unit 102, configure system 100 to perform various computer-implemented processing operations described herein. System 100 may also, or alternatively, be provided with specialised hardware that is configured to perform various computer-implemented operations described herein.

The embodiments of the present disclosure are performed by a computer processing system 100. It will be appreciated that various hardware and/or software configurations are possible.

Figure 2:
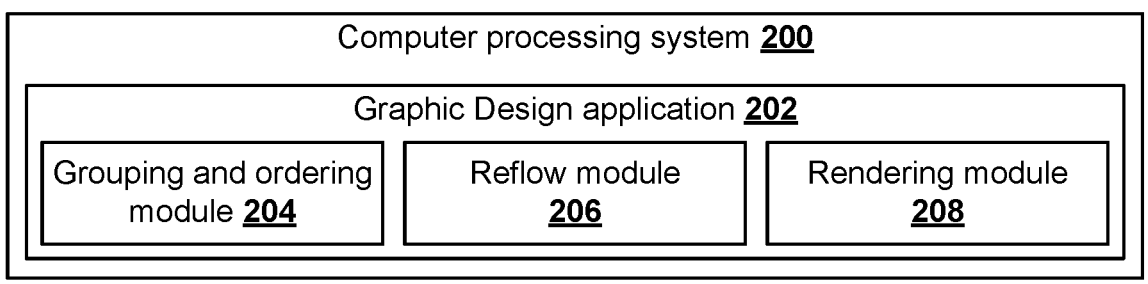
FIG. 2 is a block diagram depicting data processing modules of a computer processing system.

In order to illustrate the features of the disclosure, FIG. 2 provides a functional block diagram of an example computer processing system 200 on which a graphic design application 202 executes. Graphic design application 202 will also be referred to as application 202 for brevity. In this example, application 202 includes (or is otherwise able to invoke functionality provided by) an element grouping and ordering module 204 (also referred to as module 204 for brevity), a design reflow module 206 (also referred to as module 206 for brevity), and a rendering module 208 (also referred to as module 206 for brevity).

In this particular example, modules 204, 206, and 208 are software modules—i.e. computer readable instructions and data which are stored in memory (e.g. volatile memory 108) for execution by one or more processing units 102. One or more of modules 204, 206, and 208 may be an integral part of application 202—e.g. automatically installed on/available to system 100 as part of the application 202. Alternatively, one or more of modules 204, 206, and 208 may be provided as an optional plug-in or an add-on module to the application 202.

In alternative embodiments, modules 204, 206, and 208 may be stand-alone/independent software modules—e.g. stand-alone applications that are installed on system 100 as separate applications. In this case, application 202 may interact with/invoke the functionality of modules 204, 206, and/or 208 by appropriate API calls.

In still further alternative embodiments, one or more of modules 204, 206, and 208 may be (or include) hardware modules—i.e. specially configured hardware that is configured to perform some or all the operations described herein and can be accessed by application 202.

In still further alternative embodiments, one or more of modules 204, 206, and 208 may run on a (or multiple) separate computer processing systems. For example, modules 204, 206, and/or 208 may run on a server system (or different server systems) which is/are accessed by application 202 over network 140.

Example Graphical User Interface

Figure 3:
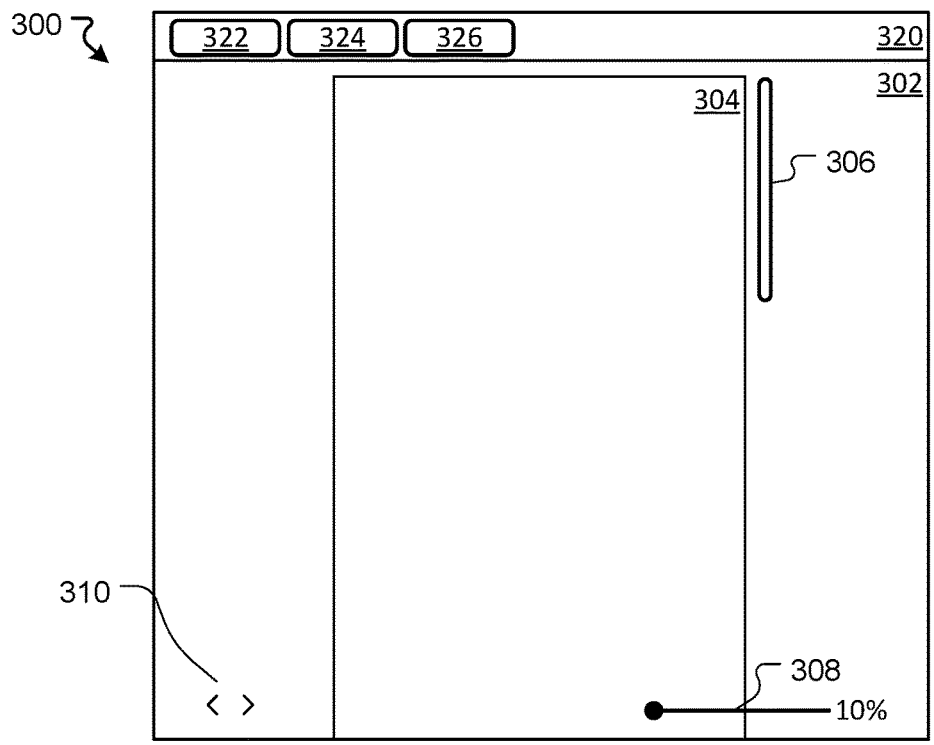
FIG. 3 depicts an example graphical user interface.

FIG. 3 provides an example of a graphical user interface (GUI) 300. GUI 300 is generated by application 202 and displayed on a display 118 of system 100.

In this example, GUI 300 includes a preview area 302 which displays a design canvas 304. Design canvas 304 is used to display a page of a design that a user is working on. Preview area 302 of the present example also includes a scroll bar 306 (allowing a user to scroll the canvas—in this example vertically) and a magnification control 306 (allowing a user to change the magnification level of the canvas 304). Preview area 302 of the present example also includes page navigation controls 310 (in this case a next page control and previous page control). Page navigation controls may be displayed where the design page displayed on canvas 304 is a single page of a multi-page design and, therefore, a next page or a previous page exists.

GUI 300 also includes a control region 320. In the present example, control region 320 includes a first control 322 (e.g. an 'automatically order and group design elements' control), a second control 324 (e.g. a 'reflow design' control), and a third control 326 (e.g. a 'generate webpage' control). These controls are described in further detail below.

A GUI 300 generated by application 202 may—and typically will—provide many more features to those illustrated. These features may include, for example, GUI controls and/or other objects for: creating new designs, editing designs (e.g. by adding and manipulating design elements), searching for and previewing design elements that may be used to create/edit designs, saving designs, sharing designs, publishing designs, and/or for performing other operations.

Design Data

The embodiments described herein relate to processing designs (or, more specifically, design data).

Design data may be stored in various formats. An example design data format that is used throughout this disclosure will now be described. Alternative design data formats (storing alternative design attributes) are, however, possible, and the processing described herein can be adapted for alternative formats.

In the present context, data in respect of a given design is stored in a design record. Generally speaking, a design record defines certain design-level attributes and includes page data. The page data includes (or references) one or more page records, each of which defines a page of the design. In turn, each page record may define one or more page-level attributes as well as element data for the page. The element data for a given page defines (or references) one or more element records which define design elements that have been added to the page In the present example, the format of each design record is a device independent format comprising a set of key-value pairs (e.g. a map or dictionary). To assist with understanding, an example partial of a design record format is as follows:

| Key/field | Note | E.g. |
|---|---|---|
| Design ID | A unique identifier of the Design. | "designId": "abc123", |
| Version | An identifier of a specific version of the design. | "version": "00001", |
| Creation date | The creation date of the document. | "creationDate": "1-jun-2040", |
| Creator ID | The identifier of a creator/owner of the design. (The ID will typically allow other user details to be retrieved, e.g. from a user database). | "userID": "UID00000001", |
| Dimensions | Dimensions (e.g. width and height) of the pages of the design. | "dimensions": {<br>  "width": 1080,<br>  "height": 1080<br>}, |
| Pages | An array of page records (described further below). | "pages": [<br>  {"elements": [{ ... }, { ... }, ..., { ... }]},<br>  {"elements": [{ ... }, { ... }, ..., { ... }]},<br>  ... ,<br>  {"elements": [{ ... }, { ... }, ..., { ... }]}<br>], |

In this example, the design-level attributes include a design identifier, version, creation date, creator ID, and default page dimensions.

A design record's page data is a set (in this example an array) of page records, each of which defines page data in respect of a page of the design. A page record's position in a design's page array serves to identify the page and also determines its position in the design (e.g. a page at array index n appears after a page at array index n−1 and before a page at array index n+1).

In this example, each page record includes element data in the form of a set (in this example an array) of element records. While not shown, a page record may also include additional page-level data, for example page dimensions (which, if present, override the design-level dimensions).

Each element in a page's element array is either an element record (defining a single element that has been added to the page in question) or a set of element records (e.g. a further element array which defines a group of elements—i.e. two or more elements that have been added to the page and grouped together). For example, a page with an element array as follows indicates the page has four elements (defined by element records A, B, C, and D) and that the elements defined by element records C and D have been grouped together.

"elements": [{A}, {B}, [{C}, {D}]]

In this example, an element record's position in a page's element array serves to identify that element and determines its depth (or z-index) on the page. For example, an element at array index n is positioned above an element at array index n−1 and below an element at array index n+1. Element depth may be alternatively handled, however, for example, by storing depth as an explicit element attribute.

Generally speaking, an element is an object that has been added to a page of a design—e.g. by copying/importing from one or more element libraries (e.g. libraries of images, animations, videos, etc.), drawing/creating using one or more design tools (e.g. a text tool, a line tool, a rectangle tool, an ellipse tool, a curve tool, a freehand tool, and/or other design tools), or otherwise being added to a design page.

The types of design elements available will depend on the system in question. By way of example, however, design element types such as the following may be provided: image elements (e.g. raster and/or vector graphic elements); video elements; audio elements; text elements; frame elements (e.g. vector graphic elements configured to receive other elements—such as graphics or videos); effects (e.g. an effect that applies to a page, such as a shower of confetti or other effect); and/or elements of other types.

The particular data (or attributes) associated with a design element that has been added to a page will depend on the type of element. For example, a video type element may include attributes such as start/end trim times and audio which may not be relevant to other element types. As a further example, most visual elements will include size and position data which define where on a page the element is displayed. Size and position data may not, however, be relevant to all elements—e.g. audio elements and/or effect elements that apply to the entire design.

By way of example, individual element records may take a format such as the following:

```
Element {
    // Spatial position/dimension data
        double originX;
        double originY;
        double width;
        double height;
        double rotation;
    // Common element properties
        double transparency;
        double link;
    // Element type
        ElementType elementType
    // Other properties that depend on the element
    type specific to the above 'ElementType'
    ....
}
```

In this example, an element's position is defined by x and y origin coordinates and its size is defined by width and height values. The particular coordinates used for the origin coordinates will depend on implementation. In the present examples, however, designs use a coordinate system in which the origin of a page (i.e. x=y, y=0) is at the top-left, x coordinates increase from left to right, and y coordinates increase from top to bottom. In this coordinate system, therefore, the x and y origin coordinates are the leftmost and topmost coordinates of the element respectively.

In this example, transparency (indicating an element's indicates transparency/opacity) and link (which can be used to associate a hyperlink with an element) are examples of common values that may be associated all or most element types.

In this example, the element type indicates the type of element that the record relates to. The types available will depend on implementation, but may include for example raster, vector graphic, text, video, audio, frame (e.g. vector graphic elements configured to receive other elements—such as graphics or videos), and/or other element types.

In addition, a given element record will define additional attributes that depend on the type of element. These will include one or more attributes that provide data (or a link/reference to data) in respect of the element's actual media—e.g. raster or vector graphic data for a graphic element, video data for a video element, audio data for an audio element, text data for a text element and so forth.

Alternative element record formats (storing alternative element data/attributes) are possible.

In the present disclosure, design elements are referred to as having bounding boxes. The bounding box for a design element defines the minimum rectangle which encloses that element and may, for example, be considered as a set of four coordinates: (min x, max x, min y, max y). With the example element data above, a given element's bounding box may be calculated as: min x=originX; max x=originX+width; min y=originY; max y=originY+height.

The storage location for design data (e.g. design records) will depend on implementation. For example, in a client-server implementation design data may be stored at a server system and retrieved by the application 202 from that server system as required. Alternatively, design data may be locally stored in non-transient memory of the same computer processing system that is processing the design data.

The operations described herein assume a page coordinate system with a horizontal x axis along which x coordinates increase from left to right and a vertical y axis along which y coordinates increase from top to bottom. In this coordinate system, therefore, the origin (x=0,y=0) is at the top left. The operations as described may, however, be adapted for alternative coordinate systems.

Example Design

In the present disclosure, processing is performed with respect to individual design pages. To this end, and unless stated otherwise, reference to a design herein is reference to a single page of a design. The techniques described herein may, however, be adapted to be applied to multi-page designs, for example by processing each page of a multi-page design separately.

Figure 4:
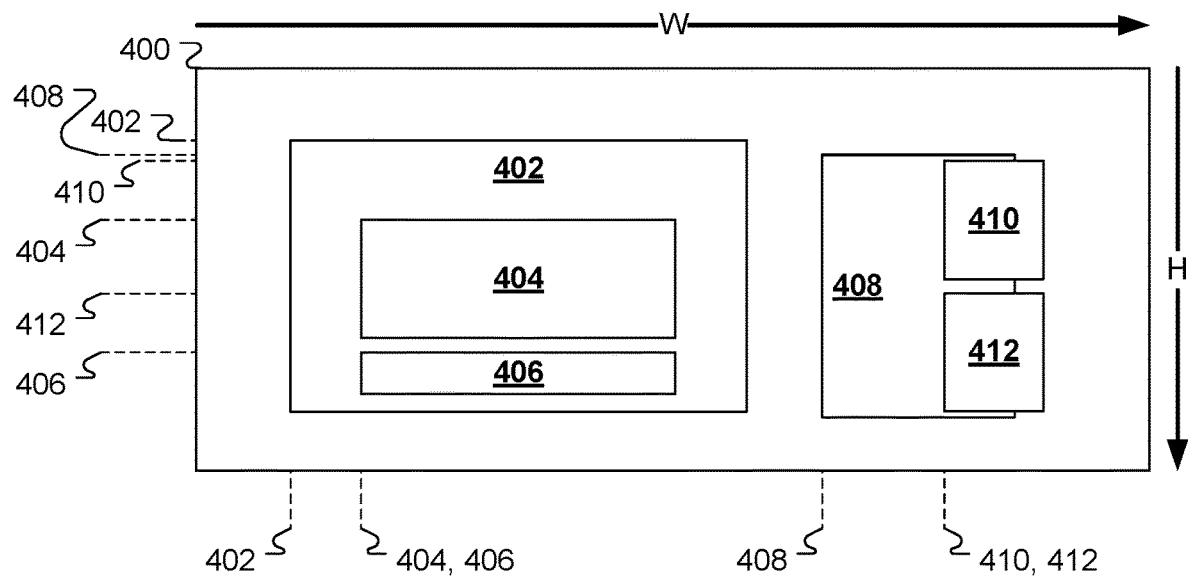
FIG. 4 depicts an example design.

To assist in understanding the present disclosure, FIG. 4 provides an example design 400 (i.e. a single page). Design 400 has overall dimensions (e.g. a width W and height H) and includes six design elements: 402, 404, 406, 408, 410, and 412. Elements 402-412 are depicted as rectangles in FIG. 4, and therefore may actually be element bounding boxes rather than the elements themselves, however they will be referred to as elements for ease of reference.

For descriptive purposes, FIG. 4 includes vertical dashed lines to depict the minimum x coordinate (i.e. left most in the present coordinate system—e.g. originX) of each element 402, and horizontal dashed lines to indicate the minimum y coordinate (i.e. upper most in the present coordinate system—e.g. originY) of each element 402-412.

Design Element Grouping and Ordering

Figure 5:
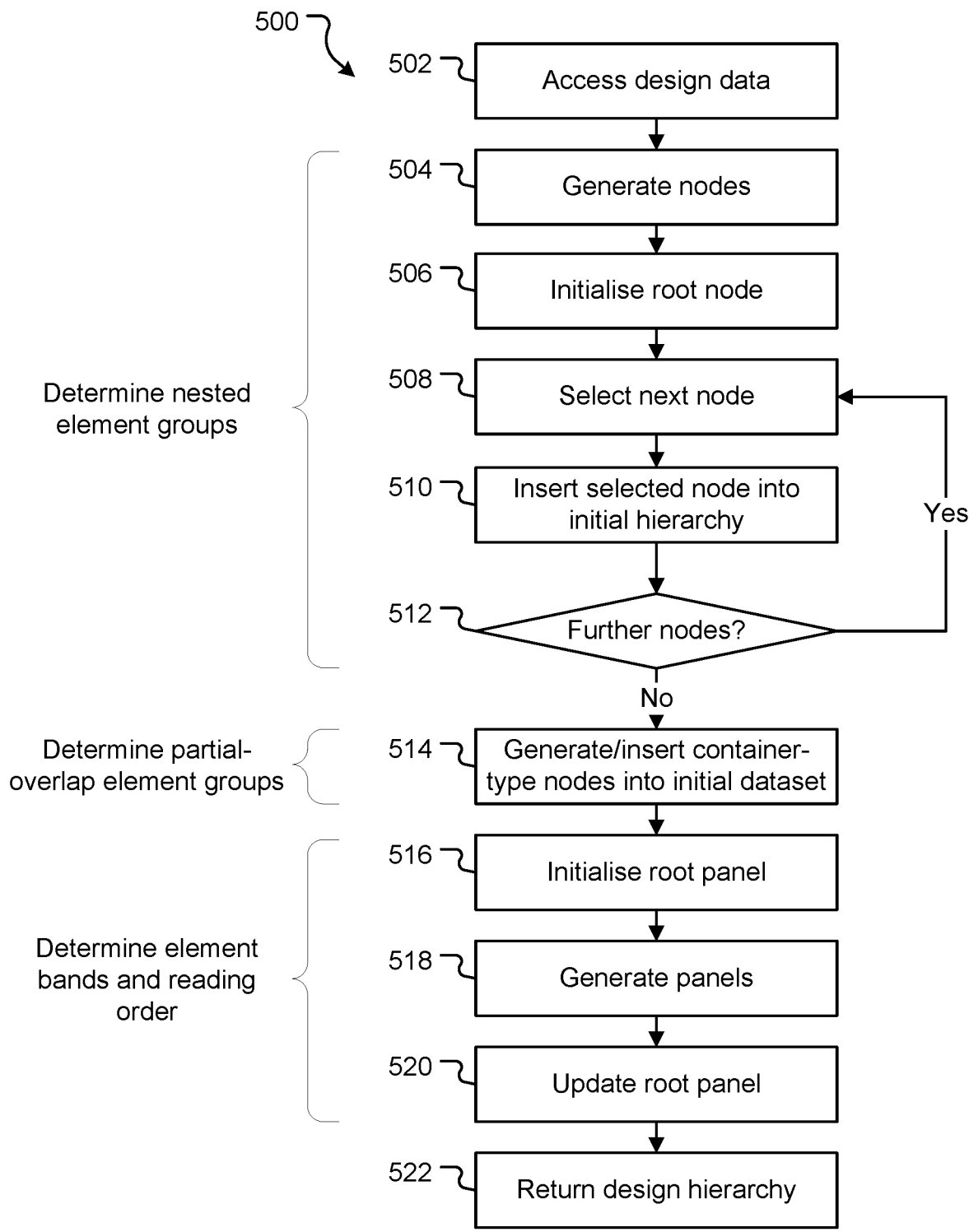
FIG. 5 is a flowchart depicting operations performed in processing a design to determine design element groups and a design element reading order.

Turning to FIG. 5, a method 500 for processing a design (or design data) to determine groups of design elements and an order of the design's elements will be described. In the present examples, method 500 processes a design's data to generate a corresponding hierarchical design representation—also referred to as a design hierarchy—from which element groups and element order can be determined. Accordingly, method 500 may be referred to as a method for generating a design hierarchy. The operations of method 500 will be described as being performed by the grouping and ordering module 204 (shortened to module 204 in this section for brevity).

Method 500 (or processing in accordance with method 500) may be triggered in various ways. Several examples are described below with reference to FIG. 21 (e.g. at 2106), FIG. 23 (e.g. at 2308), and FIG. 25 (e.g. at 2508). It will be appreciated, however, that method 500 may be triggered in various other ways, as a result direct user input and/or another application or process that calls (or itself implements) method 500 in order to determine design element groups and/or design element order.

Method 500 is performed in respect of input data that defines a particular design page—this will be referred to as design data. In the present example, the design data processed by method 500 includes page data and element data.

The page data defines the original dimensions of the page (or canvas) being processed—e.g. a width and a height value.

The element data defines the elements that have been added to the page being processed. In the present example, and as described above, a page's element data includes a set of design element records which, in turn, includes an element record for each element that has been added to the page. Each element record defines size and position data, though will typically describe additional element attributes/properties. In the example element records described above size and position are defined by originX, originY, width, and height values. Alternative element record formats (and/or element record data) are possible.

In the present embodiments, and as described further below, the design hierarchy that is generated over the course of method 500 is a tree-structured dataset that is made up of panels.

Each leaf panel in the design hierarchy corresponds to an element of the design and provides information on how that design element should be processed in any design reflowing.

Parent panels (i.e. internal panels that are associated with one or more child or subpanels) in the design hierarchy define bands of design elements—e.g. rows or columns of design elements. In particular, a given parent panel defines a band that includes the design elements defined by all panels that are descendants of that parent panel. A parent panel may also (though need not) define a design element (or, more precisely, define a node which defines a design element). This indicates that the elements of the band defined by that parent panel are positioned within the design element defined by the parent panel. Each parent panel also provides information on how its child panel(s) should be processed in any design reflowing.

Moreover, the set of panels of the design hierarchy also defines what will be referred to as the reading order of the design. The reading order reflects an order in which elements would be read by a viewer of the design. The embodiments described herein adopt a reading order consistent with written English language, that is left-to-right, top-to-bottom. The operations described may, however, be adapted for other reading orders—for example right-to-left, top-to-bottom (e.g. per Arabic, Hebrew, and other languages), top-to-bottom, right-to-left (e.g. per Japanese, Chinese, and other languages), or an alternative reading order (whether based on a particular language or not). In the present embodiments, the reading order is defined by a combination of the hierarchal (i.e. parent/child) relationships between panels, the order of each parent panel's subpanels, and the direction properties of the parent panels (which indicate whether a panel's children panels are ordered horizontally (e.g. left-to-right) or vertically (e.g. top-to-bottom)).

At 502, module 204 accesses the design data for the design being processed. The design data may be provided by the application or system that invokes method 500 or accessed from local or remote memory (based, for example, on a reference or link provided by the application or system invoking method 500).

By way of general overview: at 504 to 512 module 204 identifies nested element groups (which occur when one or more elements are positioned entirely within another element—e.g. elements 402, 404, and 406 of design 400) and records these in an initial hierarchy of nodes; at 514 module 204 identifies partial overlap element groups (which occur where one or more elements partially overlap one another—e.g. elements 408, 410, and 412 of design 400) and records these in the initial hierarchy of nodes; and at 516-518 module 204 identifies node bands (e.g. groups of design elements that define rows and columns) and a reading order of the design's elements and records these in a final hierarchy of panels (referred to as the hierarchical representation of the design).

At 504, module 204 processes the design data accessed at 502 to generate a flat (i.e. without any hierarchy) set of nodes. Specifically, a node is generated for each element defined by the design data.

In order to generate the nodes, module 204 processes each element (e.g. each element record) defined by the design data. Elements may be processed in any order, provided element depth (z-index) is not lost. For example, in the example page data described above, element records are stored in an element array and an element record's position on that array defines its depth or z-index on the design page. In this case, module 204 may process the element records in order—e.g. from array index 0 (the rear-most element on the page) to array index n (the foremost element on the page).

If the original data defines any element groups (referred to as original element groups), this grouping is ignored when generating nodes at 504, in the sense that a node is created for each element of an originally defined group. An exception to this is if the positions of elements that are members of original element groups are relatively defined with reference to a parent element rather than absolutely. In this case an absolute position for a grouped element is calculated when creating a node for that element. To illustrate, an original element group may define a parent element with an xOrigin of 10 and a child element (i.e. a member of the original group) with an xOrigin of 5. If the child element's position is relatively defined with reference to the parent this means its xOrigin is 5 from the parent's xOrigin, but its absolute xOrigin (when positioned on a page) is in fact x=15.

For each element, module 204 generates a corresponding node. Various node data structures are possible, however in the present embodiments the following node data structure is used:

```
Node {
    Element element;
    Box nodeBoundingBox;
    NodeType nodeType;
    List<Node> children;
    int zIndex;
}
```

For ease of reference, a node may be referred to as having an identifier (e.g. a nodeID). In most implementations any node identifier will be implicit and need not be explicitly defined.

In this example, a node may (though need not) define an element (via its element property). If populated, the element property defines an element of the design. In this case, the element property data is the element record for the element as described above. In alternative embodiments, the element property may take an alternative format that includes data that is from (or is based on) the element record of the element in question.

At 504, each node that is generated corresponds to a particular element and, therefore, includes the corresponding element as the node's element property.

A node's nodeBoundingBox property defines a bounding box for the node. In the present embodiments, the bounding box property takes the following format (though alternative formats defining alternative variables are possible):

```
Box {
    double originX;
    double originY;
    double width;
    double height;
    double rotation;
}
```

In this case, a node's bounding box is defined by x and y origin coordinates (which, in the example coordinate space used herein, are top and left coordinates); size data (width and height), and rotation. In the present implementation, node bounding boxes are generated/calculated to be the smallest 0-rotation box that fits around an element (regardless of whether the element itself is rotated or not). Accordingly, all bounding box rotation values are (in this implementation) zero. Each node generated at 504 corresponds to a single element. Where a node corresponds to a single element the node's bounding box data defines the bounding box for that single element (e.g. as described above).

In the present disclosure, reference to a node's position (e.g. originX and/or originY values) and/or size (e.g. width and/or height) are references the relevant properties of that node's bounding box.

In this example, a node's nodeType property is metadata to define a type of the node. In the present embodiments, a node may be a "container" node, a "canvas" node, or an "element" node (these node types described further below). At 504, each node being generated defines (via the element property) an element and therefore is an element element-type node.

In this example, a node's children property is a list of nodes which are children of the node in question (i.e. the parent node). This is described in further detail below. At 504, however, a flat list of nodes is generated and, therefore, the children property of each node is null (or an alternative defined value indicating no child nodes).

Where a node is an element-type node, the zIndex value indicates the depth of the node's element. When generating a node corresponding to a particular element record at 504, module 204 may set (or otherwise base) the node's zIndex value on the element record's array index. Where a node is a canvas- or container-type node, the zIndex is not relevant. In this case the zIndex is set to null or another defined value (e.g. −1).

In the present disclosure, where a node defines an element via the element property, the node and element may be referred to as corresponding. Similarly reference to a node's element is reference to the element defined by the node's element property. This should not be confused with reference to a node defining or being associated with children nodes (or children elements via those children nodes). Children nodes (and children elements) are defined via a node's children property.

At 506, module 204 initialises a root node for the initial hierarchy. The root node is the sole canvas-type node of the initial hierarchy, and is generated with the following properties:

| Property | Value (for root node) |
| --- | --- |
| element | Null or not defined |
| nodeBoundingBox | The page dimensions - e.g.<br>    originX = 0;<br>    originY = 0;<br>    width = ;<br>    height = ;<br>    rotation = 0; |
| nodeType | A value indicating the canvas node type (e.g. 'Canvas', 1, or any other defined value). |
| Children | No child nodes (i.e. an empty list). |
| zIndex | In this example −1. |

At 508 to 512, module 204 arranges the nodes into an initial hierarchy in which parent/child relationships indicate nested groups of design elements. In particular, for any given subtree of the initial hierarchy that includes a parent node and child nodes thereof, the child nodes are positioned entirely within the parent node parent node (or, more particularly, the child nodes' elements are positioned entirely within the parent node's element).

At 508, module 204 selects the next unprocessed node to be inserted into the initial hierarchy. The node is selected from the list of nodes generated at 504. Nodes may be selected and processed in any order.

At 510, module 204 calls an insert node process to insert the node selected at 508 into the initial hierarchy. The insert node process may be performed in accordance with method 600 described below with reference to FIG. 6. In the present embodiments, the insert node process called at 510 takes two nodes as input. When the insert node process is originally called at 510, the input nodes are the root node (as initialised at 506) and the node selected at 508 (which is to be inserted into the initial hierarchy).

At 512, once the node insertion process has returned, module 204 determines if there are any nodes that have not yet been inserted into the initial hierarchy. If so, processing returns to 508 to select the next node for insertion into the initial hierarchy.

If, at 512, all nodes have been inserted into the initial hierarchy, processing proceeds to 514.

At this point module 204 has identified nested element groups in the design and recorded those nested element groups via the parent-child relationships of the initial hierarchy. For example, an initial hierarchy may define: a root node is parent to nodes A and B (which define elements A and B respectively); node A is parent to nodes C and D (which define elements C and D respectively) and node D is parent to nodes E and F, and G (which define elements E and F and G respectively). This hierarchy would indicate that: all elements are positioned (nested) within the root node (which defines the entire design page); elements C, D, E, F, and G are nested within element A; and elements E, F, and G are nested within element D.

At 514, module 204 further processes the design elements (or, in this particular implementation, the element-nodes of the initial hierarchy which correspond to the design elements) to determine if any partial overlap groups exist and/or whether any scale-type elements exist. If so, module 204 creates container-type nodes and add them to the initial hierarchy. In the present embodiments, container-type nodes are used to indicate nodes or groups of nodes (and therefore the elements defined by those node(s)) that are to be uniformly scaled in any reflow process.

Processing at 514 may, for example, be performed in accordance with method 700 as described below with reference to FIG. 7.

Following the generation and insertion of container-type nodes at 514 (if any), generation of the initial hierarchy is complete. At this point module 204 has identified (and recorded by the hierarchy): nested element groups (per 508-512); partial overlap element groups (per 514); and scale-type design elements (per 514).

Before describing determination of element bands and a reading order (e.g. generation of the final hierarchy): an example method for determining nested design element groups and creating an initial hierarchy defining those groups will be described with reference to FIG. 6; an example method for identifying partial overlap element groups (and scale type elements) and adding these to the initial hierarchy will also be described with reference to FIG. 7; and an example initial hierarchy based on design 400 of FIG. 4 will be described with reference to FIG. 8.

Example Method for Determining Nested Element Groups

Figure 6:
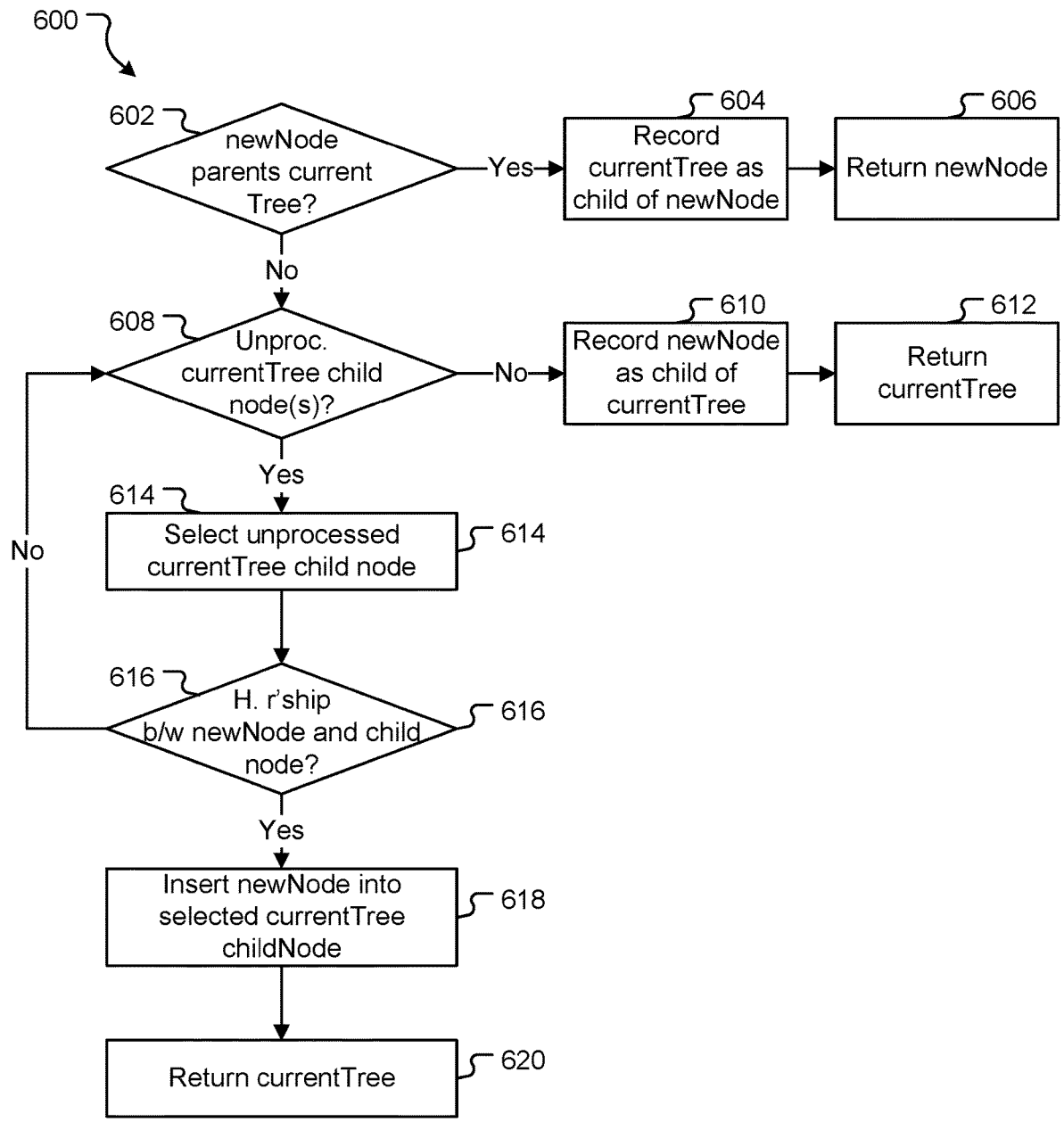
FIG. 6 is a flowchart depicting operations performed to determine nested element groups.

Turning to FIG. 6, a method 600 for creating a hierarchy of nodes that defines nested element groups will be described. This may be referred to as an insert node method (and, accordingly, reference to an insert node process 600 can be considered reference to a process performed in accordance with method 600).

An insert node process 600 is initially invoked at 510 as described above. Further, method 600 is recursive and, therefore, a current insert node process 600 may result in a new insert node process 600 being called (at 618).

A given insert node process 600 takes two nodes as inputs which will be referred to as currentTree and newNode. For example, the insert node process may be defined as:

insert(Node currentTree, Node newNode) { }

When the initial insert node process is called at 510, currentTree input is the root node generated at 506 and newNode input is the node selected at 508. E.g.:

insert({root node>}, {node selected at 508>})

At 602, module 204 determines if newNode is a parent of currentTree. If so, processing proceeds to 604. If not, processing proceeds to 608.

Generally speaking, newNode will be the parent of currentTree if currentTree is positioned entirely within newNode. In the present embodiment, module 204 determines if one node (e.g. N1) is a parent of another node (e.g. N2) based on the bounding box data of the two nodes. Specifically, if the N1 bounding box entirely encompasses the N2 bounding box then N1 is a parent of N2. In the present context, therefore, one node (N1) is the parent of another node (N2) if:

N1 originX<N2 originX; and
N1 originY<N2 originY; and
(N1 originX+N1 width)>(N2 originX+N2 width); and
(N1 originY+N1 height)>(N2 originY+N2 height).

Notably, if N1 is determined to be a parent of N2 it may not end up being the direct parent of N2—but may instead end up being a grand-parent or further removed ancestor of N2.

In the first insert node process (as called at 510), currentTree is the root node and, therefore, has a bounding box that defines the entire page. In this case newNode will not be the parent of currentTree. In recursively called insert node processes are recursively called (at 618), however, newNode may be the parent of currentTree.

At 604, newNode is the parent of currentTree. In this case, module 204 records currentTree as a child of newNode (e.g. by appending currentTree identifier to the end of newNode's children list). This effectively creates a nested element group in which newNode is the parent and currentTree is a child thereof. This, in turn, indicates that currentTree's element is positioned entirely within newNode's element.

Following 604, module 204 returns newNode at 606. Process 600 is then complete.

At 608, newNode is the not the parent of currentTree. In this case, newNode is a descendant of currentTree (e.g. a direct child, grandchild, further removed descendant) and module 204 performs processing to determine what level of the hierarchy as currently defined newNode belongs at. Generally speaking, this involves determining whether newNode has a hierarchical relationship with any currentTree child node. If so, a new insert node process is recursively called with that chide node and newNode as inputs. If newNode does not have a hierarchical relationship with any currentTree childe node, newNode is recorded as a child of currentTree.

Accordingly, at 608 module 204 determines if currentTree has any child nodes (as defined, in the present example, by currentTree's children list) that have not yet been processed in the current recursion. If currentTree has no child nodes (i.e. an empty children list), or all of currentTree's child nodes have been processed in the current recursion, processing proceeds to 610. Otherwise processing proceeds to 614.

At 610, currentTree either has no child nodes or none of its child nodes are hierarchically related to newNode (see 616 below). In this case, module 204 records newNode as a child of currentTree (e.g. by adding newNode to currentTree's children list). This effectively creates a nested group of elements in which currentTree (or its corresponding element) is the parent and newNode (or its corresponding element) is a child thereof. Following this, at 612, module 204 returns currentTree node. Process 600 is then complete.

At 614, currentTree has at least one child node that has not yet been processed. In this case, module 204 selects an unprocessed currentTree child node for processing. CurrentTree child nodes may be selected for processing in any order (e.g. in the order in which they appear in currentTree's children list).

At 616, module 204 determines if the child node selected at 614 and newNode are hierarchically related. If so, processing proceeds to 618. If not, processing returns to 608.

In the present context, the selected child node and newNode are hierarchically related if the child node is a parent of newNode or newNode is a parent of the child node. Determining whether one node parents another is described above at 602.

At 618, the selected child node and newNode are hierarchically related. In this case, module 204 recursively calls a new insert node process. The newNode input to the new insert node process is newNode of the current insert node process. The currentTree input to the new insert node process is the child node selected at 614. E.g.:

insert({<child node selected at 614>}, {<newNode of current insert node process>})

At 620, once the insert node process called at 618 has returned, module 204 returns currentTree. Following the new insert node called at 618 (which may, in turn, recursively call further insert node processes), newNode will have been added as a descendant of one of currentTree's child nodes. Insert node process 600 is then complete.

Example Method for Determining Partial Overlap Element Groups

Figure 7:
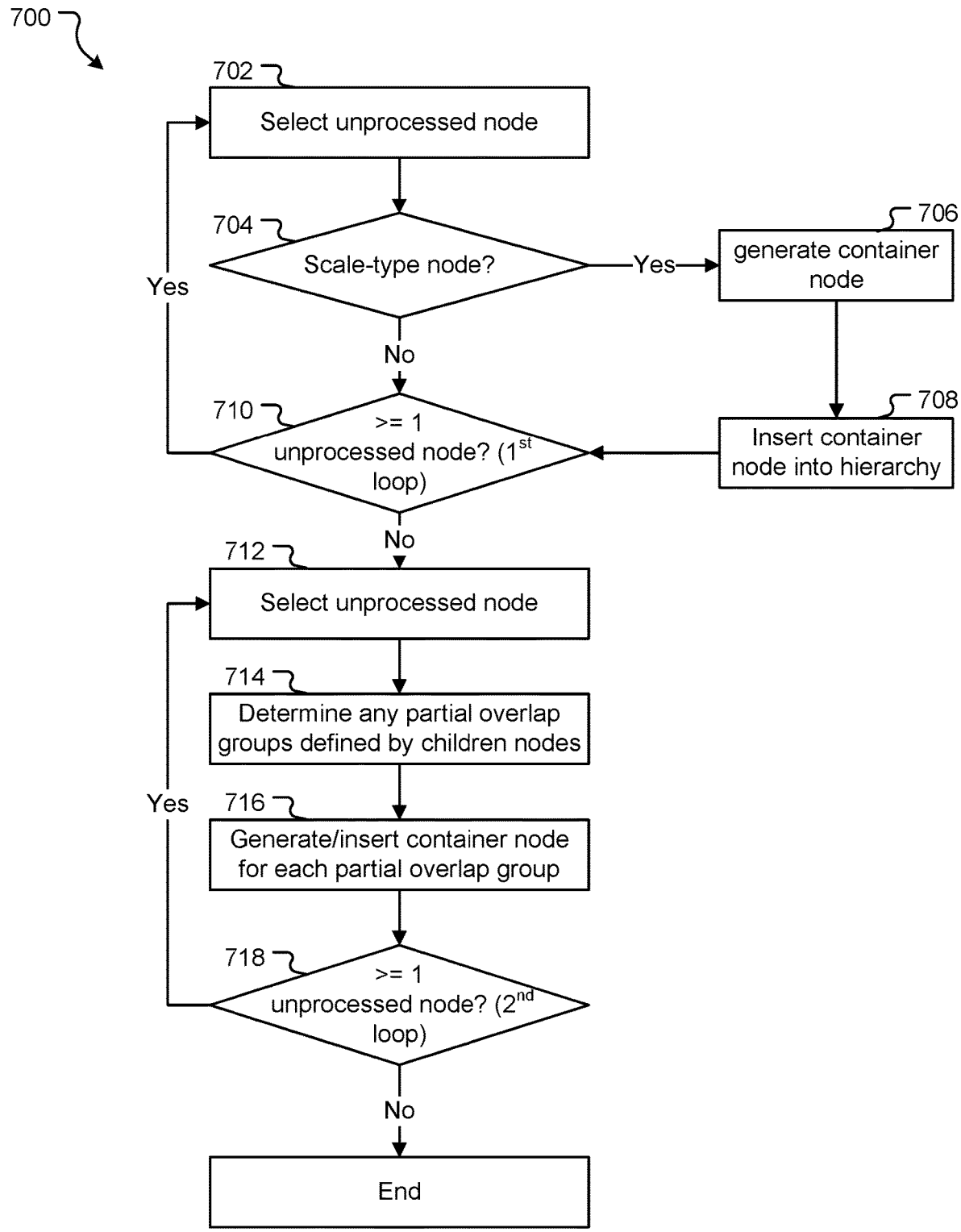
FIG. 7 is a flowchart depicting operations performed to determine partial overlap element groups and scale element groups.

Turning to FIG. 7, a method 700 for determining partial overlap element groups will be described. Method 700 also serves to identify scale-type elements (which may be used in a design reflow process as described further below). Method 700 may be referred to as a container node generation process (and, accordingly, a process performed in accordance with method 700 referred to as a container node generation process).

Generally speaking, method 700 operates to traverse the nodes of the initial hierarchy to identify where container nodes are needed and insert container nodes accordingly. In the present embodiments, container nodes are determined to be needed where scale-type nodes are identified and where sibling nodes define partial overlap groups.

In the present example, method 700 takes the initial hierarchy (e.g. as defined by the root node thereof) as input and performs two high level processing loops. In one high level processing loop (operations 702 to 710), scale-type nodes are identified and container nodes are created for those scale-type nodes and inserted into the initial hierarchy. In the second high level processing loop (operations 712 to 718) partial overlap element groups are identified and container nodes are created for each partial overlap element group and inserted into the initial hierarchy. Alternative approaches are possible, and while depicted as a single continuous process each of these high level processing loops may be performed independently.

At 702, module 204 selects a node of the initial hierarchy that has not yet been processed in the first processing loop (e.g. processed according to operation 704 and, if relevant, 706 and 708). Nodes may be selected for processing in the first processing loop in any order—for example according to a depth first traversal algorithm.

At 704, module 204 determines if the selected node is a 'scale' type node.

In the present embodiments, 'scale' type nodes are nodes that define elements that should be scaled uniformly (i.e. so their aspect ratios are maintained) in any reflowing process. Scale-type nodes may be determined by reference to defined scale-type node criteria. Such criteria may define that a node defines a defined scale-type element; the node defines a text element and the node has children; the node is a leaf node (i.e. it does not have any children). Alternative scale-type node criteria may be defined. Elements which should be scaled uniformly are defined as scaled type elements. These may include, for example, graphic elements (e.g. a raster or vector graphic elements), video elements, elements with non-zero rotation, and/or other elements that should be scaled uniformly.

Nodes that are not scale-type nodes can be scaled non-uniformly/without regard to aspect ratio in any reflow process. This includes, for example, nodes that define rectangular elements and have node children (which will then define elements positioned within their parent node's rectangular element). In this case, the node's element can stretch and reflow in any reflow process.

If the selected node is a scale-type node, processing proceeds to 706. If not, processing proceeds to 710.

At 706, module 204 generates a new container node. The new container node is generated with the following properties:

| Property | Value (for root node) |
| --- | --- |
| element: | Null or not defined. |
| nodeBoundingBox: | The bounding box of the element corresponding to the selected node. |
| nodeType: | A value indicating the container node type (e.g. 'Container', 2, or any other defined value). |
| children: | The node selected at 706. |
| zIndex: | In this example −1. |

At 708, module 204 adds the new container node to the initial hierarchy. To do so, module 204 updates the children list of the selected node's immediate parent to remove the selected node and add the newly generated container node. This changes the original hierarchy of (parent selected node) to a hierarchy of (parent container node selected node). Processing then proceeds to 710.

At 710, module 204 determines whether any nodes in the initial hierarchy still need to be processed in the first processing loop. If so, processing returns to 702. If not, the first processing loop is complete and processing proceeds to 712 to commence the second processing loop.

At 712, module 204 selects a node of the initial hierarchy that has not yet been processed in the second processing loop (e.g. processed according to operation 714 and, if relevant, 716). As with the first processing loop, nodes may be selected for processing in the second processing loop in any order—for example according to a depth first traversal algorithm.

At 714, module 204 determines whether the selected node's children node(s) define one or more partial overlap groups. In the present context, a partial overlap group occurs where two or more child nodes' bounding boxes overlap one another but are not entirely contained within (or coextensive with) one another. For example, in design 400 of FIG. 4 elements 408, 410, and 412 define a partially overlapping element group.

If the selected node has less than two child nodes, the selected node does not define any partial overlap groups.

If the selected node has two or more child nodes, module 204 determines whether one or more partial overlap groups are defined by reference to each child node's bounding box (noting that at this stage, an element-type node's bounding box is the same as the bounding box of the element it defines). This may be done in various ways.

In the present implementation, module 204 determines whether a set of two or more child nodes defines any partial overlap groups by processing each child node in turn. For each child node module 204 determines if the node partially overlaps with an existing temporary node group. If so, the child node is added to the existing temporary node group, and a bounding box of the existing node group is updated to account for the newly added node. If the child node does not partially overlap an existing temporary node group (or no node groups yet exist), a new temporary node group is created, the child node is added to the newly created temporary node group, and the new temporary node group's bounding box is set to the bounding box of the childe node just added to it.

In this example, a child node (N1) will partially overlap a temporary group (G1) unless any one of the following conditions evaluates true:
- N1 is to the right of G1. E.g.: N1 originX>(G1 originX+G1 width)
- N1 is to the left of G1. E.g.: (N1 originX+N1 width)<G1 originX
- N1 is below G1. E.g.: N1 originY>(G1 originY+G1 height)
- N1 is above G1. E.g.: (N1 originY+N1 height)<G1 originY As noted, where a node is added to an existing temporary node group, the bounding box of that temporary node group is updated to account for the new node. Generally speaking, the bounding box of the node group is updated to define a rectangle that sits flush around all nodes within the group (including the newly added node). For example, the temporary node group's bounding may take the following values:

| Property | Value |
| --- | --- |
| originX | min originX of all group nodes |
| originY | min originY of all group nodes |
| width | (max (originX + width) of all group nodes) − (min originX of all group nodes) |
| height | (max (originY + height) of all group nodes) − (min originY of all group nodes) |
| rotation | 0 |

Once all children of the selected node have been processed, any temporary node group that includes more than one node defines a partial overlap group.

At 716, module 204 creates a new container node for each partial overlap group (if any) and inserts that container node to the initial hierarchy.

For a given partial overlap group (i.e. any group generated at 714 with more than one node), a new container node is generated with the following properties:

| Property | Value (for root node) |
| --- | --- |
| element: | Null or not defined |
| nodeBoundingBox: | The bounding box of the temporary node group defining the partial overlap group. |
| nodeType: | A value indicating the container node type (e.g. 'Container', 2, or any other defined value). |
| children: | The partial overlap group nodes |
| zIndex: | In this example −1. |

To insert a new container node into the initial hierarchy module 204 updates the children list of the selected node to: remove each node that is now part of the partial overlap group; and add the newly generated container node. To illustrate this, consider a selected node A having a children list of [B, C, D]. If nodes B and C are determined to define a partial overlap group, module 204 would: generate a new container node E with a children list of [B, C]; and update node A's children list to [E, D].

At 718, module 204 determines whether any nodes in the initial hierarchy still need to be processed in the second processing loop. If so, processing returns to 712. If not, the second processing loop (and container node generation process) is complete.

Example Initial Hierarchy

Figure 8:
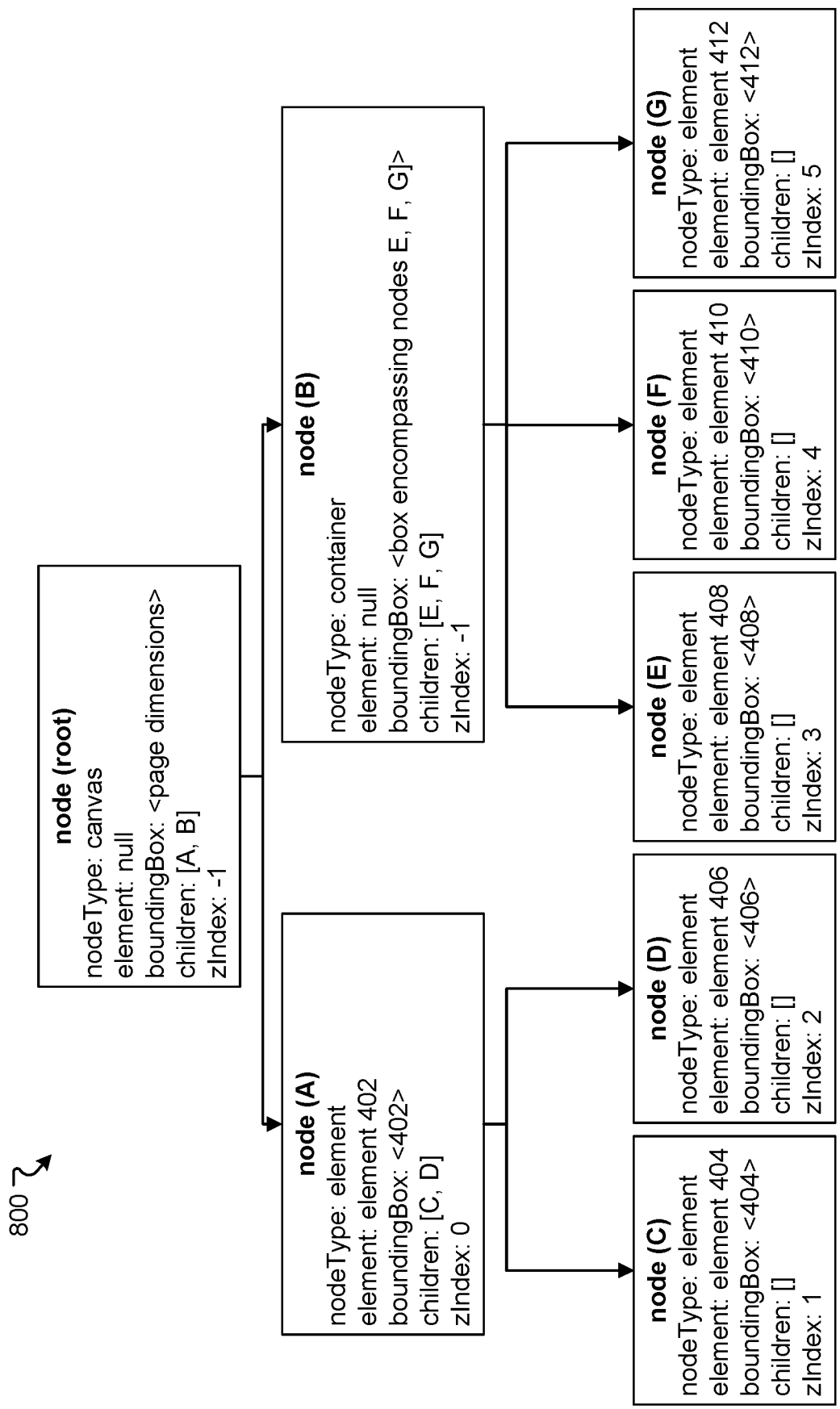
FIG. 8 depicts an example node tree corresponding to the design of FIG. 4.

In order to illustrate the initial hierarchy as generated over operations 504 to 514 of method 500, FIG. 8 depicts an initial hierarchy 800 that corresponds to example design 400.

Initial dataset 800 is defined by eight nodes in total.

The root node is a canvas-type node. Its element property is null and its bounding box corresponds to the page dimensions—e.g. originX=0; originY=0; width=page width; height=page height; rotation=0. The root node's children are nodes A and B.

Node A is an element-type node that defines element 402. Node A's bounding box is the same as the bounding box for element 402. Element 402 entirely contains elements 404 and 406 and, therefore, node A's children are nodes C and D (defining design elements 404 and 406 respectively).

In design 400, elements 408 and 410 overlap and element 408 and 412 overlap. Accordingly, the nodes defining those elements (nodes E, F, and G) form a partial overlap group. Given this, container-type node B has been generated to contain nodes E, F, and G. Node B's bounding box defines a rectangle that sits flush around the elements its child nodes E, F, and G (elements 408, 410, and 412 respectively). As node B is a container-type node it does not itself define an element (and therefore its element property is null).

Returning to FIG. 5, at 516-520 module 204 determines element bands and an element order and generates the final hierarchy (e.g. the hierarchy representation of the design) from which the nested element groups, partial overlap element groups, element bands, and reading order can be determined. The final hierarchy also provides information that can be used to reflow a design (as discussed further below).

In the present embodiments, the final hierarchy is a hierarchy of panels. Various panel data structures are possible, however in the present embodiments the following panel data structure is used:

```
Panel {
    Node node;
    Box panelBoundingBox;
    List<Panel> subPanel;
    PanelDirection direction;
    ReflowAction action;
}
```

For ease of reference, a panel may be referred to as having an identifier (e.g. a panelID). In most implementations any panel identifier will be implicit and need not be explicitly defined.

In this example, a panel may (though need not) define a node via the node property. A panel that does not define a node (e.g. its node property is null or an alternative defined value) serves a grouping purpose and, may, therefore, be referred to as a holding panel.

If a panel defines an element-type node, the panel's bounding box takes the value of the element-type node's bounding box (and, therefore, the bounding box of the element defined by the element-type node). A panel that defines an element-type node (via its node property) may be referred to as an element panel (in that the panel effectively defines an element, albeit via the panel.node.element chain).

If a panel does not define a node (e.g. the panel's node property is null), the panel's bounding box takes the dimensions of the tightest bounding box that sits flush around the panel's child node(s) (as defined by the panel's subpanel property).

In this example, a panel's subpanel property is a list of panels which are children of the panel in question—i.e. children panels that are positioned inside the present parent panel.

In this example, a panel's direction property indicates a reflow direction for the contents of the panel. In the present examples, the direction property takes a value indicating either a vertical (e.g. top-to-bottom or bottom-to-top) reflow direction or a horizontal (e.g. left-to-right or right-to-left) reflow direction. Conceptually, a panel that defines a vertical direction can be considered to be or define a vertical band (e.g. a column) of content in which subpanels (and the elements those subpanels ultimately represent) are ordered vertically. Similarly, a panel that defines a horizontal direction can be considered to be or define a horizontal band (e.g. a row) of content in which subpanels (and the design elements those subpanels ultimately represent) are ordered horizontally. In the present examples, vertical ordering is from top to bottom and horizontal ordering is from left to right, though this can be changed for different reading orders.

In this example, a panel's action property indicates how the panel's subpanels are to be processed when the design is reflowed. In the present examples, the action data takes a value indicating either a reflow action or a scale action. Reflow and scale actions are described further below. Generally speaking, however, a 'reflow' action value indicates that sub-panels (and the elements they represent) can be separated during reflowing. For example, if two sub-panels do not fit at a given screen size (and the parent panel's action is set to reflow), the second panel may be repositioned (e.g. to be below the first panel). Conversely, a 'scale' action value indicates that the subpanels are not to be separated. In this case, if the screen size is too narrow to fit all subpanels then the set of subpanels (and thus the design elements they represent) is collectively and uniformly shrunk (i.e. so the aspect ratio is maintained).

At 516, module 204 initialises a root panel for the final hierarchy. The root panel is generated with the following properties:

| Property | Value (for root node) |
| --- | --- |
| node: | Null or not defined |
| panelBoundingBox: | The page dimensions - e.g. |
| | originX = 0; |
| | originY = 0; |
| | width = ; |
| | height = ; |
| | rotation = 0; |
| subpanel: | Initially, no subpanels (e.g. an empty list). |
| direction: | Vertical (e.g. top-to-bottom) |
| action: | Reflow |

At 518, module 204 processes the initial hierarchy of nodes to identify bands of nodes and generate the final hierarchy, which is tree of panels stemming from the root panel generated at 516.

In the present embodiments, module 204 calls a recursive panel generation process to do this. The panel generation process may be performed in accordance with the panel generation method 1000 described below with reference to FIG. 10. In the present embodiments, inputs to a given panel generation process 1000 are a set of one or more input nodes and a dimension identifier. When module 204 initially calls the panel generation process at 518, the inputs are the children of the root node (i.e. the nodes defined by the root node's children property) and a horizontal processing dimension. For different reading orders to the example provided above, the panel generation process may be initially called with a vertical processing dimension.

The panel generation process called at 518 returns one or more panels. At 520, module 204 updates the root panel based on the returned panels. In particular, module 204 updates the root panel's sub-panel property to insert (or otherwise reference) the panel(s) returned by the panel generation process.

Following 520, generation of the final hierarchy is complete. At 522, module 204 returns the final hierarchy (or, at least, a pointer or reference to the root panel thereof). Typically, module 204 will return the final hierarchy to the application or process that initially called method 500. The final hierarchy may be used in various ways, examples of which are described below.

Example Method for Determining Element Bands and Reading Order

This section describes a method 1000 for generating a hierarchy of panels that define element bands and an element reading order. Method 1000 may, for example, be initially called at 518 of method 500 as described above. Method 1000 serves to generate panels and, as such, may be referred to as a panel generation method (and, accordingly, a process operating in accordance with method 1000 may be referred to as a panel generation process).

Figure 9:
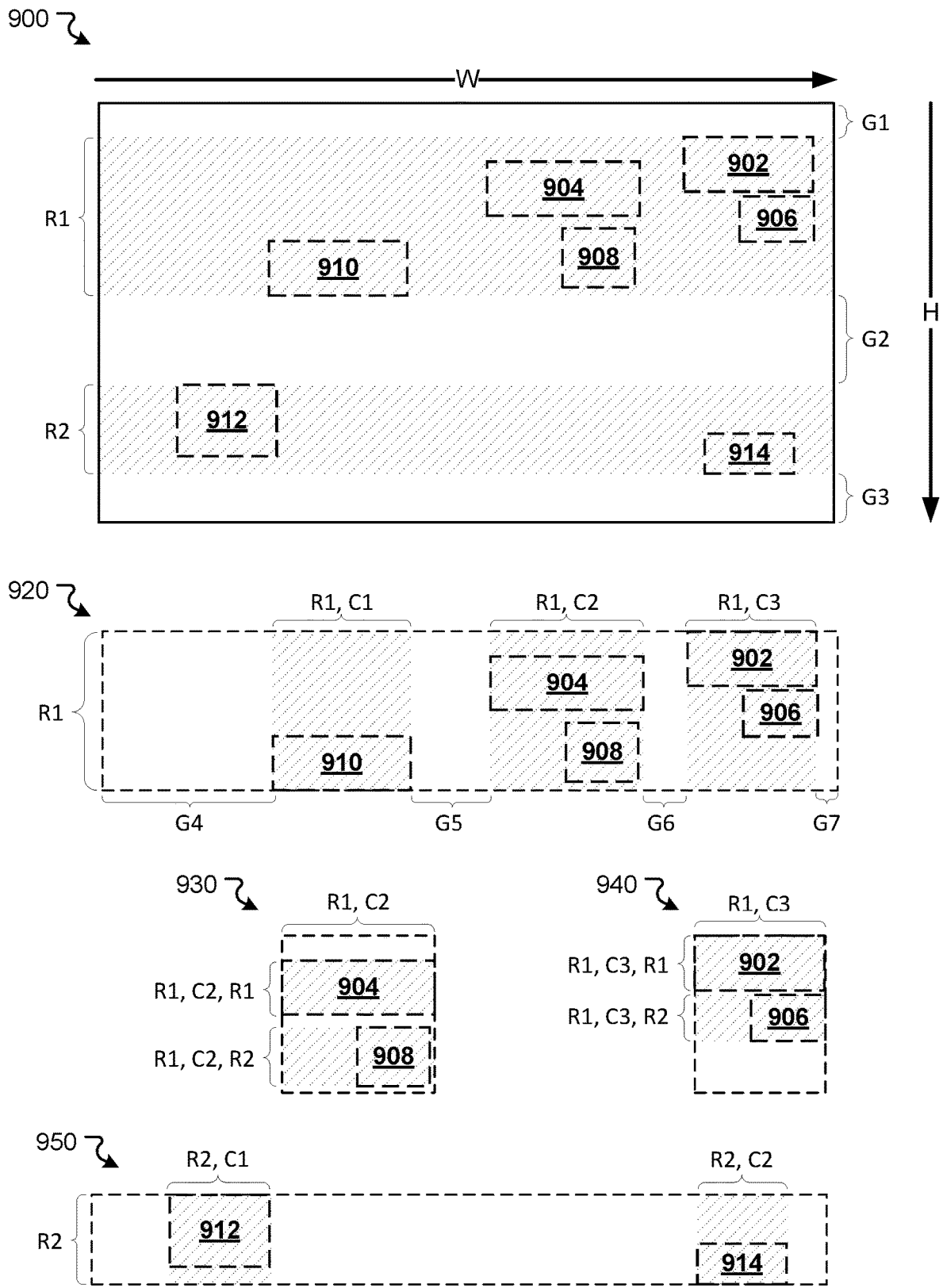
FIG. 9 depicts another example design.

To assist in describing method 1000, reference will be made to example design 900 as shown in FIG. 9. Design 900 has been processed to generate an initial hierarchy, resulting in a root node (not depicted) and ten additional nodes 902-914 (the bounding boxes of which are depicted in FIG. 9).

In this example, and for the purposes of illustration, each node 902 to 914 is an element-type node and therefore defines an element of design 900. Further, for the purposes of this example there are no nested element groups or container nodes. Accordingly, the root element corresponding to design 900 may be as follows (in this example the root node's children are presented in order of min-xOrigin to max xOrigin):

| Property | Value |
| --- | --- |
| element: | Null |
| nodeBoundingBox: | The dimensions of the original design page |
| nodeType: | Canvas |
| children: | [912, 910, 904, 908, 902, 914, 906] |
| zIndex: | −1 |

Design 900 includes two shaded regions annotated as R1 and R2. These are not part of design 900, but rather indicate horizontal bands (e.g. rows) of nodes as determined over the course of panel generation method 1000. This is described further below.

Due to the specific data structures used in the present examples, the panel generation method is described as processing nodes. This includes identifying groups (e.g. bands) of nodes and merging bands that are generated to hold groups of nodes. Furthermore, most of the operations described in this section, including those related to identifying bands of nodes, are based on the spatial positioning of the nodes—i.e. their sizes and positions. As described above, however, each element-type node defines an element (and has a size/position corresponding to that element), and each container-type node will ultimately serve to identify (via its descendants) one or more element-type nodes (and itself have a size and position based on the sizes/positions of the elements its descendant nodes define). Given this, it will be appreciated that the techniques described could be applied to elements themselves (or other data structures that define element size and position in some way). For example, the generation of holding panels described below (at 1016) effectively identifies groups (described as bands—e.g. rows or columns) of nodes. Identifying groups of nodes in this way also serves to identify groups of elements (i.e. the elements defined by the nodes).

Figure 10:
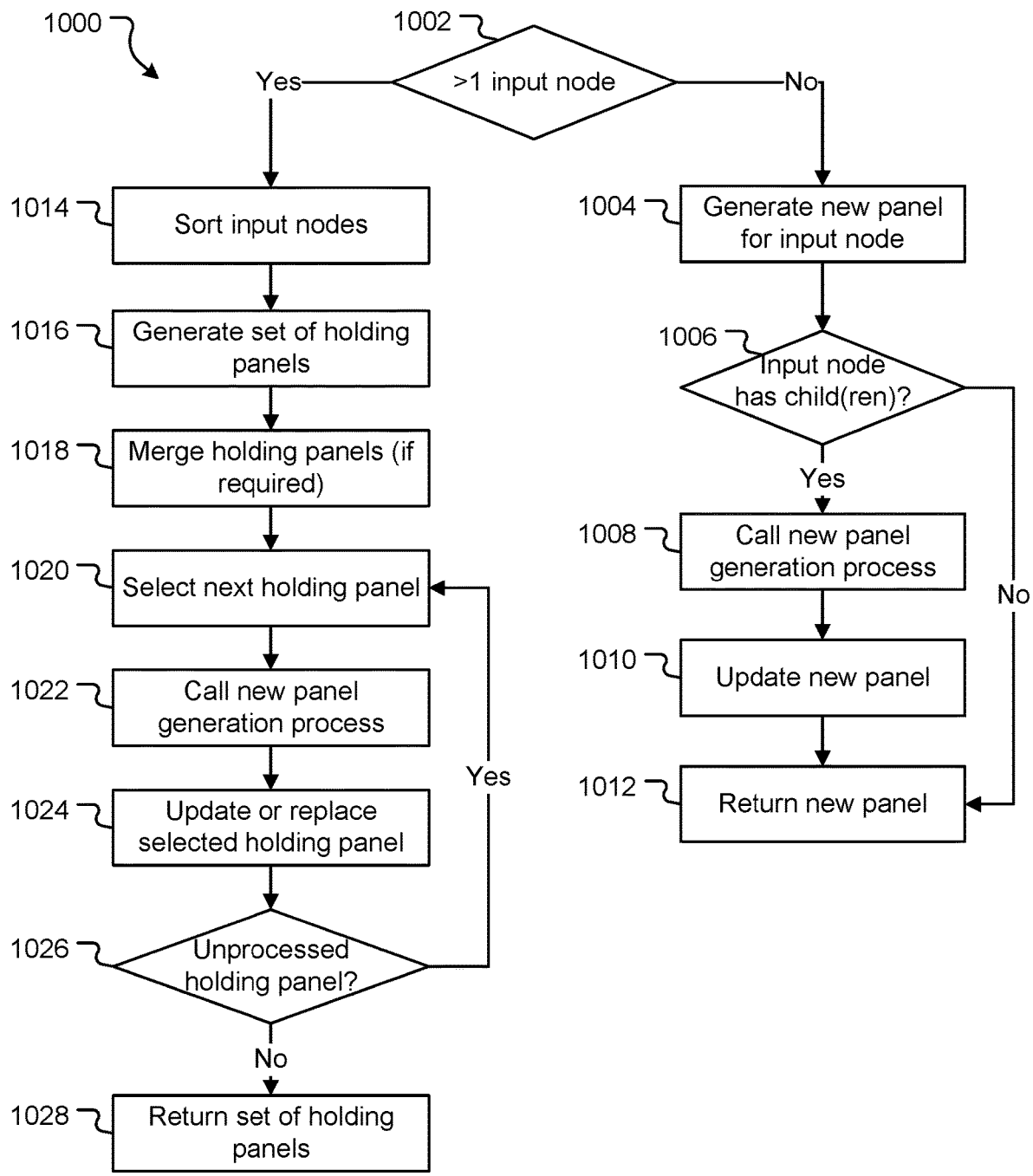
FIG. 10 is a flowchart depicting operations performed to determine bands of design elements and a design element reading order.

Turning to FIG. 10, a panel generation method 1000 for generating (and creating a hierarchy of) panels will be described. Reference to a panel generation process 1000 can be considered reference to a process performed in accordance with panel generation method 1000.

A panel generation process 1000 is initially invoked at 518 as described above. Further, method 1000 is recursive and, therefore, a current panel generation process 1000 may result in a new panel generation processes 1000 being called (at 1008 or 1022).

As noted above, the inputs to a panel generation process 1000 are a set of one or more nodes and a processing dimension. For example, the panel generation process may be defined as:

panelGeneration(nodes[ ], horizontal|vertical) { }

In the present embodiments, the processing dimension input takes a value indicating either horizontal processing is being performed (in which case horizontal bands—e.g. rows—of elements are identified) or vertical processing is to be performed (and vertical bands—e.g. columns— of elements are to be identified). The processing dimension may be more generally considered as indicating either a first dimension or a second dimension. The dimension defined by the processing dimension input of a given panel generation process will be referred to as the relevant dimension for that panel generation process.

A panel generation process 1000 returns one or more panels.

In the present embodiments, when the initial panel generation process 1000 is called at 518 the nodes input is the set of nodes defined by the root node's children property and the processing dimension indicates that horizontal processing is to be performed. E.g.:

panelGeneration([root node children>], horizontal)

Generally speaking, successive recursive panel generation process 1000 calls have alternating processing dimension inputs in order to alternate between identifying horizontal node bands (e.g. rows) and vertical node bands (e.g. columns). In the context of the reading order as described above, the initial panel generation process identifies rows of nodes. Each row of nodes is then processed (according to process 1000) to identify columns of nodes within that row. Each column is then processed to identify rows of nodes within that column and so forth. As will be seen, however, an exception to this alternating row/column identification occurs where the nodes input defines a single node (in which case further recursions from that process involve—in the present embodiments—row identification).

More generally, the processing dimension input alternates between a first dimension and second dimension over successive panel generation process 1000 calls.

By way of overview, if the nodes input defines a single node module 204 generates a new panel corresponding to that node. If the input node has children they are recursively processed and the panels returned are added as subpanels to the panel generated for the node. The new panel is then returned.

If the nodes input defines more than one node, module 204 processes those nodes to determine node bands: i.e. groups of nodes which overlap in the relevant dimension (as defined by the input processing dimension). For each band of overlapping nodes, module 206: generates a holding panel for the band; recursively processes the node(s) of the band; and adds the panels returned by the recursion as subpanels of the holding panel generated for the band. The set of holding panels is then returned.

These operations will now be described in more detail.

At 1002, module 204 determines if the nodes input defines a single node or more than one node. If the nodes input defines a single node, processing proceeds to 1004. Otherwise, processing proceeds to 1014.

At 1004, the nodes input includes a single node. Accordingly, module 204 generates a new panel corresponding to the single input node. The new panel is generated with the following properties:

| Property | Value |
|---|---|
| node: | The single node of the nodes input |
| panelBoundingBox: | The bounding box of the single node |
| subpanel: | Initially, no subpanels (i.e. an empty list). |
| direction: | Based on the input processing dimension: if input = horizontal dimension, direction = horizontal (e.g. left-to-right); if input = vertical dimension, direction = vertical (e.g. top-to-bottom). |
| action: | If the node is a container type node, action = scale. If any parent panel has a scale action, action = scale. Otherwise, action = reflow. |

At 1006, module 204 determines if the single input node defines any children nodes. If so, processing proceeds to 1008. If not, processing proceeds to 1012.

At 1008, module 204 recursively calls a new panel generation process 1000. The inputs for the new panel generation process are the child nodes of the input node and the horizontal processing dimension. E.g.:

panelGeneration([<input node>.children], horizontal)

The new panel generation process called at 1008 returns one or more panels.

At 1010, module 204 updates the new panel that was generated at 1004 by adding the panel(s) returned by the panel generation process called at 1008 as subpanels of the new panel.

At 1012, module 204 returns the new panel as generated at 1004 (and, if relevant, updated at 1010). The panel generation process is then complete.

At 1014, the nodes input includes more than one node. In this case, module 204 sorts the input nodes. The sorting order is based on the on the input processing dimension.

If horizontal (e.g. row) processing is being performed, the input nodes are sorted vertically (e.g. min-originY to max-originY). If vertical (e.g. column) processing is being performed, nodes are sorted horizontally (e.g. min-originX to max-originX).

Figure 11:
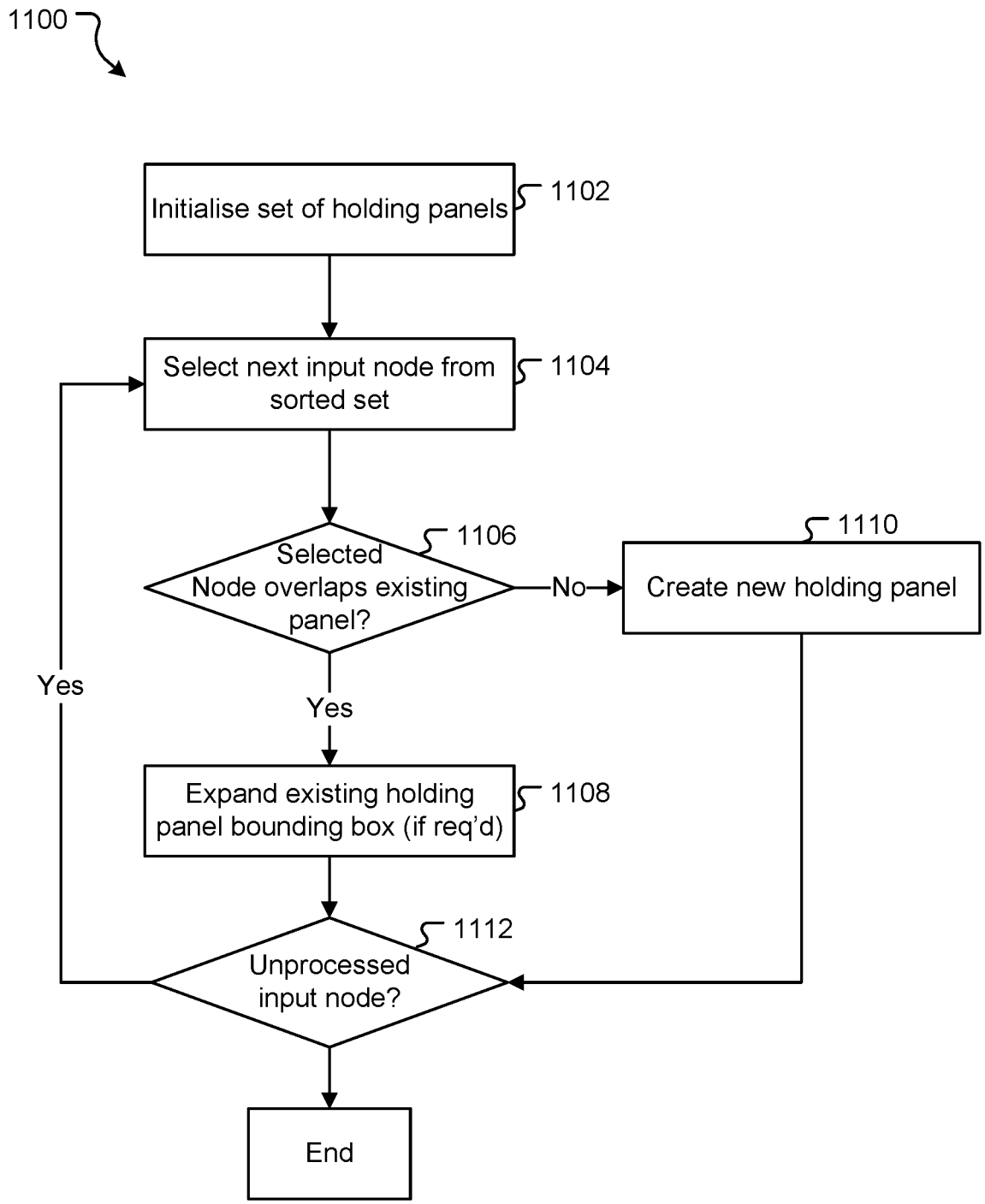
FIG. 11 is a flowchart depicting operations performed to determine bands of design elements.

At 1016, module 204 determines bands (e.g. rows or columns) of nodes (and, therefore, bands of elements) and for each band determined generates a holding panel to hold (or group) the nodes defining that band together. An example method 1100 for generating doing so is described below with reference to FIG. 11. Generally speaking, however, each holding panel will have a bounding box that defines a band that encompasses a group of one or more nodes. If horizontal processing is being performed, each holding panel will define a horizontal band (e.g. a row) encompassing a group of one or more nodes that collectively overlap in the vertical dimension. If vertical processing is being performed, each holding panel will define a vertical band (e.g. a column) encompassing a group of one or more nodes that collectively overlap in the horizontal dimension. Collective overlapping in this sense refers to nodes that overlap as a group (even if individual nodes within that group may not overlap). For example, if nodes A and B overlap in the relevant dimension, and nodes B and C overlap in the relevant dimension, then nodes A, B, and C are considered to collectively overlap (even if node A does not itself overlap node C).

At 1018, module 204 is configured to determine whether any of the holding panels generated at 1016 should be merged and, if so, merges those holding panels. This process generally involves determining if two holding panels are sufficiently proximate one another in the relevant dimension and, if so, merging those holding panels. This effectively provides for an overlap tolerance so that multiple nodes may be end up being indicated by a single holding panel even if there are gaps (in the relevant dimension) between adjacent nodes in that single holding panel.

Figure 12:
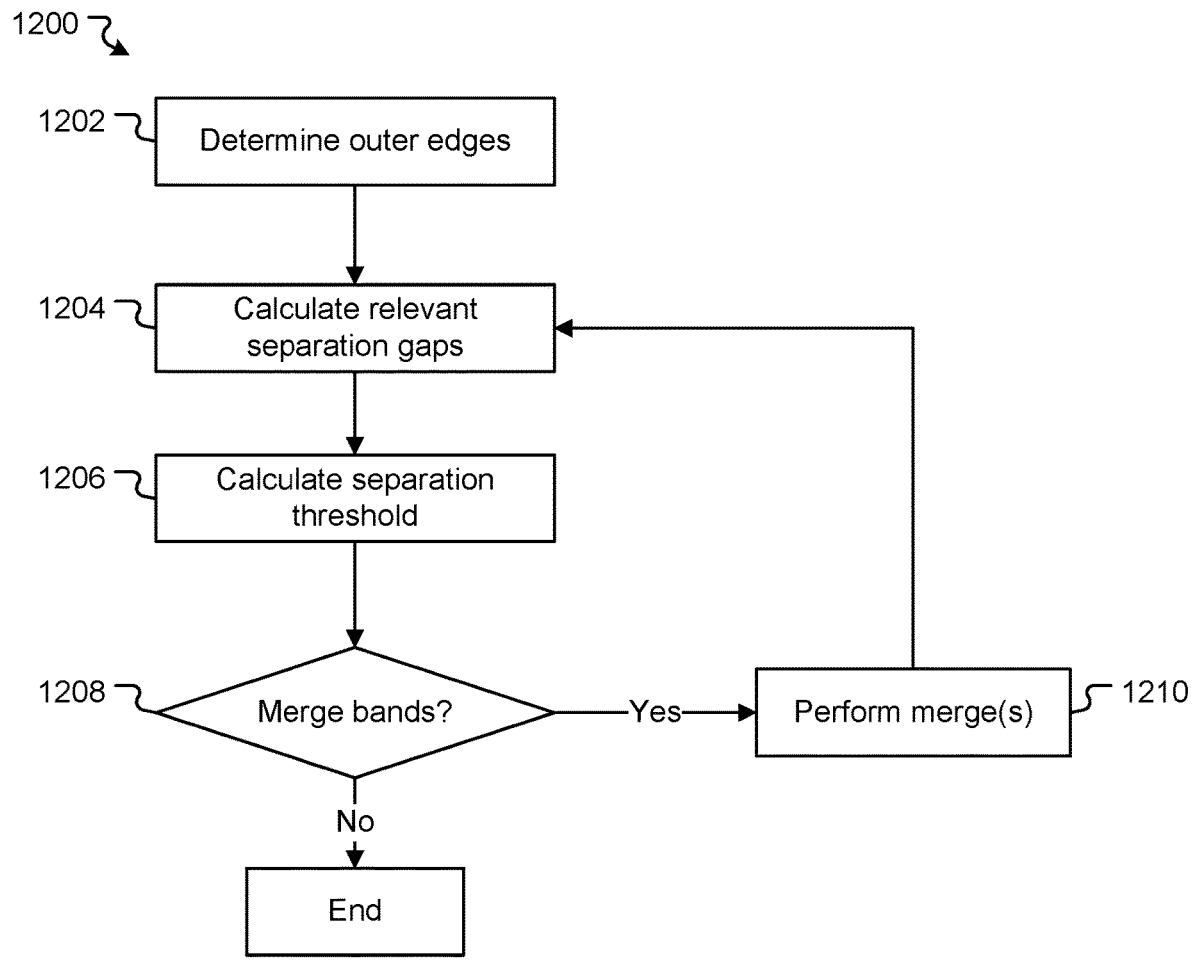
FIG. 12 is a flowchart depicting operations performed to merge bands of design elements.

An example method 1200 for merging holding panels (and, therefore, merging bands of design elements that have been identified) is described below with reference to FIG. 12. Generally speaking method 1200 determines whether two holding panels should be merged based on whether the size of the gap separating those two holding panels in the relevant dimension is less than a separation threshold. Module 204 may, however, be configured to determine whether holding panels should be merged in alternative ways (or omit this processing).

Following the generation of holding panels at 1016 and (if required) merging of holding panels at 1018, module 204 loops through each holding panel. For a given holding panel, the set of one or more nodes that fits within the given holding panel's bounding box is recursively processed and the panel(s) returned are added as subpanels of the given holding panel. This is described in greater detail below.

At 1020, module 204 selects the next unprocessed holding panel.

At 1022, module 204 recursively calls a new panel generation process 1000. The nodes input for the new panel generation process is the one or more input nodes that fall within the bounding box of the selected holding panel. The processing dimension input for the new panel generation process is the alternative processing dimension to the processing dimension that was input into the current panel generation process. E.g.:

panelGeneration([<nodes fitting in holding panel>], if horizontal ? vertical: horizontal)

The panel generation process called at 1022 returns one or more panels.

At 1024, module 204 either updates or replaces the selected holding panel. If the new panel generation process called at 1022 returns a single panel, module 204 replaces the selected holding panel with that single panel. Alternatively, if the new panel generation process called at 1022 returns more than one panel, module 204 updates the selected holding panel by recording the returned panels as the selected holding panel's subpanels.

At 1026, module 204 determines whether any holding panels have yet to be processed. If so, processing returns to 1020. If not processing proceeds to 1028.

At 1028, module 204 returns the set of holding panels. The panel generation process is then complete.

As has been described, the panel(s) returned at 1028 are added as subpanels of a parent panel. Accordingly, a given set of holding panels that is returned at 1028 is effectively (or, at least, becomes) a set of sibling panels.

Example Method for Determining Element Bands

At 1016 of method 1000, module 204 determines node (and therefore element) bands and generates a holding panel corresponding to each element band determined. An example method 1100 for doing this will be described with reference to FIG. 11. Method 1100 will be referred to as a holding panel generation method (and, accordingly, process performed in accordance with method 1100 may be referred to as a holding panel generation process.

A holding panel generation process 1100 has access (or takes as input) a sorted set of input nodes (as sorted at 1014) and the processing dimension of the current panel generation process.

At 1102, module 204 initialises a set of panels. This will be referred to as the set of holding panels. At 1102 the set of holding panels is empty.

At 1104, module 204 selects the next unprocessed input node from the sorted set of input nodes.

At 1106, module 204 determines if the selected node spatially overlaps (or falls entirely within) the bounding box of any existing holding panel in the set of holding panels in the relevant dimension. In the initial processing loop no holding panels have yet been generated, so the selected node will not overlap any existing holding panel.

If the input processing dimension is horizontal (and, therefore, horizontal bands/rows of nodes are being identified), vertical overlap is relevant. In this case, the selected node will overlap an existing holding panel if:

selected node(originY)<=holding panel(originY+height)

If the input dimension is vertical (and, therefore, vertical bands/columns of nodes are being identified), horizontal overlap is relevant. Accordingly, the selected node will overlap an existing holding panel if:

selected node(originX)<=holding panel(originX+width)

If the selected node spatially overlaps an existing holding panel in the relevant dimension, processing proceeds to 1108. Otherwise processing proceeds to 1110.

At 1108, and if required, module 204 expands the bounding box of the existing holding panel that the selected node overlaps to encompass the selected node. At 1108, the holding panel's bounding box is only ever expanded—i.e. it is not shrunk in any direction. The holding panel's bounding box is expanded if the selected node does not fall entirely within the existing bounding box.

For example: if the selected node's originY is less than the holding panel's originY, the holding panel's originY is updated to extend to the selected node's originY (and the holding panel's height is updated so the holding panel does not shrink); if the selected node's maximum y (e.g. originY+height) is greater than the holding panel's maximum y, the holding panel's height is updated to extend to the selected node's maximum y; if the selected node's originX is less than the holding panel's originX, the holding panel's originX is updated to extend to the selected node's originX (and the holding panel's width is updated so the holding panel does not shrink); and if the selected node's maximum x (e.g.

originX+width) is greater than the holding panel's maximum x, the holding panel's width is updated to extend to the selected node's maximum x.

Following expansion of the existing holding panel's bounding box (if required) processing proceeds to 1112.

At 1110, the selected node does not overlap (or fall within) the bounding box of any existing holding panel. In this case module 204 generates a new holding panel and adds it to the set of holding panels initialised at 1102. The new holding panel is generated with the following properties:

| Property | Value |
| --- | --- |
| node: | Null |
| panelBoundingBox: | The bounding box of the selected node |
| subpanel: | Null/empty list |
| direction: | Based on the input dimension: if input = horizontal dimension, direction = horizontal (e.g. left-to-right); if input = vertical dimension, direction = vertical (e.g. top-to-bottom). |
| action: | See note below |

The action for the new holding panel is based on the type of the selected node (whether it is a container-type node or not) and the reflow action of the selected node's parent panel (i.e. the parent panel of the input nodes being processed in the current panel generation process). If the selected node is a container-type node or the parent panel's action is scale, the action for the new holding panel is "scale". Otherwise the action for the new panel is "reflow".

Following creation of a new holding panel processing then proceeds to 1112.

At 1112, the selected node will fall within either an existing holding panel (whose bounding box may have been updated to encompass the selected node) or a new holding panel (which has a bounding box equal to the selected node's bounding box and, therefore, encompasses the node). At 1112, module 204 determines if further input nodes require processing. If so, processing returns to 1104.

If, at 1112, all input nodes have been processed, generation of the holding panels is complete. At this point, each input node will be encompassed by the bounding box of a single holding panel. Each holding panel, therefore, effectively defines a band (or group) of nodes and, therefore, a band (or group) of elements.

Holding Panel Generation (and Element Band Identification) Example

To illustrate the holding panel generation process, refer again to FIG. 9.

In an initial panel generation process (called on all nodes 902-914 and with the horizontal processing dimension), the nodes would be sorted by y coordinate at 1014:
[902, 904, 906, 908, 910, 912, 914]

The holding panel generation process called at 1016 would generate two holding panels with bounding boxes encompassing the nodes as follows:
R1:[902, 904, 906, 908, 910]
R2:[912, 914]

Each of these holding panels identifies a group of nodes that collectively overlap in the vertical dimension. Accordingly, each of these holding panels effectively defines a band (in this case a row) of nodes (and, therefore, the elements those nodes define). These row are depicted at 900.

Assuming bands R1 and R2 do not need to be merged, module 204 would select holding panel R1 at 1020 and at 1022 call a new panel generation process:
panelGeneration([902, 904, 906, 908, 910], vertical)

In the new panel generation process, the nodes would be sorted by x-coordinate at 1014:
[910, 904, 908, 902, 906]

The holding panel generation process called at 1016 would generate three holding panels with bounding boxes encompassing the nodes as follows:
R1,C1: [910]
R1,C2:[904,908]
R1,C3:[902,906]

Each of these holding panels serves to group together nodes that collectively overlap in the horizontal dimension. Accordingly, each of these holding panels effectively defines a band (in this case a column) of nodes and, therefore elements. These columns are depicted at 920.

Assuming again that none of these three holding panels is merged, each of the three sets of nodes defined by the holding panels would in due course be recursively processed in a new panelGeneration process—e.g.:
panelGeneration([910], horizontal)
panelGeneration([904, 908], horizontal)
panelGeneration([902, 906], horizontal)

Merging Design Element Bands

At 1018 of panel generation process 1000 module 204 determines whether any bands of design elements (as determined at 1016) should be merged and, if so, merges those bands. In the present embodiments, bands of design elements are defined by holding panels and, therefore, merging bands involves merging holding panels. An example method 1200 for merging holding panels will now be described with reference to FIG. 12. Reference to a merge (or panel merging) process 1200 can be considered reference to a process performed in accordance with method 1200.

In this example, method 1200 takes as input (of has access to): the set of holding panels determined at 1016; the processing dimension input to the current panel generation process 1000; and the bounding box of the parent panel that has been generated to hold the input nodes that have been input to the panel generation process in question (e.g. the root panel in the initial panel generation process or the selected holding panel in subsequent recursions initiated at 1022).

In example process 1200, module 204 determines whether two panels should be merged based on the size of the separation gap between those panels compared to the size of other separation gaps that are relevant to the set of panels in question.

At 1202, module 204 determines outer edges (in particular a minimum edge and a maximum edge) that will be used in the merge process. The outer edges are determined from (or defined by) the parent panel's bounding box.

Where the input defines the horizontal dimension, merging is determined with reference to the vertical separation between node bands. Given this, the minimum and maximum edges can conceptually be considered as the top and bottom edges of a column that contains the panels being processed. In the present coordinate system, therefore, where row identification is being performed the minimum edge is a top edge and the maximum edge is a bottom edge. These are defined by the parent panel's bounding box originY and (originY+height) values respectively.

For example, for design 900 of FIG. 9, the initial panel generation process has been called with all nodes 902-914 and the horizontal processing dimension. Here, the parent panel is the root panel and, therefore, the minimum edge is 0 and the maximum edge is the page height.

Conversely, where the input defines the vertical dimension, merging is determined with reference to the horizontal separation between node bands. Given this, the minimum and maximum outer edges can conceptually be considered as the left and right edges of a row that contains the panels being processed. In the present coordinate system, therefore, where column identification is being performed the minimum edge is a left edge and the maximum edge is a right edge. These are defined by the parent panel's bounding box originX and (originX+width) values respectively.

At 1204, module 204 calculates a set of separation gaps for the set of holding panels. These separation gaps include: a minimum edge separation gap, which is the separation gap between the minimum edge and the holding panel that is closest to that edge; one or more adjacent holding panel separation gaps, each defining a separation gap between (in the relevant dimension) adjacent holding panels; and a maximum edge separation gap, which is the separation gap between the maximum edge and the holding panel that is closest to that edge.

For example, at 900 of FIG. 9, horizontal processing (row identification) is being performed. Accordingly, module 204 calculates: minimum edge separation gap G1 between the holding panel indicated by R1 and the minimum (top) edge; adjacent band separation gap G2 between holding panels indicated by R1 and R2; and maximum edge separation gap G3 between holding panel indicated by R2 and the maximum (bottom) edge.

As a further example, at 920 of FIG. 9, vertical processing (column identification) is being performed. Accordingly, module 204 calculates: minimum edge separation gap G4 between the holding panel indicated by (R1,C1) and the minimum (left) edge; adjacent panel separation gap G5 between the holding panels indicated by (R1,C1) and (R1,C2); adjacent panel separation gap G6 between the holding panels indicated by (R1,C2) and (R1,C3); and maximum edge separation gap G7 between the holding panel indicated by (R1,C3) and the maximum (right) edge.

At 1206, module 204 calculates a separation threshold for the current set of holding panels. In the present example, the separation threshold is calculated as a percentage of the largest separation gap calculated at 1204. By way of example, the separation threshold may be set at 40% of the largest separation gap. The separation threshold may be calculated as an alternative percentage or calculated in alternative ways.

At 1208, module 204 determines whether any adjacent holding panels should be merged. In this example, module 204 determines that a pair of adjacent holding panels should be merged if their separation gap is less than or equal to the separation threshold calculated at 1206.

If module 204 determines that one or more adjacent pairs of holding panels should be merged, processing proceeds to 1210. If not, the merge process is complete.

At 1210, module 204 merges each pair of holding panels it has determined should be merged. For two holding panels P1 and P2 that are to be merged, this may be done, for example, by expanding the bounding box of P1 to encompass/include the bounding box of P2 (e.g. calculate the union of P1 and P2's bounding boxes) and deleting P2 from the set of holding panels. This effectively joins the two bands (i.e. the two rows or two columns) defined by the two holding panels into a single band (i.e. a single row or column). When merging two panels the reflow action of the surviving panel is set to reflow.

For example, at 920 of FIG. 9 three holding panels indicated by (R1,C1), (R1,C2), and (R1,C3) have been generated: (R1,C1) encompassing node 910; (R1,C2) encompassing nodes 904 and 908; (R1,C3) encompassing nodes 902 and 906.

If module 204 determined that holding panels (R1,C2) and (R1,C3) should be merged, it may do so by expanding the bounding box of (R1, C2) to encompass the bounding box of (R1, C3). As a result, the expanded bounding box of (R1, C2) would encompass nodes 904, 908, 902, and 906.

In the present embodiment, once pairs of panels have been merged at 1210, processing returns to 1204 to recalculate relevant separation gaps (noting that there will be at least one less holding panel and at least one holding panel with an enlarged bounding box following merging at 1210) and determine whether any further merging is required. In alternative embodiments, processing may instead end after merging is performed at 1210.

As will be appreciated, merge process 1200 effectively determines whether node bands (as defined by holding panel bounding boxes) should be merged based on an adaptive separation threshold (adaptive in the sense that for each set of holding panels the separation threshold may be different depending on the separation gaps relevant to that set of holding panels). Alternative processes for merging holding panels may, however, be adopted. As one example, holding panels may be merged based on a static separation threshold (e.g. a predefined and static value, such as a number of pixels). In this case, only adjacent panel separation gaps may need to be calculated (there being no need to determine outer edges or calculate minimum and maximum edge separation gaps).

Example Final Hierarchy

Figure 13:
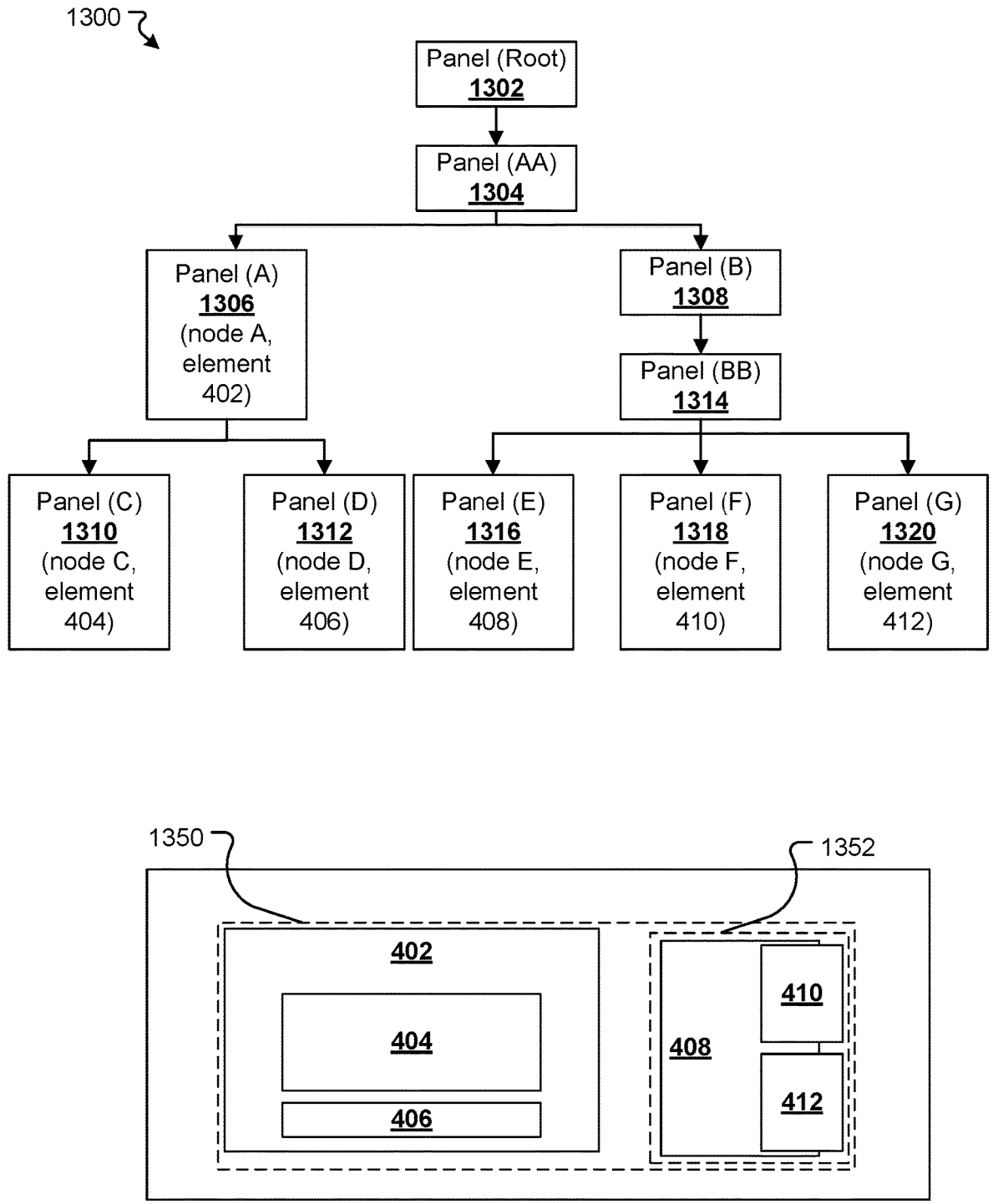
FIG. 13 depicts a hierarchical design representation of the design of FIG. 4.

In order to illustrate the final hierarchy generation, FIG. 13 depicts a final hierarchy 1300. Final dataset 1300 corresponds to example design 400 (reproduced in FIG. 400 for ease of reference) and follows generation of initial hierarchy 800 described above with reference to FIG. 8.

As can be seen, final hierarchy 1300 includes ten panels—1302-1320—properties of which are as follows:

| Panel | Node | Box | Subpanel | Direction | Action |
|---|---|---|---|---|---|
| Root (1302) | Null |  | [AA] | Top-to-bottom | reflow |
| AA (1304) | Null | <see note below> | [A, B] | Left-to-right | reflow |
| A (1306) | A | node.boundingBox | [C, D] | Top-to-bottom | reflow |
| C (1310) | C | node.boundingBox | [ ] | Left-to-right | reflow |
| D (1312) | D | node.boundingBox | [ ] | Left-to-right | reflow |
| B (1308) | B | node.boundingBox | [BB] | Top-to-bottom | scale |
| BB (1314) | Null | <see note below> | [E, F, G] | Top-to-bottom | scale |
| E (1316) | E | node.boundingBox | [ ] | Left-to-right | scale |

| Panel | Node | Box | Subpanel | Direction | Action |
|---|---|---|---|---|---|
| F (1318) | F | node.boundingBox | [ ] | Left-to-right | scale |
| G (1320) | G | node.boundingBox | [ ] | Left-to-right | scale |

Panel AA's bounding box defines a rectangle that sits flush around subpanels A and B. This is roughly indicated by broken line 1350 (though the actual bounding box rectangle sits flush with the extents of subpanels A and B). Similarly, panel BB's bounding box defines a rectangle that sits flush around subpanels E, F, and G. This is roughly indicated by broken line 1352 (though the actual bounding box rectangle sits flush with the extents of subpanels E, F, and G).

Panels A, C, D, E, F, and G are element panels as each defines a node which (in turn) defines an element.

From this dataset, the following information regarding the design in question can be discerned. The design includes a single row of elements (defined by panel AA).

The single row defined by panel AA itself has two columns (defined by panels A and B respectively).

The column defined by panel A is defined by an element (node 402—i.e. panel A's node's element). Panel A defines a nested element group in which node 402 wholly contains elements 404 and 406 (the elements defined by the nodes of panel A's children panels C and D).

The column defined by panel B does not define an element and, therefore, the element sin this column are not nested within another element. The elements in this column are 408, 410, and 412 (as defined by panel B's descendant panels E, F, and G). Elements 408, 410, and 412 define a partial overlap group.

When reflowing the design, the columns defined by panels A and B can be separated. This is due to the 'reflow' action defined by panel AA. For example, if the design was to be reflowed to a screen or window that is too small to position the columns defined by panels A and B side by side, panel B can be moved (as a whole, with all descendant panels and the elements they ultimately define) to be positioned (e.g.) below panel A.

When reflowing the design, the elements defined by panel A can, if need be, be reflowed.

When reflowing the design, the elements in the column defined by panel B cannot be reflowed (due to the scale action defined by panel B). Accordingly, column B needs to be resized, all descendant nodes (and their elements) needs to be uniformly scaled. I.e. the partial overlap group including 408, 410, and 412 is uniformly scaled as a whole.

The present disclosure is described with reference to specific data structures (e.g. nodes and panels). Alternative data structures are possible. Relevantly, however, the data structures described ultimately serve to define groups and order of a design's elements. With this, and the example data structures described above, in mind, the following terminology may be adopted.

A node may be referred to as defining a design element. This occurs when the node defines an element via the node's element property (and, therefore, will be an element-type node). One example of this is node C of FIG. 8, which corresponds to element 404 of design 400.

A node may be referred to as being the parent of a group of one or more design elements. This occurs when a node (the parent node) has descendant nodes which define design elements. Descendant nodes may be direct descendants (i.e. children defined in the parent node's children property) or indirect descendants (i.e. grand children etc.). One example of this is node B of FIG. 8, which has descendant (in this case direct children) nodes E, F, and G (which correspond to design elements 408, 410, and 412 respectively). Accordingly, node B may be referred to as defining the group of elements 408, 410, and 412.

A node may define a design element and also parent a group of design elements. One example of this is node A of FIG. 8, which: defines element 402 and parents elements 404 and 406 (via its descendant nodes C and D).

A panel may be referred to as defining to a node. This occurs where the panel defines a node via its node property.

A panel may be referred to as being the parent of a group of nodes. This occurs when a panel (the parent panel) has descendant panels (direct or indirect descendants, defined via use of a panel's subpanel property) that define (via their node properties) nodes.

A panel may be referred to as defining a design element (e.g. an element panel). This occurs where the panel defines a node and that node is an element-type node that defines a design element. An example of this is panel G of FIG. 13. Panel G defines node G and node G defines element 412.

A panel may be referred to as being the parent of a group (or band) of design elements. This occurs when a parent panel's descendant panels define nodes, and those nodes define design elements. An example of this is panel B of FIG. 13. Panel B has descendant panels E, F, and G. Panels E, F, and G respectively define element-type nodes E, F, and G. In turn, element-type nodes E, F, and G respectively define design elements 408, 410, and 412. Accordingly, panel B (or, indeed, panel BB) may be referred to as the parent of the group of elements 408, 410, and 412.

Design Hierarchy Flattening

The hierarchical representation of the design generated by method 500 (and returned at 522) can be processed to determine a reading order of the design elements. As discussed above, the reading order in the present examples is consistent with written English language, that is left-to-right, top-to-bottom.

Figure 20:
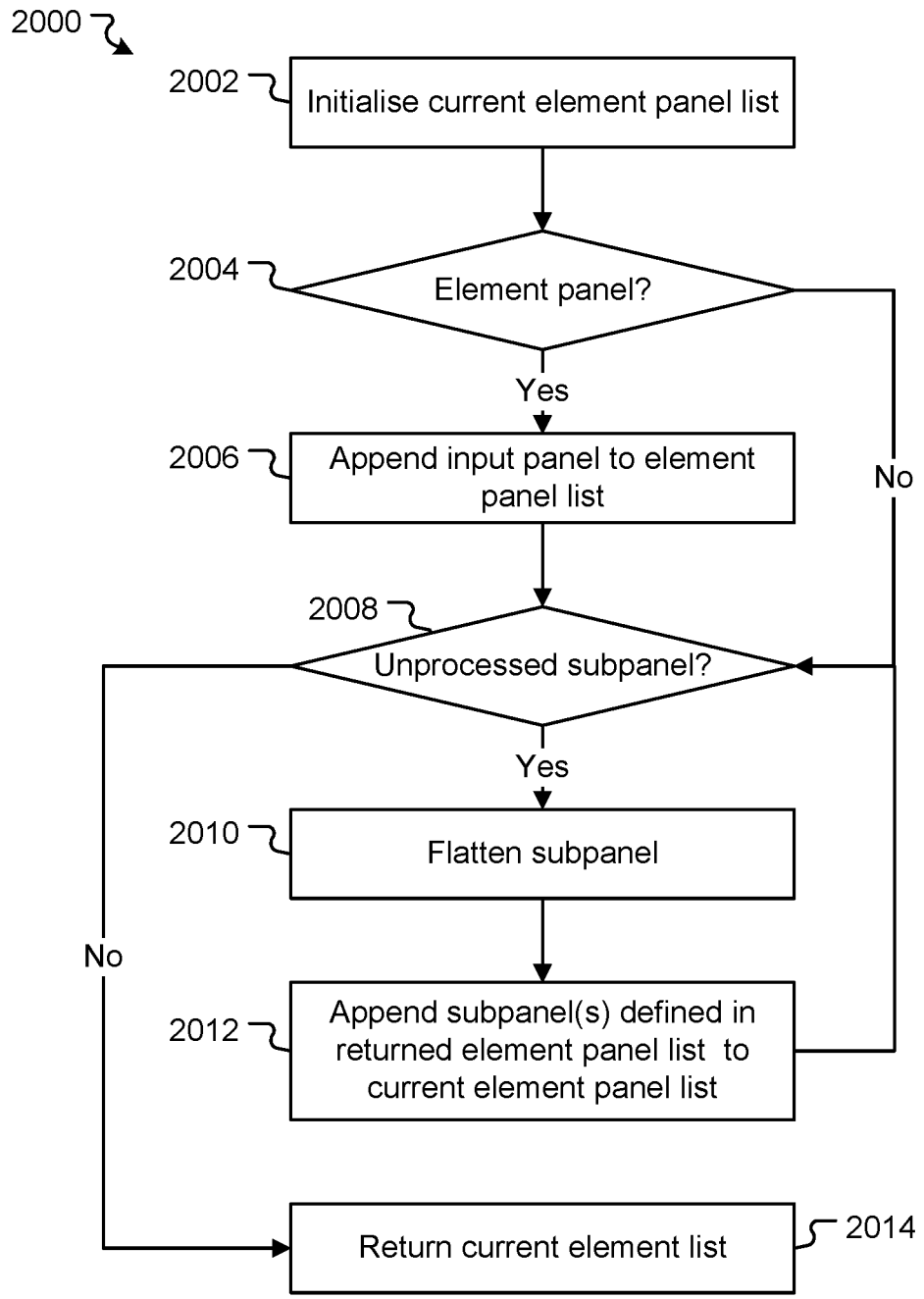
FIG. 20 is a flowchart depicting operations performed to flatten a hierarchical representation of a design.

Turning to FIG. 20, a method 2000 for flattening a hierarchical representation of a design (generated, for example, by method 500). This method may be used, for example, to determine the reading order of a design's elements. It may also be used in other downstream processing of hierarchical design representations (whether reflowed according to a reflow method such as 1400 or otherwise). One example of this is the flattening performed at 1604 of a webpage data generation process 1600 (described below).

Generally speaking, method 2000 operates to flatten the hierarchical representation of the design by performing a depth-first traversal of the panels and removing 'structural' panels (e.g. panels which assist in defining the hierarchy but do not themselves define elements) encountered along the way. Given this, method 2000 will be referred to as a flatten method (and processing performed in accordance with method 2000 a flatten process).

Method 2000 takes as input a panel (referred to as the input panel). E.g.:

Flatten(Panel panel){ }

When initially called, the input panel to method 2000 is a root panel (that defines a hierarchical representation of an entire design page).

At 2002, module 204 initialises an element panel list. This will be referred to as the current element panel list. Any data type that preserves order may be used for the element panel list.

At 2004, module 204 determines if the input panel is an element panel. As has been described, the input panel will be an element panel if it directly defines an element (e.g. via the panel.node.element chain).

If the input panel is an element panel, module 204 appends the input panel to the end of the panel list at 2006 before processing proceeds to 2008. If the input panel is not an element panel, processing proceeds directly to 2008.

At 2008, module 204 determines if the input panel defines any subpanels that have not been processed. If so, processing proceeds to 2010. If any/all subpanels of the input panel have been processed, processing proceeds to 2014.

At 2010, module 204 selects the next input panel subpanel for processing. Subpanels are selected in the order they are defined in the input panel's subpanel list.

At 2012, module 204 recursively calls a new flatten process with the selected subpanel as input.

The recursively called flatten process returns an element panel list (referred to as the returned element panel list). At 2014, module 2012 appends all panels defined in the returned element panel list to the end of the current element panel list. The order of any panels in the returned element panel list is preserved when appending those panels to the end of the current element panel list. Processing then returns to 2008.

At 2014, all subpanels of the input panel have been processed and the current element list is returned.

The element panel list returned from the initially called flatten process (i.e. the flatten process called on a root panel) provides the reading order list of the elements of the design represented by that root panel: i.e. the element defined by the first panel in the list is the first element in the reading order, the element defined by the second panel in the list is the second element in the reading order and so forth.

Reflowed Design Dataset Generation

Figure 14:
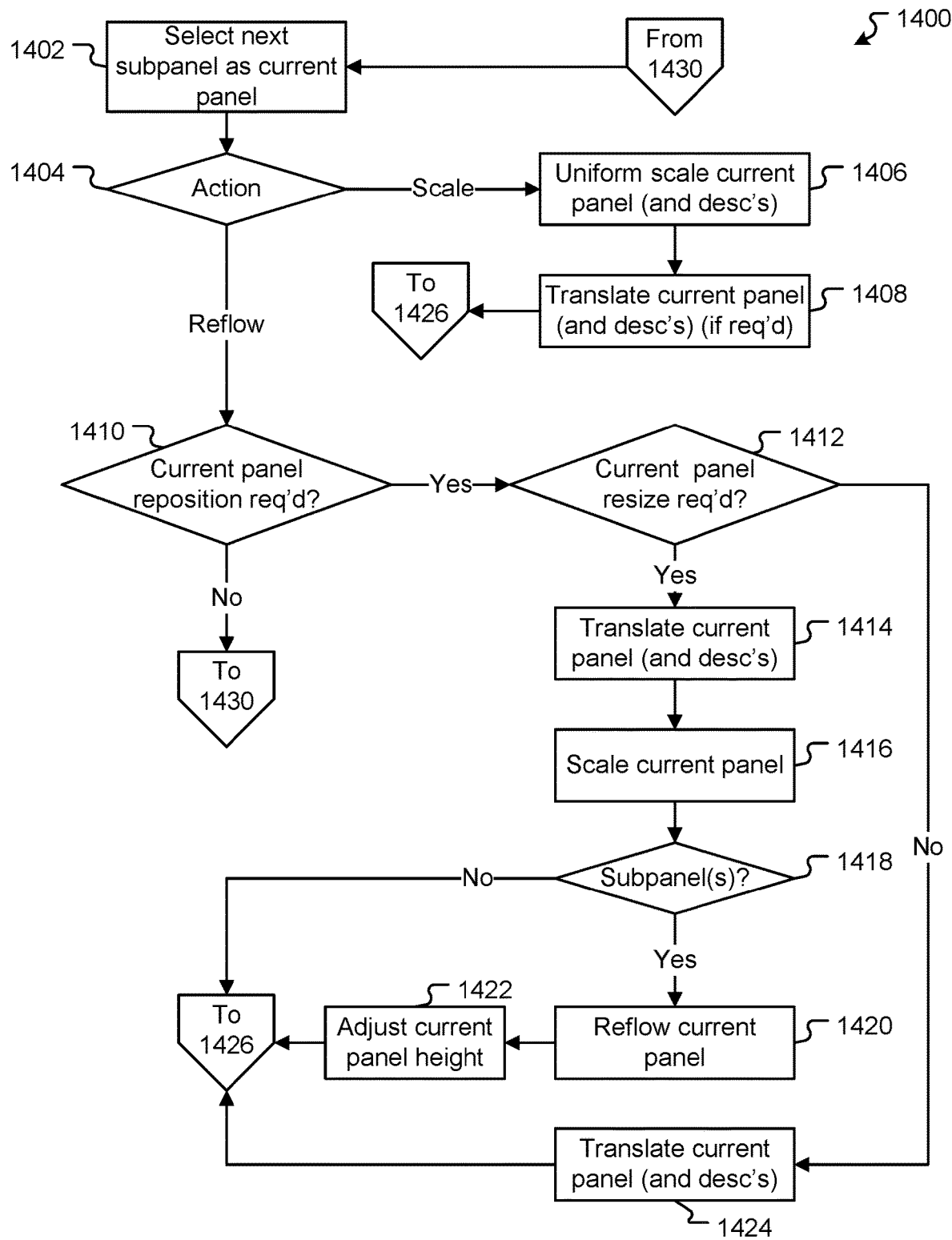
FIG. 14 is a flowchart depicting operations performed to generate a reflowed design dataset.
Figure 14:
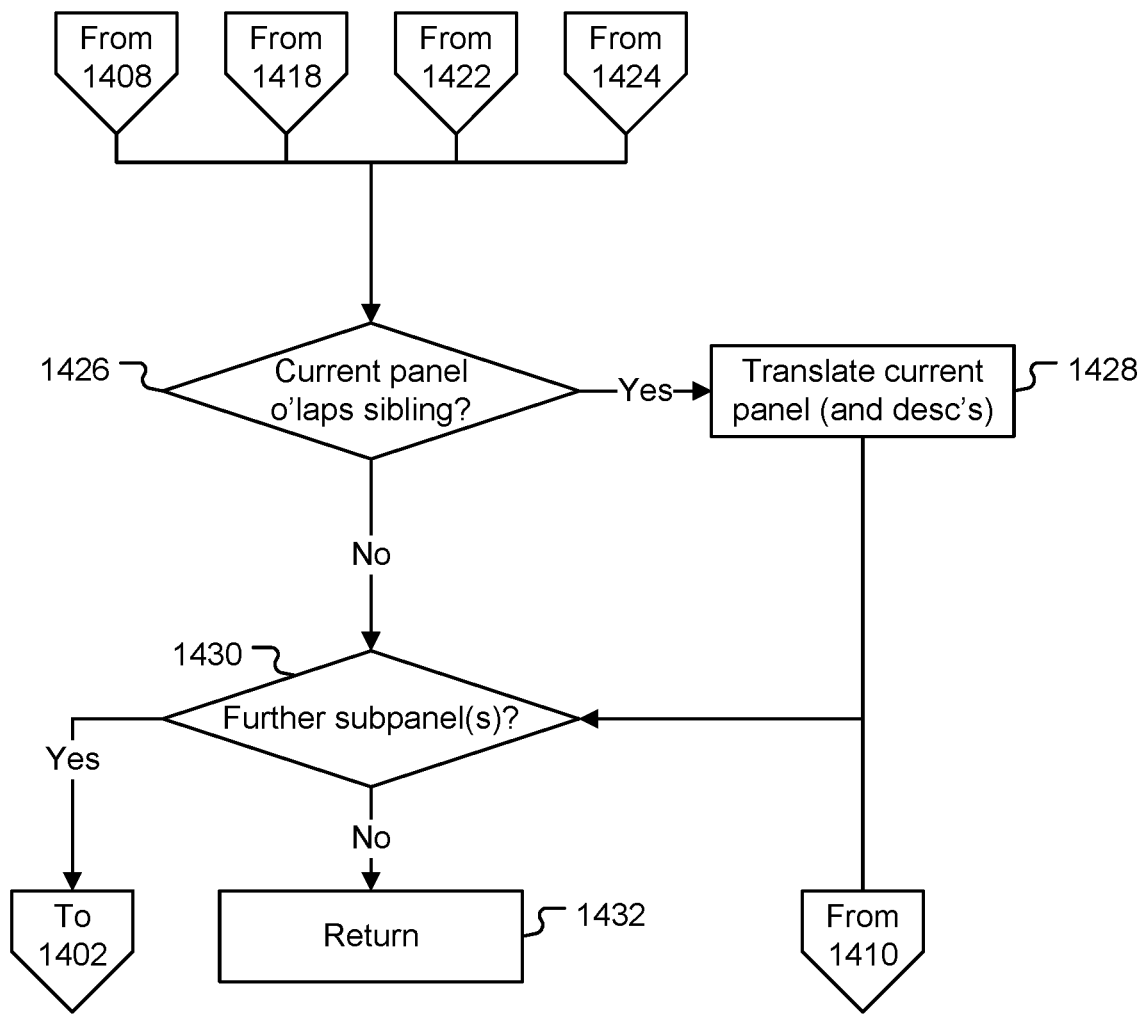

Turning to FIG. 14, a method 1400 for reflowing a design (in particular a design page) to generate a reflowed design dataset will be described. Reference to a reflow process 1400 can be considered reference to a process performed in accordance with method 1400. The operations of method 1400 will be described as being performed by the reflow module 206 (shortened to module 206 in this section for brevity).

In the present examples, method 1400 operates to reflow a design for display in a vertical scrolling context and with a left-to-right reading order. This will be referred to as the reflow context. One example of such a context is a webpage or document where the design will be displayed in an application window that has a maximum width (which may depend on the device or display on which the application is running) but no maximum height (as the design can be vertically scrolled within the application window).

Over the course of method 1400, a number of operations are performed that involve directional (e.g. right and left) and/or dimensional (e.g. horizontal and vertical) considerations. In particular, reference is made to first and second dimensions, first and second dimension sizes, and first and second panel edges. Example operations are described with reference to the reflow context described above—e.g. a vertical scrolling context with a left-to-right reading order. In this reflow context: the first dimension is the horizontal (x) dimension; the second dimension is the vertical (y) dimension; a panel's first dimension size is its width; a panel's second dimension size is its height; a panel's first edge is its right edge; and a panel's second edge is its left edge.

Method 1400 may, however, be adapted for an alternative reflow context. For example, method 1400 may be adapted to reflow a design for display in a horizontal scrolling context (e.g. where a design is to be displayed in an application window has a maximum height but scrolls horizontally and, therefore, has no maximum width).

The data input or otherwise accessible to method 1400 includes a design hierarchy (as generated, for example, by processing a design in accordance with method 500) and a target size.

As described above, in the present examples the design hierarchy generated by method 500 is a set of panels. The set of panels includes a root panel from which all other panels are descendant (directly or indirectly).

The target size input generally defines the maximum size of a window or page that the design is being reflowed to fit in. In the present examples (where method 1400 is reflowing a design for a vertical scrolling context), the target size defines a maximum width for the reflowed design. For example, if the target size is 100 (e.g. pixels), and a panel's right edge is sitting at 101 (pixels), that panel does not fit and must be resized. As discussed below (with reference to rendering and method 1600), the target size may be defined via a screenSize object (e.g. it may be the numColumns property of a particular screenSize object).

More generally, the target size may be considered to define a working first dimension size—i.e. the size (e.g. in pixels) available to position panels (and therefore design elements) in. In the present reflow context, the first dimension is horizontal and, therefore, the target size provides a working width.

In the present embodiments, the target size is provided as an input to method 1400. Alternatively, however, method 1400 may be configured with defined (or default) target size data. As described further below, method 1400 may be performed on the same design multiple times, each time with a different target size, and therefore generating a different set of reflowed design data corresponding to the target size.

By way of example, therefore, process 1400 may be defined as follows:

reflow (Panel parent, Integer target_Size) { }

Over the course of the reflow process, module 206 generates a reflowed design dataset by updating the input panels. Typically, therefore, method 1400 will operate on a copy of an original set of panels (or generate a copy over the course of its operation) so the original set of panels (e.g. the final hierarchy generated in accordance with method 500) remains available. Accordingly, the output of the reflow process is a hierarchal design representation (e.g. a set of panels) resized according to the target size input.

Generally speaking, updating the input dataset to generate the reflowed dataset involves resizing and repositioning panels of the input dataset (by modifying relevant data points of the panel bounding boxes). For a given target size and input dataset, the reflowed design dataset includes a set of resized panels that correspond to the original panels determined for the design (e.g. as defined by the input final order and group data), excepting that where necessary the size and position data for each panel (defined, in the present examples by a panel's bounding box property) will have been adjusted so that the panel—and, therefore, the design element(s) the panel ultimately corresponds to—fits and is positioned within the target size.

Method 1400 (or processing in accordance with method 1400) may be triggered in various ways. Examples are described below with reference to FIG. 23 (e.g. at 2310), and FIG. 25 (e.g. at 2510). It will be appreciated, however, that method 1400 may be triggered in various other ways, as a result direct user input and/or another application or process that calls (or itself implements) method 1400 in order to generate reflowed design data.

When method 1400 is initially triggered, the parent input will be a copy of the root panel of the hierarchical representation of the design being processed. The root panel copy will be the same as the root panel as originally generated, however its bounding box data is modified so its width is set to the numColumns value of the target size input.

Reflow method 1400 operates by processing each subpanel of the input parent panel in turn. Accordingly, at 1402, module 206 selects the first subpanel of the parent (as defined in the parent's subpanel property). The subpanel selected at 1402 will be referred to as the current panel.

At 1404, module 206 determines whether the action of the current panel (defined by the current panel's action property) is the 'scale' action (in which case processing proceeds to 1406) or the 'reflow' action, in which case processing proceeds to 1410.

Generally speaking, where the current panel's action is scale module 206: uniformly scales the current panel (and any descendant panels) to fit within the parent panel (if required) (at 1406); and, if required, translates the current panel so it is right-justified with the parent panel (and translates any dependent panels commensurately) (at 1408). These operations may generally be referred to as the scale action process. Each of these operations will now be described in detail.

At 1406, and if required, module 206 uniformly scales the current panel (i.e. so the aspect ratio of the current panel is maintained) so it will fit within the parent panel. In the present reflow context, this involves uniformly scaling the current panel so its width fits within the parent panel's width.

More generally, however, module 206 uniformly scales the current panel at 1406 so its first dimension size is less than or equal to the first dimension size of the parent panel.

Module 206 may be configured to perform this operation in various ways. In the present embodiments, module 206 initially calculates a uniform scaling factor to be applied to the current panel. The scaling factor is calculated based on the widths of the current and parent panels. Based on that uniform scaling factor width, module 206 calculates a new height and a new width for the current panel—e.g.:

currentPanel new height=currentPanel height*uniform scaling factor currentPanel new width=currentPanel width*uniform scaling factor.

The current panel's new width and height are then saved (e.g. by writing the relevant values to the current panel's bounding box property).

In the present embodiments, module 206 is configured to calculate the uniform scaling factor with reference to a scaling margin.

In these embodiments, where the panel being scaled corresponds to a node (e.g. its node property defines a node) the scaling margin is set so that when the current panel is scaled it will fit within the parent panel with a margin. Allowing for a margin will typically result in reflowed designs being more aesthetically pleasing. In this case, module 206 may calculate the scaling margin in various ways. For example, module 206 may calculate the scaling margin as a percentage of the parent panel's width (e.g. scaling margin=parent panel width*x). Any appropriate value for x may be used, e.g. 0.05 or an alternative value. Alternatively, module 206 may be configured to use a predefined constant scaling margin value (e.g. x pixels regardless of the parent panel's width), or a predefined scaling margin that is based on the target size (e.g. if target size is between a and b, a scaling margin of c is used; if target size is between d and e, a scaling margin off is used, etc.).

In the present embodiments, where the panel being scaled is a holding panel (which will be the case if the panel's node property is null), the scaling margin is zero.

Where a scaling margin is taken into account, module 206 may, for example, calculate the uniform scaling factor as:

uniform scaling factor=(parent panel width−scaling margin)/current panel width.

In the present implementation, module 206 is configured so the scaling factor is capped at 1. This means that if the current panel's width already fits within the parent panel's width (with a margin, if implemented) the current panel will not be enlarged. A similar result could be achieved by initially determining whether the current panel's width is less than or equal to the (parent panel width−scaling margin) and, if so, skipping the scaling operation.

In addition to uniformly scaling the current panel at 1406 (if required), module 206 also scales the current panel's descendant panels (if any) commensurate with the scaling of the current panel 1406. To do so, module 206 traverses the descendants of the current panel (i.e. the current panel's subpanels (if any), the subpanels of those subpanels, etc.) and scales each descendant panel. Each descendant panel is scaled using the uniform scaling factor calculated for the current panel. Further, each descendant panel is scaled about the current panel's origin (i.e. (originX, originY) coordinates). This ensures that the current panel and its descendant panels are, effectively, scaled as a single object and relative positioning between the current panel and its descendants is maintained.

At 1408, module 206 determines if the current panel needs to be repositioned and, if so, translates the current panel (and any descendant panels).

Module 206 determines that the current panel needs to be repositioned if the current panel (or part thereof) is positioned outside the parent panel. In the current reflow context, module 106 will determine that the current panel needs to be repositioned if its right edge is outside the right edge of the parent panel. E.g. if (parentPanel originX+parentPanel width)<(currentPanel originX+currentPanel width).

More generally, module 206 determines that the current panel needs to be repositioned if a first edge of the current panel is positioned beyond a corresponding first edge of the parent panel. In the current reflow context, the first edge is the right edge.

If the current panel does need to be repositioned, module 206 translates the current panel so it is positioned within the parent panel. In the present reflow context, this involves horizontally translating the current panel so its right edge is positioned on within the right edge of the parent panel. This will be referred to as right-justifying the current panel.

More generally, at 1408 (and if required) module 206 translates the current panel (and any descendant panels) in the first dimension so its first edge is positioned on or inside of (e.g. is justified with) the corresponding first edge of the parent panel. In the current reflow context the first dimension is horizontal and the first edge is the right edge.

Module 206 may be configured to right-justify the current panel by, for example, calculating a translation distance then subtracting the translation distance from the current panel's originX value. In this case the translation distance is calculated in order to position the current panel's right edge inside the parent panel's right edge by a defined translation margin (which may be zero). This can be calculated as follows:

translation distance=(current panel originX+current panel width)−(parent panel originX+parent panel width)+translation margin In this example, module 206 is configured to allow for a translation margin. Where the current panel corresponds to a node, the translation margin may, for example, be the same as the scaling margin as discussed above (or a percentage thereof—e.g. ½ of that margin) or an alternative predefined or calculated margin value. In the present embodiments, if the current panel is a holding panel (i.e. does not define a node) the translation margin is 0.

In addition to translating the current panel at 1408, module 206 also translates the current panel's descendant panels (if any). To do so, module 206 traverses the descendants of the current panel and translates each descendant panel by subtracting the translation distance calculated for the current panel from the descendant panel's originX.

Following 1408, processing proceeds to 1426.

At 1410, the action for the current panel is reflow. In this case, module 206 determines if the current panel needs to be repositioned. If so, processing proceeds to 1412 and what will be referred to as a reflow action process will be performed (generally involving operation blocks 1412 to 1424). If the current panel does not need to be repositioned, processing proceeds to 1430.

Module 206 will determine that the current panel needs to be repositioned if the current panel (or part thereof) is positioned outside the parent panel. As described above in relation to 1408, this may involve determining if the first (e.g. right) edge of the current panel is positioned beyond the corresponding first (e.g. right) edge of the parent panel. A margin may be taken into account in this determination—e.g. repositioning is required if the right edge of the current panel is positioned beyond a position defined by the right edge of the parent panel minus a margin value. The margin value may be the same as the translation margin described above (or an alternatively defined or calculated value). The margin value may be 0 if the panel is a holding panel (i.e. does not define a node).

At 1412, the current panel needs to be repositioned. In this case, module 206 determines if the current panel also needs to be resized. If the current panel does need to be resized, processing proceeds to 1414. Otherwise processing proceeds to 1422.

In the present reflow context, module 206 determines that the current panel needs to be resized if its width plus a margin value is greater than the parent panel's width. The margin may be the same as the scaling margin described above or an alternative predefined or calculated margin value. Once again, if the current panel is a holding panel (i.e. does not define a node) the margin is 0.

More generally, at 1412 module 206 determines that the current panel needs to be resized if the first dimension size of the current panel is greater than the first dimension size of the parent panel—the margin value. In the present reflow context, the first dimension is the horizontal (x) dimension and a panel's first dimension size is its width.

At 1414, the current panel: has a reflow action (determined at 1404); is positioned outside the parent panel (determined at 1410); and does not fit within the parent panel (determined at 1412). In this case, module 206 translates the current panel (and translates any dependant panels commensurately) (at 1414), scales the current panel (at 1416), and recursively reflows the current panel (at 1420) (if required).

At 1414, module 206 translates the current panel to position it within the parent panel. In the present reflow context, this involves translating the current panel so that its left edge is positioned on within the left edge of the parent panel. This will be referred to as left-justifying the current panel.

More generally, at 1414 module 206 translates the current panel in the first dimension so its second edge is positioned on or inside of (e.g. is justified with) the corresponding second edge of the parent panel. The second edge is opposite the first edge. In the current reflow context the first dimension is horizontal and the second edge is the left edge.

Module 206 may, for example, be configured to left-justify the current panel by calculating a translation distance and subtracting this from the current panel's originX value. In this case the translation distance is calculated in order to position the current panel's left edge inside the parent panel's left edge by a defined translation margin (which may be zero). This can be calculated as:

translation distance=current panel originX−parent panel originX−translation margin As with the translation operation described at 1408 above, this example involves allowing for a translation margin. This may be the same as the translation margin described above or an alternative defined or calculated value. In the present embodiments, if the current panel is a holding panel (i.e. does not define a node) the margin is 0.

In addition to translating the current panel at 1414, module 206 also translates the current panel's descendant panels (if any). To do so, module 206 traverses the descendants of the current panel and translates each descendant panel by subtracting the translation distance calculated for the current panel from the descendant panel's originX.

At 1416, module 206 scales the current panel to fit within the parent panel. Unlike the uniform scaling performed at 1406, scaling at 1416 need not be uniform (e.g. it may be a non-uniform scaling operation in which the panel's aspect ratio is not maintained). In the present reflow context, module 206 scales the current panel at 1416 by setting its width to:

Current panel new width=parentPanel width−scaling margin

In this example a scaling margin is used. The scaling margin may be the same as the scaling margin discussed at 1406 above or any other appropriate defined or calculated value. In the present embodiments, if the current panel is a holding panel the margin is 0.

More generally, at 1416 module 206 scales the current panel so its first dimension size is less than (or, if no scaling margin is provided, less than or equal to) the first dimension size of the parent panel.

In the present examples, if the current panel defines a node module 206 also calculates a new height for the current panel at 1414. In the present embodiments, the new height for the current panel is calculated to be proportionate to the current pane's new width. E.g.:

Current panel new height=current panel original height*(current new width/current original width)

More generally, if the current panel defines a node, at 1416 module 206 adjusts the current panel's second dimension size proportionally to the adjustment made to its first dimension size. In the present reflow context, the first and second dimensions are the horizontal (x) and vertical (y) dimensions respectively, and a panel's first and second dimension sizes are its width and height respectively.

In the present embodiments, if the current panel does not define node it must define one or more subpanels. Given this, module 206 does not calculate a new height (or, more generally, second dimension size) at 1416. The panel's height is, however, recalculated at 1422 (based on the heights of its subpanel(s)) as discussed below.

At 1418, module 206 determines if the current panel has one or more children (subpanels). If so, processing proceeds to 1420. If the current panel does not have any children, processing proceeds to 1426.

At 1420, module 206 recursively calls a new reflow process for the current panel. The inputs for the new reflow process called at 1402 are the current panel (which becomes the parent panel for the new reflow process) and the existing target size. E.g.:

reflow (currentPanel, target_size)

Once the new reflow process called at 1420 returns (noting that it may involve further recursion) processing proceeds to 1422. At 1422, and in the present reflow context, module 206 recalculates the current panel's height. Module 206 calculates the current panel's height by summing the heights of the current panel's subpanels.

More generally, at 1422 module 206 recalculates the current panel's second dimension size by summing the second dimension sizes of the current panel's subpanels. Processing then proceeds to 1426.

At 1424, the current panel: has a reflow action (determined at 1404); is positioned outside the parent panel (determined at 1410); and fits within the parent panel (determined at 1412). In this case, module 206 translates the current panel so it is within the parent panel (and translates any dependant panels commensurately). In the present reflow context, this involves right-justifying the current panel (for example as described above in relation to 1408).

More generally, at 1424 module 206 translates the current panel in the first dimension so its first edge is positioned on or inside of (e.g. justified with) the corresponding first edge of the parent panel. In the current reflow context the first dimension is horizontal and the first edge is the right edge.

At 1424, module 206 also translates the current panel's descendant panels (if any). This is also as described with reference to 1408 above.

Following 1424, processing proceeds to 1426.

At 1426, module 206 determines if the current panel overlaps a previous sibling panel. With the data structures of the present example, the previous sibling panel will be the subpanel of the parent panel that is defined immediately before the current panel in the parent panel's subpanel array (or list).

If there is no previous sibling panel, module 206 determines that the current panel does not overlap a previous sibling.

If there is a previous sibling panel, and in the present reflow context, module 206 determines if the current panel horizontally overlaps the previous sibling panel. This may be determined to be the case, for example, if:

(sibling panel originX+sibling panel width+horizontal separation gap)>(current panel originX)

In this example, module 206 is configured to require a gap (the horizontal separation gap) between horizontally adjacent panels. Any appropriate defined or calculated horizontal separation gap value may be used (including zero). For example, the horizontal separation gap may be set to the same value as the translation margin.

More generally, at 1426 module 206 determines if the current panel overlaps the sibling panel in the first dimension. In the present reflow context, the first dimension is the horizontal (x) dimension.

If, at 1426, the current panel does overlap a previous sibling panel, processing proceeds to 1428. If not, processing proceeds to 1430.

At 1428, the current panel overlaps a sibling panel. In this case module 206 repositions the current panel so it is positioned within the parent panel but does not overlap the sibling panel.

In the present reflow context, this involves translating the current panel horizontally so it is left-justified with the parent panel and vertically so it sits below the previous sibling. To do this module 206 may: calculate a horizontal translation distance; calculate a vertical translation distance; subtract the horizontal translation distance from the current panel's originX; and add the vertical translation distance to the current panel's originY.

The horizontal translation distance may be calculated as described above in relation to 1414.

The vertical translation distance is calculated in order to position the current panel below the sibling panel and provide a separation gap between the two panels. This can be calculated, for example, as:

vertical translation distance=(sibling panel originY+ sibling panel height)−current panel originY+ vertical separation gap In this example a vertical separation gap is provided between the sibling panel and the current panel. Any appropriate vertical separation gap may be defined or calculated (or, if desired, no vertical separation gap need be provided). For example, the vertical separation gap may be set to the same value as the translation margin.

In addition to translating the current panel at 1428, module 206 also translates the current panel's descendant panels (if any). To do so, module 206 traverses the descendants of the current panel and translates each descendant panel by: subtracting the horizontal translation distance from the descendant panel's originX; and adding the vertical translation distance to the descendant panel's originY.

More generally, at 1428 module 206: translates the current panel (and any descendant panels) in the first dimension so its second edge is justified with the corresponding second edge of the parent panel; and translates the current panel in the second dimension so it is separated from the previous sibling panel in that dimension. In the current reflow context, the first dimension is horizontal, the second dimension is vertical, and the second edge is the left edge.

Processing then proceeds to 1430.

At 1430, module 206 determines whether the parent panel defines any further subpanels that have not yet been processed. If so, processing returns to 1402 to select the next panel. If not, processing proceeds to 1432.

At 1432, the current reflow process returns. In the present embodiments, module 206 returns a <target_size, Panel> key-value pair—the target_size indicating the target size used to generate the reflowed design dataset and the Panel being (or identifying) the root panel of the reflowed design dataset.

For ease of reference, numbers may be used to distinguish the various scaling and translation operations that may be performed in accordance with reflow method 1400. For example: the uniform scale operation performed at 1406 may be referred to as a first scaling (or first resizing) operation; the scale operation performed at 1416 may be referred to as a second scaling (or second resizing) operation; the resizing operation performed at 1422 may be referred to as a third resizing operation; the translation operation performed at 1408 may be referred to as a first translation (or first repositioning) operation; the translation operation performed at 1414 may be referred to as a second translation (or second repositioning) operation; the translation operation performed at 1428 may be referred to as a third translation (or third repositioning) operation; the translation operation performed at 1424 may be referred to as a fourth translation (or fourth repositioning) operation. It will be appreciated that in this sense the numbers used to distinguish the operations do not actually denote order. For example, in a given reflow process a particular panel cannot be both scaled at 1406 and scaled at 1416: with the example naming, therefore, a "second" scaling operation would be performed on that panel without a "first" scaling operation having being performed. As another example, in a given reflow process a given panel may be translated at 1424 and at 1428: with the example naming, therefore, the "fourth" translation operation (1424) would be performed before the "third" translation operation (1428).

Centre Aligning Reflowed Design Datasets

Over the course of method 1400 panels are edge-justified (e.g. left- and right-justified in the specific examples above). In certain embodiments, once a reflowed design dataset has been generated module 206 is configured to further process that dataset to centre align its panels (where appropriate). This assists in the automatic creation of a final design that will likely be more aesthetically pleasing.

Generally speaking, this involves processing each panel of a give reflowed design dataset to determine if it should be centre-aligned and, if so, centre-aligning that panel.

Figure 15:
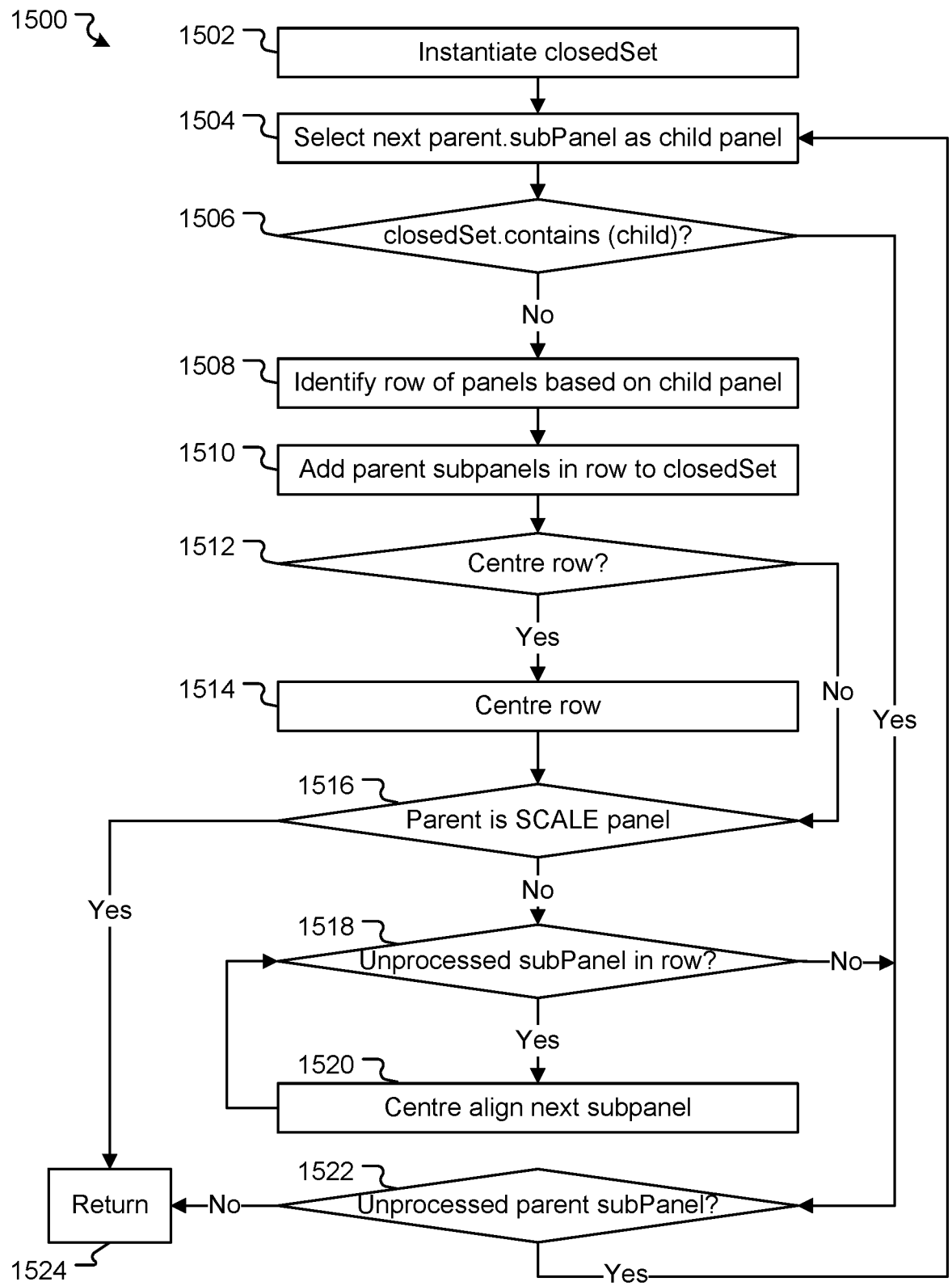
FIG. 15 is a flowchart depicting operations performed to centre align a reflowed design dataset.

FIG. 15 provides an example method 1500 for centre aligning the panels (if required) of a reflowed design dataset. Reference to a centre aligning process 1500 can be considered reference to a process performed in accordance with method 1500.

Method 1500 takes as input a parent panel—e.g.:
centreAlignPanels(Panel parent) { }

When method 1500 is initially invoked, the parent panel is the root panel of a reflowed design dataset. Further, method 1500 is recursive and, therefore, a current centre align process 1500 may result in a new centre align process 1500 being called (at 1520). Method 1500 may also recursively call itself.

At 1502, module 206 instantiates a closed set of panels (closedSet). This set is populated over the course of method 1500 in order to avoid a subpanel being processed more than once.

At 1504, module 206 selects the next subpanel of the parent input panel. Subpanels of the parent panel may be processed in any order. The selected subpanel will be referred to as the child panel.

At 1506, module 206 determines if the child panel is in the closed set instantiated at 1502. If not, processing proceeds to 1508. If the child panel is in the closed set, it does not need to be further processed and processing proceeds to 1522.

At 1508, module 206 identifies a row of panels based on the child panel. The row of panels includes the child panel and any subpanels of the parent input panel that, collectively, vertically overlap the child panel. Such panels may be determined, for example, using a similar method to that described above with reference to FIG. 11.

At 1510, module 206 adds any subpanels in the row identified at 1508 to the closed set. This guards against future processing loops processing the same subpanel twice.

At 1512, module 206 determines if the row of panels identified at 1508 should be centred. If so, processing proceeds to 1514. If not, processing proceeds to 1516.

In the present embodiment, module 206 determines that a row of panels should be centred unless all panels of the row define elements which are left-aligned text. Additional and/or alternative centring criteria may be applied.

At 1514, module 206 centres the row of panels within the parent panel. In the present embodiments this involves: calculating a bounding box that fits around the entire row of panels then determining the horizontal translation value that is required to align the centre of that bounding box with the centre of the parent's bounding box. Once this translation value has been calculated, each individual panel in the row of panels is translated by adding the translation value to the panel's originX value. Processing then proceeds to 1516.

At 1516, module 206 determines if the parent is a scale panel (e.g. the parent's action property value is 'scale'). If the parent is not a scale panel, processing proceeds to 1518. Otherwise, processing proceeds to 1524.

At 1518 and 1520, module 206 recursively processes each subpanel in the row identified at 1508.

Accordingly, at 1518 module 206 determines if there are any parent subpanels (excluding the child panel) in the row that have not yet been processed. If so, processing proceeds to 1520. If not, all subpanels in the row have been processed and processing proceeds to 1522.

At 1520, module 206 selects the next unprocessed subpanel in the row (row subpanels may be processed in any order) and recursively calls a new centre-align process on that subpanel. E.g.
centreAlignPanels(Panel selectedSubPanel)

Once the recursively called centre-align process returns, processing returns to 1518.

At 1522, module 206 determines if any subpanels of the parent input have not yet been selected for processing. If so, processing returns to 1504. Otherwise, processing proceeds to 1524.

At 1524, the centreAlignPanels process returns.

Webpage Data Generation

This section describes processing one or more design datasets to generate webpage data.

The techniques described in this section are in the particular context of processing reflowed design datasets as described above (each dataset being a hierarchical representation of a design). The techniques described may, however, be applied (or be adapted to be applied) to generate webpage data from any design dataset in which elements have defined size and position data. As one example, the techniques described in this section may be applied to an original design dataset as described above (without processing that dataset to generate a hierarchical representation or reflowed dataset first).

Further, the techniques described in this section are in the particular context of processing multiple design datasets, each dataset representing the same original design that has been reflowed for a different screen size. The techniques may, however, be applied (or be adapted to be applied) to a single design dataset.

When designing webpages, it is typically desirable to design the webpage in such a way that it can be displayed in windows of different widths. This allows the webpage to be displayed on different devices or systems with different sized screens (and/or systems which may allow a change in screen orientation and, therefore, the available width). It also allows the webpage to be dynamically resized as the size of the window in which the website is displayed changes—e.g. due switching between a portrait and landscape mode, manually adjusting a window size by drag handles or the like, or other window resizing operations.

Traditionally, web development has revolved around positioning elements either absolutely or relatively. Absolutely positioned elements have a fixed x & y coordinates, width and height. Absolutely positioned elements are essentially rendered in their own layer and any changes to these elements will not affect the layout of other elements. Relatively positioned elements, on the other hand, form a stream of content, whereby changes in the position and dimensions of an element affect other relatively positioned elements. Such elements are displayed inline, or as blocks, meaning they will be part of a stream of content, or break on to a new line as defined by a CSS (cascading style sheets) flow layout.

In the present scenario, however, the goal is to render an original design in which elements have been absolutely positioned (including, potentially, overlapping design elements) in a way that allows certain original elements (e.g. text) to reflow and affect the position of all other "absolutely" positioned elements in the browser.

Figure 16:
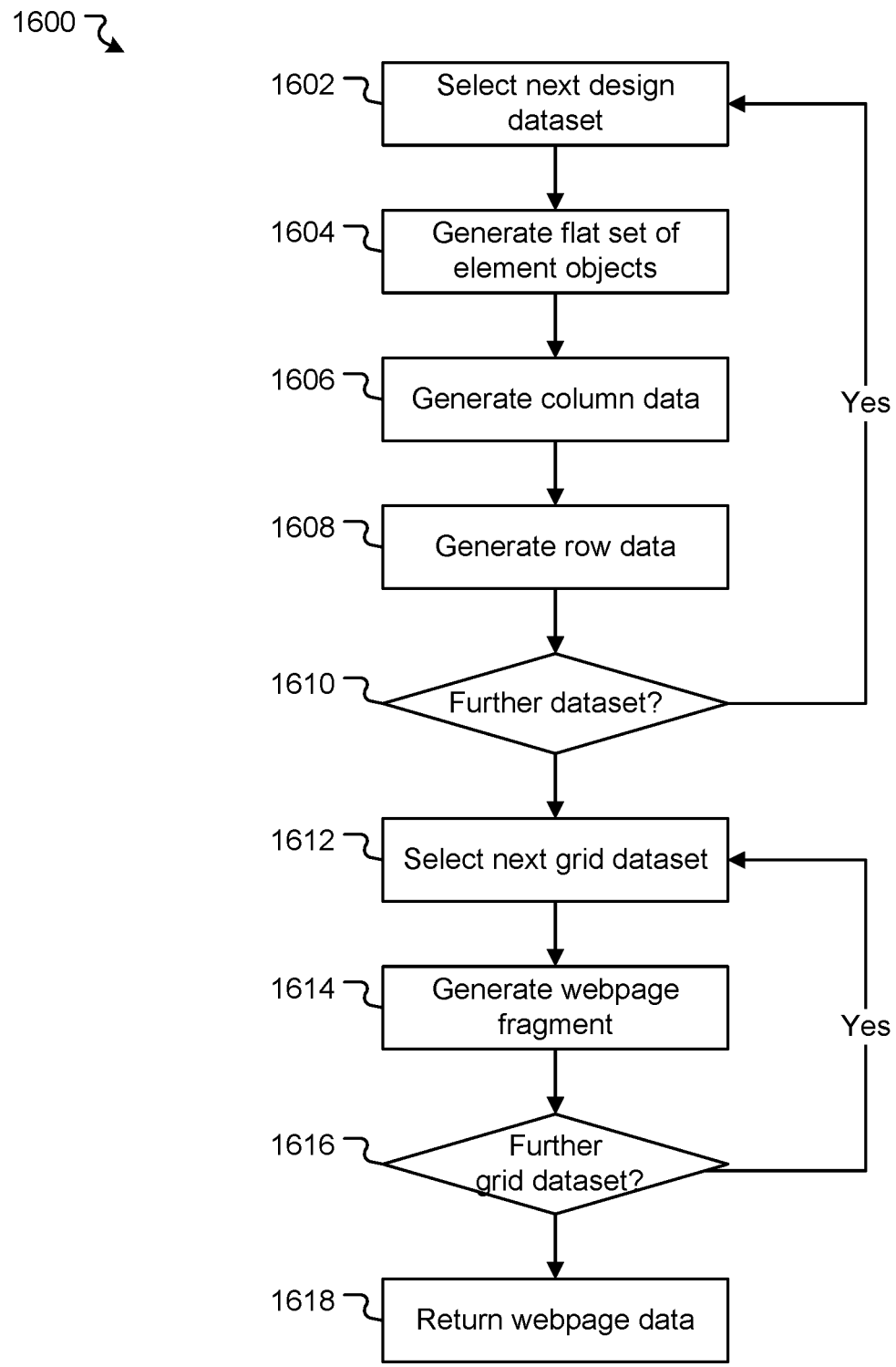
FIG. 16 is a flowchart depicting operations performed to generate webpage data.

FIG. 16 describes a webpage data generation method 1600. Method 1600 operates to process a set of design datasets. Each design dataset provides a representation of an original design that has been reflowed with reference to a particular size (e.g. a target size). The set of design datasets is processed to generate webpage data that can be used to display a webpage version of the original design at various widths. Reference to a webpage data generation process 1600 can be considered reference to a process performed in accordance with method 1600. The operations of method 1600 will be described as being performed by the rendering module 208 (shortened to module 208 in this section for brevity).

In this particular embodiment, method 1600 takes a set of reflowed design datasets (e.g. as generated in accordance with method 1400) as input, each reflowed design dataset generated using—and therefore associated with—a target size that corresponds to a particular range of screen (or window) sizes. As noted, however, method 1600 may be adapted to take one or more design datasets that have alternative structures or formats as input. Relevantly, each design dataset will define a set of design elements, each element associated with element size and position data (i.e. data allowing a design element's vertical and horizontal position to be determined). In the present embodiments, each dataset will also define a page height. Where reflowed design datasets are input, the page height for a reflowed design dataset will be defined by the height property of the reflowed dataset's root panel's bounding box.

In order to generate the set of reflowed datasets, a set of predefined screenSize objects may be defined. Each of these objects may be based on window sizes provided by common devices such as smartphone displays, tablet device displays, laptop displays, and external displays (monitors). Some displays may be associated with multiple common display sizes, e.g. where the display has a portrait and landscape orientation. By way of example, a screenSize object may take a format such as:

```
ScreenSize{
    Name name;
    Integer minWidthPx;
    Integer maxWidthPx;
    Integer numColumns;
}
```

In this example, the name of the screenSize provides a simple identifier for a given target size object. The min and maximum width properties together define a range of sizes (expressed in pixels in this example) that the screenSize object applies to. The numColumns property is used to define a target size value that can be used as input to a design reflow process such as 1400 described above. Depending on the screen size in question, the numColumns property may be the same as the maxWidthPx, but this need not be the case. For example, the numColumns property may be set to a value that provides for a margin (so when the reflowed design is displayed in a window of maxWidthPx width left and right margins are provided). In this case it may not be necessary to allow for further margins when reflowing the design as have been described in process 1400 above.

By way of specific example, predefined screenSize objects such as the following may be defined:

| Name | minWidthPx | maxWidthPx | NumColumns |
| --- | --- | --- | --- |
| EXTRA_SMALL | Null | 375 | 375 |
| SMALL | 376 | 480 | 480 |
| MEDIUM | 481 | 768 | 768 |
| MEDIUM_PLUS | 769 | 1024 | 1024 |
| LARGE | 1025 | 1366 | 1366 |
| EXTRA_LARGE | 1367 | null | 1366 |

In this example, the numColumns property of the EXTRA LARGE screenSize object is set to 1366 (the same as the numColumns property of the LARGE screen size). This effectively provides a maximum reflow width of 1366. A webpage may, of course, be displayed on a window that has a width greater than 1366, but in the present embodiments any window expansion beyond 1366 pixels will result in the left and right margins of the webpage expanding but no further expansion/reflowing of the design's elements.

Other screenSize objects (with alternative properties) may also, or alternatively, be defined.

By processing an original design (or the hierarchal representation thereof) according to method 1400 for each of these screen sizes (or, specifically, for target sizes as defined by the numColumns properties of each of these screenSize objects), a set of reflowed design datasets is generated. Where reflowed designs are generated in this way, they may (as one example) be stored in a map of <ScreenSize, design dataset> pairs. The design dataset in this case may be defined by the root panel of the reflowed design dataset as generated by method 1400.

Initially, method 1600 processes each design dataset that is input to generate a corresponding grid dataset (operations 1602 to 1610). Each grid dataset is then processed to generate a corresponding webpage fragment (operations 1612 to 1616). The webpage fragments are then combined into a single set of webpage data and returned. Each webpage fragment corresponds to a particular range of screen sizes and can be used by a web browser (or other application that can render webpage data) to render the design in a window having a size that falls within that range.

In particular, each grid dataset is generated to include data that can be used to define a CSS grid in which each design element is associated with a unique column start gridline, a unique column end gridline, a unique row start gridline, and a unique row end gridline. This is the case even if an element starts and/or ends on gridlines that have identical positions to gridlines that other elements start and/or end on.

Figure 17:
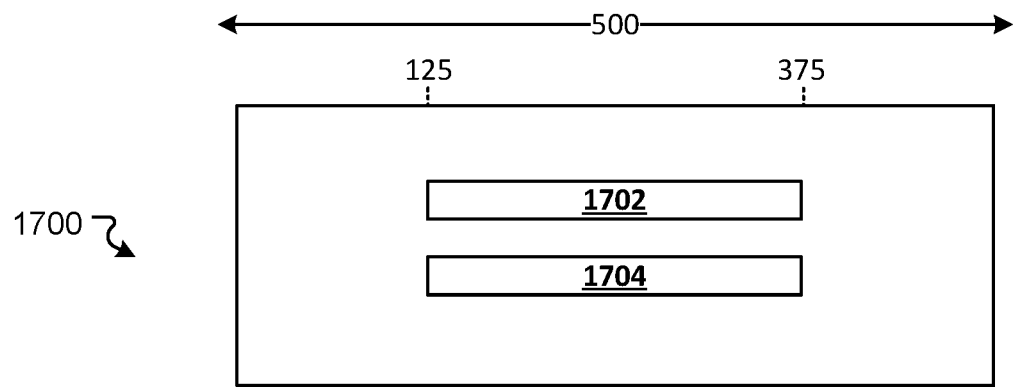
FIG. 17 depicts a further example design and example CSS grids for rending that design.
Figure 17:
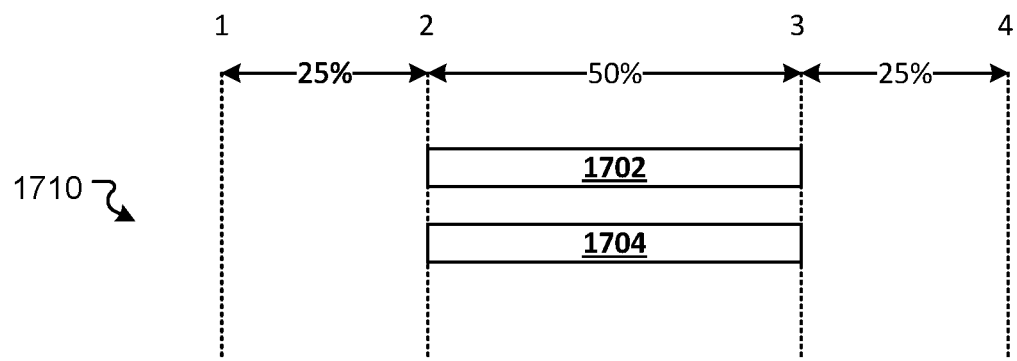
Figure 17:
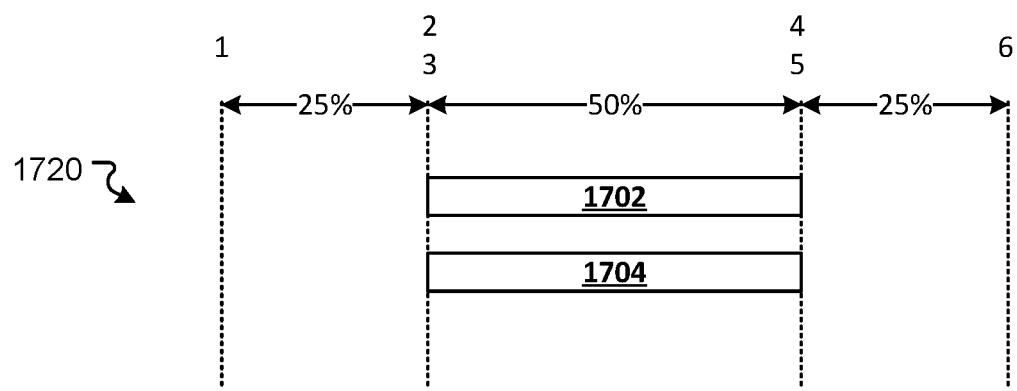

To illustrate this, consider an original design 1700 as depicted in FIG. 17. Original design 1700 has a width of 500 and includes first and second elements 1702 and 1704. Both the first and second elements of this example have an originX coordinate of 125 pixels and a width of 250 pixels (making each element's rightmost x coordinate 375 pixels). Elements 1702 and 1704 also have vertical size/position data but this is not relevant for the present illustration.

In a conventional CSS grid implementations, grid template columns such as the following could be generated (using % values for ease of illustration):

grid-template-columns: [1] 25% [2] 50% [3] 25% [4];

These columns are depicted at 1710 and provide a template with (all % being % of available screen width): column gridline 1 at 0%, column gridline 2 at (cumulatively) 25%, column gridline 3 at (cumulatively) 75%, and column gridline 4 at (cumulatively) 100%. The first and second elements would then be positioned as follows:

element1 {grid-column-start: 2; grid-column-end: 3;}
element2{grid-column-start: 2; grid-column-end: 3;}

In the present disclosure, however, a grid is created in which each element has a unique column start and a unique column end. In order to achieve this, the processing described operates to generate columns and rows with track sizes of 0 where required. Returning to the above example, in order to provide a grid for elements 1702 and 1704, columns such as the following could be generated:

grid-template-columns: [1] 25% [2] 0% [3] 50% [4] 0% [5] 25% [6];

These columns are depicted at 1720 and provide a template with: column gridline 1 at 0%, column gridline 2 at (cumulatively) 25%, column gridline 3 at (cumulatively) 25%, column gridline 4 at (cumulatively) 75%, column gridline 5 at (cumulatively) 75%, and column gridline 6 at (cumulatively) 100%. The first and second elements could then be positioned within the grid as follows:

element1 {grid-column-start: 2; grid-column-end: 4;}
element2{grid-column-start: 3; grid-column-end: 5;}

A similar approach can be used where elements share a common y-coordinate start and/or end.

In the present embodiments, each grid dataset is a set (in this example an array) of what will be referred to as element-grid records. In the present embodiments, each element-grid record includes the following properties:

```
{
    Element element;
    Number column Start;
    Number columnEnd;
    Number rowStart;
    Number rowEnd;
    Number columnStartOffset;
    Number columnEndOffset;
```

```
    Number rowStartOffset;
    Number rowEndOffset
}
```

In this example, the element property provides data in respect of the design element which is to be rendered. This may, for example, be the Element record from the original design, a subset of the data defined by that object, a reference/pointer to the element, or any other data that allows the element to be accessed and rendered.

The column start/end and row start/end properties identify gridlines that, in turn, define the position of the element within a CSS grid that will be generated to render the design at the defined screen size. These values are ultimately used to define the CSS grid-area attribute. To illustrate, consider an element-grid record with the following properties:

```
{
    ...
    columnStart: 2;
    columnEnd: 2;
    rowStart: 3;
    rowEnd: 4;
    ...
}
```

The grid area for an element defined by this element-grid record would become:

grid-area: 2/2/3/4;

Each offset property indicates the track size of the row or column that precedes the gridline the offset corresponds to. For example, the columnStartOffset indicates the track size of the column that precedes the gridline indicated by the columnStart value, while the rowEndOffset indicates the track size of the row that precedes the gridline indicated by the rowEnd value. In the present embodiments, column and row offsets are expressed as a fraction of the maximum width of the screenSize the element-grid record is associated with. For example if columnStart=3 and column startOffset=0.5, this would indicate that the column preceding gridline 3 (i.e. the column between gridlines 2 and 3) has a trackside that is half the maximum width defined by the screenSize.

Method 1600 may be triggered in various ways, an example of which is described below with reference to FIG. 25 (e.g. at 2512).

Generating Grid Datasets

As noted, method 1600 initially processes each input design dataset to generate a corresponding grid dataset. This processing is performed over operations 1602 to 1610.

At 1602, module 208 selects the next design dataset defined by the input. Where multiple design datasets are input, they may be processed in any order or in parallel. The selected design dataset will be associated with a maximum width. In the present embodiments this is via a screenSize object (as described above) that the dataset is associated with.

At 1604, module 208 processes the selected design dataset to generate a set (for example an array or alternatively defined set) of element objects. The set includes an element object corresponding to each element defined by the design dataset. Each element object defines (or allows identification of) a design element and that element's size and position.

In the present example, each input design dataset is a reflowed design dataset (e.g. a set of panels) that has been generated for a particular screen size in accordance with method 1400. A number of panels in such a reflowed design dataset may be considered structural panels, in the sense that they serve a grouping and/or hierarchy definition purpose only. Such structural panels are not needed for the webpage data generation process. Other panels in the set will, however, be element panels, which are relevant to method 1600. As has been noted, an element panel is a panel that defines a design element (via its panel.node.element chain) and that design element's size/position (noting that where a panel is an element panel its size and position (as defined by its bounding box) will match its corresponding element's size and position).

For a reflowed design dataset of this type, each element object is an element panel, and module 208 generates the flat set of element objects by flattening the panel hierarchy and removing structural panels. This may be achieved by processing the root panel according to flatten method 2000 as described above.

Where alternatively structured/formatted design datasets are input to method 1600, processing at 1604 may not be necessary.

At 1606, module 208 processes the flat set of element objects to generate column data. The column data is data which can be used to define a set of CSS grid columns and to associate each design element with its own unique start column gridline and unique end column gridline. With reference to the example element-grid record structure described above, the column data for a given element includes a columnStart value, a columnEnd value, a columnStartOffset value, and a columnEndOffset value. An example method for generating column data for a reflowed design is described below with reference to FIG. 18.

At 1608, module 208 again processes the flat set of element objects, this time to generate row data. The row data is data which can be used to define a set of CSS grid rows and to associate each design element with its own unique start row gridline and its own end row gridline. With reference to the example element-grid record structure described above, the row data for a given element includes a rowStart value, a rowEnd value, a rowStartOffset value, and a rowEndOffset value. Generation of row data is similar to generating column data and is also described below.

Following 1608, an element-grid record has been created for each design element and generation of a grid dataset corresponding to the (screen size, input dataset) selected at 1602 is complete. Accordingly, at 1610 module 208 determines if there are further (screen size, input dataset) inputs to be processed. If so, processing returns to 1602. If not, a grid dataset has been generated for each (screen size, input dataset) and processing proceeds to 1612.

Before describing generation of grid layouts corresponding to the grid datasets, column data generation (as performed at 1606) and row data generation (as performed at 1608) will be described.

Column Data and Row Data Generation

At 1606 and 1608, module 208 processes a set of element objects to generate, respectively, column data and row data for the design elements of those element objects.

Figure 18:
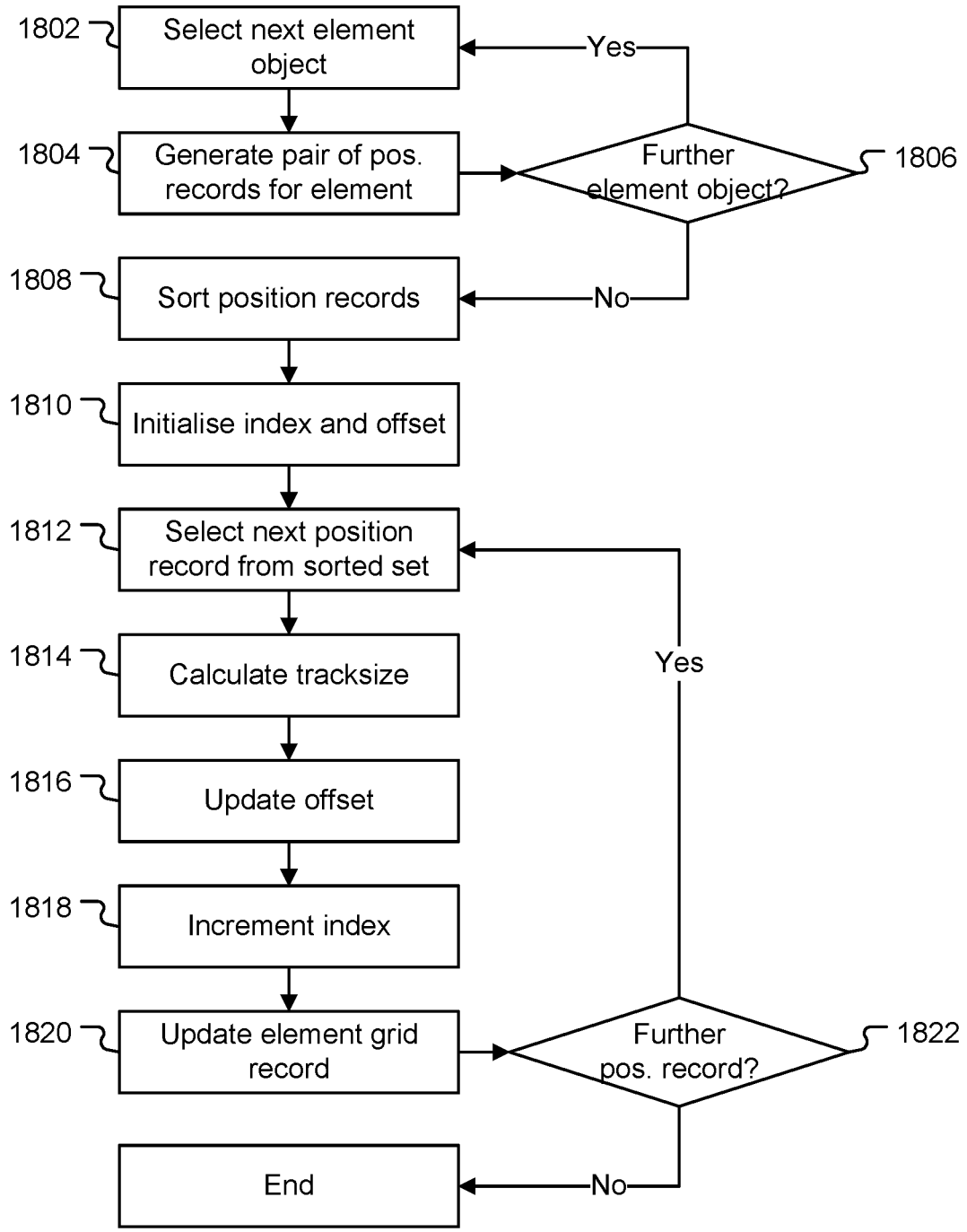
FIG. 18 is a flowchart depicting operations performed to generate grid column and grid row data.

An example method 1800 for generating either row or column data will be described with reference to FIG. 18. In the present embodiments, processing in accordance with method 1800 is performed twice. When called at 1606, method 1800 operates to populate element-grid records with column data (e.g. columnStart, columnEnd, columnStartOffset, and columnEndOffset). When called at 1608, method 1800 operates to calculate and populate the element-grid records with row data (e.g. rowStart, rowEnd, rowStartOffset, and rowEndOffset).

At 1802, module 208 selects the next unprocessed element object in the set of element objects. At this stage element objects may be processed in any order.

At 1804, module 208 generates two position records for the element defined by the selected element object and adds those records to a set of position records. In the present embodiments, each position record is a tuple that includes a position value and an element identifier. E.g.:

(Position, ElementID)

For a given element object, module 208 generates a start record defining the element's start position and an end record defining the element's end position.

Where column data is being generated, the element's start position is its left edge (the selected element object's originX value in this example) and the panel element's end position is its right edge (the selected element object's originX+width in this example).

Where row data is being generated, the element's start position is its top edge (the selected element object's originY value in this example) and the element's end position is its bottom edge (the selected element object's originY+height in this example).

At 1806, module 208 determines if any element objects have not yet been processed. If so, processing proceeds to 1802. Otherwise, processing proceeds to 1808.

At 1808, module 208 sorts the set of position records by their positions (minimum to maximum). Where column data is being generated, this serves to sort the position records by x position/coordinate. Where row data is being generated, this serves to sort the position records by y position/coordinate.

At 1810, module 208 initialises an index value (in this example to 1) and an offset value (in this example to 0).

Where column data is being generated, the index and offset values may be referred to as column index and column offset values. Over operations 1812-1822, the column offset value is used to calculate column track sizes (e.g. column widths) and the column index value is used to associate each element with a specific column start and column end gridline.

Where row data is being generated, the index and offset values may be referred to as row index and row offset values. Over operations 1812-1822, the row offset value is used to calculate row track sizes (e.g. row heights) and the row index value is used to associate each element with a specific row start and row end gridline.

At 1812, module 208 selects the next unprocessed position record from the sorted set of position records.

At 1814, module 208 calculates a track size based on the selected position record's position value.

In the present embodiments, the track size is calculated as a fraction of the maximum width defined by/associated with the design dataset being processed (e.g. the targetSize.maxWidthPx value where the design dataset is associated with a screenSize object). This calculation may, for example, be:

track size=(record's position/
targetSize·maxWidth*Px*)−offset

Where column data is being generated, the track size defines a column width between the position of the selected position record (which is an x position) and the offset value.

Where row data is being generated, the track size defines a row height between the position of the selected position record (which is a y position) and the offset value.

At 1816, module 208 updates the offset value by adding the track size calculated at 1812 to it (e.g. offset=offset+track size).

At 1818, module 208 increments the index by 1 (e.g. index=index+1). Once incremented, the index value serves to identify a gridline. When calculating column data, the gridline is a gridline that will be defined by adding a new column (in accordance with the calculated track size) to a CSS grid. When calculating row data, the gridline is a gridline that will be defined or by adding a new row (in accordance with the calculated track size) to a CSS grid.

At 1820, module 208 creates, if necessary, and updates an element-grid record that corresponds to the element defined by the currently selected position record.

If an element-grid record corresponding to the present element does not yet exist, a new element-grid record is created and added to the grid dataset being generated. The CSS record defines/identifies the element in question via the element property.

Where column data is being generated, if the columnStart property of the element-grid record corresponding to the selected position record has not yet been populated (e.g. is null), this indicates that the selected position record represents the start (e.g. left edge) of the element. In this case, the element-grid record's columnStart is set to the current index value (i.e. as incremented at 1818). This effectively ties the element's start edge to the new gridline. In addition, the element-grid record's columnStartOffset is set to the track size calculated at 1814. When generating a CSS grid, the columnStartOffset will define the width of the column that falls between the columnStart gridline and the preceding column gridline in the CSS grid.

Continuing with column data generation, an element-grid record if the columnStart property of the element-grid record corresponding to the selected position record has already been populated, this indicates that the selected position record represents the end (e.g. right edge) of the element. In this case, the columnEnd is set to the current index value (i.e. as incremented at 1818). This effectively ties the element's end (right) edge to the new gridline. In addition, the columnEndOffset is set to the track size calculated at 1814. When generating a CSS grid, the columnEndOffset will define the width of the column that falls between the columnEnd gridline and the preceding column gridline in the CSS grid.

Where row data is being generated, if the rowStart property of the element-grid record corresponding to the selected position record has not yet been populated (e.g. is null), this indicates that the selected position record represents the start (e.g. top edge) of the element. In this case, the element-grid record's rowStart value is set to the current index. This effectively ties the element's start edge to the new gridline. In addition, the element-grid record's rowStartOffset is set to the track size calculated at 1814. When generating a CSS grid, the rowStartOffset will define the height of the row that falls between the rowStart gridline and the preceding row gridline in the CSS grid.

Continuing with row data generation, if the rowStart property of the element-grid record corresponding to the selected position record has already been populated, this indicates that the selected position record represents the end (e.g. bottom edge) of the element. In this case, the element-grid record's rowEnd value is set to the current index value. This effectively ties the element's end edge to the new gridline. In addition, the rowEndOffset is set to the track size calculated at 1814. When generating a CSS grid, the rowEndOffset will define the height of the row that falls between the rowEnd gridline and the preceding row gridline in the CSS grid.

At 1822, module 208 determines if there are any unprocessed position records. If so, processing returns to 1812 to select and process the next position record. Otherwise generation of either row or column data is complete.

In the present embodiments, the offset values calculated over the course of method 1800 are calculated as fractions. In alternative embodiments offset values may be calculated as absolute values (i.e. without dividing the by the maximum width). In this case converting those absolute offset values to fractions may be performed when generating grid column and grid rows as discussed below (e.g. at 1904 and 1906).

Example Column Data Generation

To illustrate method 1800 in the context of generating column data, consider again design 1700 of FIG. 17 and assume a maximum width of 500 pixels. For design 1700, the set of position records generated over operations 1802-1806 may be as follows (E1 indicating element 1702 and E2 indicating element 1704):

{(125, E1); (375, E1); (125, E2); (375, E2)}

Sorting the position records at 1808 would then provide:

{(125, E1); (125, E2); (375, E1); (375, E2)}

In the first processing loop, record (125, E1) is selected (at 1812). For this loop the index is initially 1 and the offset is initially 0.

At 1814, a track size of 0.25 is calculated:

((record's position/width)−offset)=
((125/500)−0)=0.25.

At 1816, the offset is updated to 0.25:

offset+track size=0+0.25=0.25.

At 1818, the index is incremented to 2: index+1=1+1=2.

At 1820, a new element-grid record for element E1 is created and populated as follows:

```
{
    element: E1;
    columnStart: 2; // column index value
    columnEnd: null; // not yet determined
    ...
    columnStartOffset: 0.25; //calculated track size
    columnEndOffset: null; // not yet determined
    ...
}
```

In a second processing loop, record (125, E2) is selected (at 1812). For this loop the index is initially 2 and the offset is initially 0.25.

At 1814, a track size of 0 is calculated:

((record's position/width)−offset)=
((125/500)−0.25)=0.

At 1816, the offset is "updated" to 0.25:

offset+track size=0.25+0=0.25.

At 1818, the index is incremented to 3: column index+1=2+1=3.

At 1820, a new element-grid record for element E2 is created and populated as follows:

```
{
    element: E2;
    columnStart: 3; // column index value
```

```
        columnEnd: null; // not yet determined
        ...
        columnStartOffset: 0; //calculated track size
        columnEndOffset: null; // not yet determined
        ...
    }
```

In a third processing loop, record (375, E1) is selected (at 1812). For this loop the index is initially 3 and the offset is initially 0.25.

At 1814, a track size of 0.5 is calculated: ((record's position/width)−offset)=((375/500)−0.25)=0.5.

At 1816, the offset is updated to 0.75: offset+track size=0.25+0.5=0.75.

At 1818, the index is incremented to 4: index+1=3+1=4.

At 1820, E1's element-grid record is updated:

```
    {
        element: E1;
        columnStart: 2; // previously populated
        columnEnd: 4; // column index value
        ...
        columnStartOffset: 0.25; // previously populated
        columnEndOffset: 0.5; // calculated track size
        ...
    }
```

In a fourth processing loop, record (375, E2) is selected (at 1812). For this loop the index is initially 4 and the offset is initially 0.75.

At 1814, a track size of 0 is calculated: ((record's position/width)−offset)=((375/500)−0.75)=0.

At 1816, the offset is "updated" to 0.75: offset+track size=0.75+0=0.75.

At 1818, the index is incremented to 5: index+1=4+1=5.

At 1820, new column data is recorded. E2's element-grid record is updated:

```
    {
        element: E2;
        columnStart: 3; // previously populated
        columnEnd: 5; // column index value
        ...
        columnStartOffset: 0; // previously populated
        columnEndOffset: 0; // calculated track size
        ...
    }
```

As is described further below, the E1 and E2 element-grid records can then be used to define the set of columns as indicated at 1720 (not including the final column that represents the right margin):

grid-template-columns: [1] 25% [2] 0% [3] 50% [4];

Generating Webpage Data

Returning to FIG. 16, once the set of grid datasets has been generated, module 208 processes each grid dataset (which is associated with a particular screen size) to generate a corresponding webpage fragment. This processing is performed over 1612 to 1616.

At 1612, module 208 selects an unprocessed grid dataset. Grid datasets may be processed in any order, or in parallel.

Figure 19:
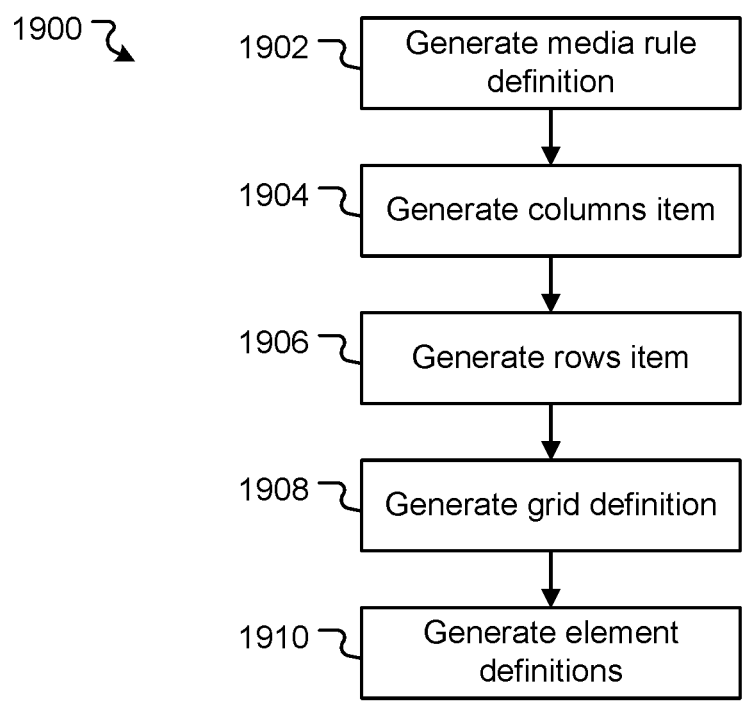
FIG. 19 is a flowchart depicting operations performed to generate a webpage fragment.

At 1614, module 208 processes the set of element-grid records defined by the selected grid dataset to generate a webpage fragment corresponding to the grid dataset. An example method 1900 for processing a set of element-grid records to generate a webpage fragment is described below with reference to FIG. 19.

A webpage fragment generated in accordance with method 1900 will include a media rule definition; a grid definition which defines the rows and columns of a CSS grid; and for each design element an element definition that positions the element within the CSS grid. For example, and as described further below, the webpage fragment corresponding to the extra-small screen size may take the following format:

```
    @media screen and (max-width: 375px) {
        #element_ID_1 {
            z-index: ...;
            position: relative;
            grid-area: ...;
        }
        #element_ID_2 {
            z-index: ...;
            position: relative;
            grid-area: ...;
        }
        <!--additional element definitions omitted-->
        <!--grid definition-->
        #grid_ID {
            grid-template-columns: ...;
            grid-template-rows: ...;
            display: grid;
            grid-column: 2;
            position: relative;
        }
    }
```

At 1616, module 208 determines if there are any unprocessed grid datasets. If so, processing returns to 1612. If not, processing proceeds to 1618.

At 1618, module 208 has generated a webpage fragment corresponding to each grid dataset—and, therefore, corresponding to each screenSize. At 1618, module 208 combines the webpage fragments into a single set of webpage data (if the website fragments are not already part of a single dataset/file). With the screenSizes of the present example, the combined website fragments may take the following form (the element definitions and grid definition of each fragment indicated by " . . . "):

```
    @media screen and (max-width: 375px) {...}
    @media screen and (min-width: 375.05px) and (max-width: 480px) {...}
    @media screen and (min-width: 480.05px) and (max-width: 768px) {...}
    @media screen and (min-width: 768.05px) and (max-width: 1024px) {...}
    @media screen and (min-width: 1024.05px) and (max-width: 1366px) {...}
    @media screen and (min-width: 1366.05px) {...}
```

As those skilled in the art will appreciate, the webpage data above will need to be supplemented with additional HTML and/or CSS to create a complete/functional webpage. The additional HTML and/or CSS can make use of the webpage data above by using the element and grid component identifiers (as indicated by the # prefix) to match HTML elements (e.g. divisions) by their ID attributes. As an example of this:

```
    <!DOCTYPE html>
    <head>
        ...
        <style>
            ...
            <!--webpage data as described above -->
            ...
        </style>
        ...
```

-continued

```
    </head>
    <body>
        ...
        <div id = "grid_ID">
            <div id = "Element_ID_1">
            ...
            </div>
            <div id = "Element_ID_2">
            ...
            </div>
            ...
        </div>
        ...
    </body>
```

The additional HTML and/or CSS required will be apparent to a person skilled in the art, and may be generated by any appropriate tool/application/service.

Webpage Fragment Generation

At 1614 of method 1600 module 208 processes a grid dataset to generate a corresponding webpage fragment. An example webpage fragment generation method 1900 for doing this will be described with reference to FIG. 19.

At 1902, module 208 generates a media rule definition. The media rule definition defines a range of screen sizes that the webpage fragment being generated is to be used for. The media rule definition is generated based on the range of screen sizes that the selected grid dataset is associated with. Where a grid dataset is associated with a screenSize object as described above, this will be the minWidthPx and maxWidthPx values of that object.

By way of example, media rule definitions for the screenSize objects described above may be as follows:

| screenSize.name | Media rule |
|---|---|
| EXTRA_SMALL | "@media screen and (max-width: 375px) { }" |
| SMALL | "@media screen and (min-width: 375.05px) and (max-width: 480px) { }" |
| MEDIUM | "@media screen and (min-width: 480.05px) and (max-width: 768px) { }" |
| MEDIUM_PLUS | "@media screen and (min-width: 768.05px) and (max-width: 1024px) { }" |
| LARGE | "@media screen and (min-width: 1024.05px) and (max-width: 1366px) { }" |
| EXTRA_LARGE | "@media screen and (min-width: 1366.05px) { }" |

Over operations 1904, 1906, and 1908 module 208 generates a grid definition.

At 1904, module 208 generates a columns item. The columns item defines column width values (and, implicitly, column gridlines) for a CSS grid.

Module 208 may generate the columns item in various ways.

In the present implementation, the columns item includes an ordered set of column definitions, each of which defines a CSS grid column. Each element-grid record of the grid dataset being processed contributes two column definitions to this set: one corresponding to the element's start (e.g. originX) and one corresponding to its end (e.g. originX+width). The column definition corresponding to the element's start is based on the element-grid record's columnStartOffset value and has a position in the ordered set based on the CSS Element record's columnStart value. The column definition corresponding to the element's end is based on the CSS Element record's columnEndOffset value and has a position in the ordered set based on the element-grid record's columnEnd value.

In the present example, module 208 generates the ordered set of column definitions by initially processing each element-grid record to generate two offset tuples—each taking the general form of (index, offset). For a given element-grid record, one tuple is generated with the record's (columnStart, columnStartOffset) values and the other is generated with the record's (columnEnd, columnEndOffset) values.

Once all element-grid records have been processed, module 208 sorts the set of offset tuples that have been generated by their index value (e.g. min to max).

Module 208 then processes each offset tuple in order to extract its offset value, generate a column definition based on the offset value, and append that column definition to the ordered set of column definitions.

Generating a column definition based on an offset value may be performed in various ways. In the present embodiment, for each zero offset value module 208 generates a column definition string of "0". For each non-zero offset value module 208 generates a column definition string as follows:

"calc(min(100vw, 1366px)*<offset value>)"

In this example, the 1366 value defines a window ceiling and is used to prevent elements being expanded after a window size is larger than the ceiling's value (in this case large than 1366 pixels). An alternative ceiling value may be used (or no ceiling provided).

In the present embodiment, module 208 then generates the columns item by appending the ordered set of column definitions to the string "grid-template-columns:" (and then appending a closing ";").

At any appropriate point, module 208 may calculate a final column definition that defines any margin between the last (e.g. rightmost) column and the edge of the webpage (as defined by the size). This may be done by creating a column definition that is based on a remaining offset value and appending that column definition as the last column definition in the columns item. The remaining offset value may be calculated as:

remaining offset=1−(sum of offset values defined by offset tuples)

To illustrate this, consider the partial element-grid records for E1 and E2 described above. For these element-grid records module 204 would generate the following set of offset tuples:

| Source | Offset tuple (index, offset) |
|---|---|
| E1 columnStart and columnStartOffset | (2, 0.25) |
| E1 columnEnd and columnEndOffset | (4, 0.5) |
| E2 columnStart and columnStartOffset | (3, 0) |
| E2 columnEnd and columnEndOffset | (5, 0) |
| Remaining offset | (6, 0.25) |

In this example, a remaining offset tuple of (6, 0.25) has been calculated to define the right most column. In this example, the index (6) of the remaining offset tuple is the next available index (indices two to 5 already in use) and the offset is the remaining fraction: (1−(0.25+0.5+0+0))=0.25.

Ordering the offset tuples by index would provide:

[(2, 0.25), (3, 0), (4, 0.5), (5, 0), (6, 0.25)]

This would lead to column definitions (and a final columns item) of:

```
"grid-template-columns:
    calc(min(100vw, 1366)*0.25)
    0
    calc (min(100vw, 1366)*0.5)
    0
    calc (min(100vw, 1366)*0.25);"
```

At 1906, module 208 generates a rows item. The rows item defines row height values (and, implicitly, row gridlines) for a CSS grid.

Module 208 may generate the rows item in various ways. In the present embodiments, the rows item is generated in a similar way to the generation of the columns item described above. The following differences, however, are noted.

When generating the rows item, the pair of offset tuples generated for each element-grid record will include: one offset tuple with the record's (rowStart, rowStartOffset) values and one offset tuple with the element's (rowEnd, rowEndOffset).

When generating the rows item, each tuple's offset value is used to generate a row definition which is then appended to the ordered set of row definitions. In the present embodiment, for each offset tuple's offset value module 208 generates a row definition string as follows:

"minmax(calc(min(100vw, 1366px)*<offset value>), max-content)"

In this example the 1366 value is again used as a window ceiling, though an alternative value may be used (or no ceiling used).

At any appropriate point, module 208 may calculate a final row definition that defines any margin between the last (e.g. bottom) column and the bottom edge of the webpage. This may be done by creating a row definition that is based on a final row offset value and appending that row definition as the last definition in the rows item.

The final row offset may be calculated in various ways. In the present example, where module 208 is configured to calculate each row offset as a fraction of the maximum width, module 208 calculates the final row offset as:

Final row offset=(originalPageHeight−accumulatedHeight)/maximumWidth

In this calculation the originalPageHeight is the height of the original design. Where the input to the webpage data generation method is a set of panels, this will be the height of the root panel (as defined by the root panel's bounding box). The accumulated height is the sum of all existing row offset values.

When generating the rows item, module 208 appends the ordered set of row definitions to the string "row-template-columns:" (and then appending a closing ";"). This will lead to a grid-template-rows item such as:

```
"grid-template-rows:
    minmax(calc(min(100vw, 1366px) * <offset value>), max-content)
    ...
    minmax(calc(min(100vw, 1366px) * <offset value>), max-content);"
```

At 1908, module 208 generates a grid definition based on the columns item (generated at 1904) and the rows item (generated at 1906). This includes generating a grid component identifier that can be used to match the grid with a corresponding HTML, element (e.g. a div element via the id attribute). The grid component ID may be generated in any appropriate way, for example function call to generate a unique identifier string.

The grid definition may also include additional strings that are required for a formal (and functional) CSS grid definition as will be apparent to those skilled in the art. Other strings may also be added to provide any additional functionality that is desired. By way of example, the CSS grid definition may take the following form:

```
"#grid_component_identifier{
    grid-template-columns: ...;
    grid-template-rows: ... ;
    display: grid;
    grid-column: 2;
    position: relative;
}"
```

In this particular example, the grid has been defined as a subgrid which is to be positioned at column 2 of a parent grid.

At 1910, module 208 generates an element definition for each design element of the design. Each element definition serves to horizontally and vertically position the element within the grid defined by the grid definition (and vertically position the element according to the element's z-index).

Element definitions may be generated in various ways. In the present module 208 iterates through the set of element-grid records and, for each element-grid record, generates a string having the following format:

```
"#element_component_identifier {
    z-index: <element's z index>;
    position: relative;
    grid-area: <columnStart> / <columnEnd> / <rowStart> / <rowEnd>;
}"
```

In this example the element's z index is taken from the design element's record (stored in or referenced by the element-grid record's element property). The columnStart, columnEnd, rowStart, and rowEnd values take the values of the element-grid record's correspondingly named properties.

Module 208 generates a unique element component identifier for each element. This identifier can be used to match the element definition with a corresponding HTML element (e.g. a div element via the id attribute). The element component ID may be generated in any appropriate way, for example a function call to generate a unique identifier string.

Once an element definition has been generated for each element-grid record, generation of the website fragment corresponding to the current grid dataset is complete.

Automatically Grouping and Ordering Design Elements

Figure 21:
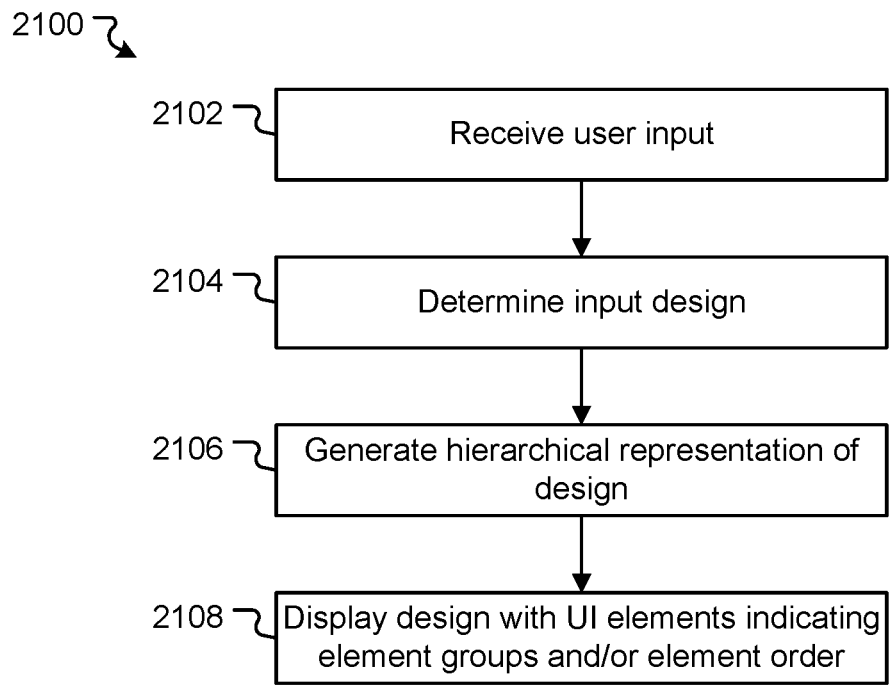
FIG. 21 is a flowchart depicting operations performed to automatically order and group design elements.

Turning to FIG. 21, this section describes a method 2100 for processing a design (or design data) to automatically group and order design elements.

Method 2100 is performed in respect of a single design page (referred to as the design). Where a design is a multi-page design, method 2100 may process the entire multi-page design by processing each page of the design separately.

At 2102, application 202 receives user input to trigger the automatic grouping and ordering process. This may, for example, be user activation of a user interface control such as control 322 of FIG. 3 though alternative user inputs are possible. This may be referred to as a first user input, or an order and group user input.

At 2104, application 202 determines the input design. In some instances, application 202 will determine a design that is currently displayed (e.g. in a preview area such as 302) to be the design. In other instances, application 202 may generate and display a search or browse type user interface allowing a user to select an input design.

At 2106, application 202 generates a hierarchical representation of the design. This may be done by processing the input design's design data according to method 500 as described above.

As described above, the hierarchical representation of the design defines (or allows for identification of): a reading order of the elements; nested element groups; groups of partially overlapping elements; rows of design elements; and columns of design elements.

The hierarchical representation of the design may be used for various purposes—e.g. by exporting or communicating the hierarchical representation (or data based thereon) to other applications or modules in which element groupings and/or element order is useful.

In the present example, application 202 is configured to display (at 2108) the design in a user interface and provide controls by which a user can cause application 202 to visually identify element groups and/or element order as defined by the hierarchical representation of the design.

Figure 22:
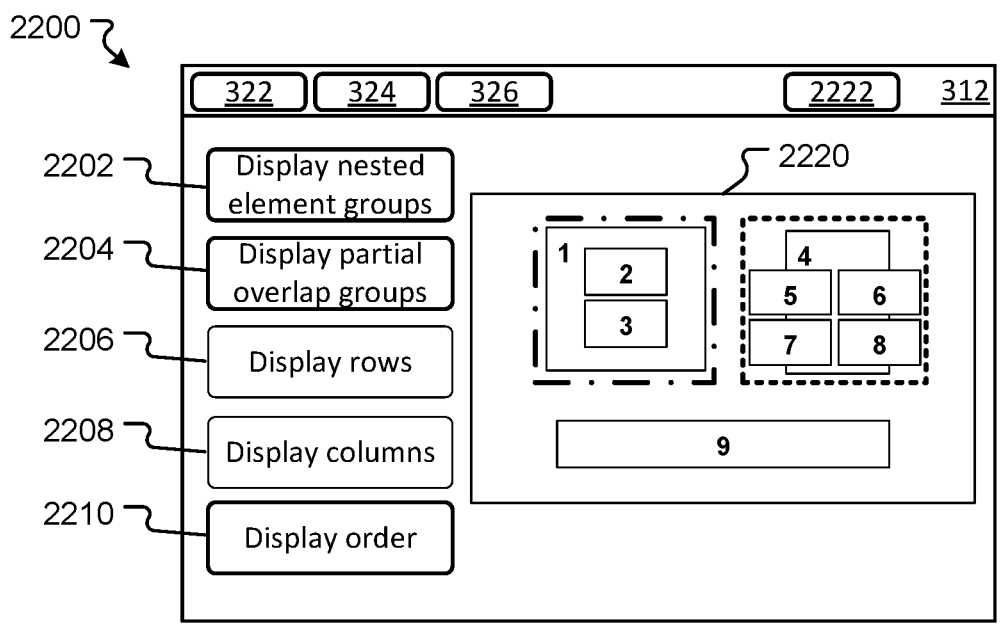
FIG. 22 depicts an example graphical user interface.

By way of example, and with reference to UI 2200 of FIG. 22 (which is a version of UI 300 of FIG. 3), application 202 may cause a set of UI controls to be displayed which allow a user to toggle on/off identification features. In this example, five UI controls are depicted: a display nested element groups control 2202, a display partial overlap groups control 2204, a display rows control 2206, a display columns control 2208, and a display element order control 2210.

In response to the display nested element groups control 2202 being activated (e.g. toggled on), application 202 may identify (from the hierarchical design representation) nested element groups and provide a visual indication of these groups. This may involve, for example, application 202 generating and displaying a partially transparent overlay of a particular colour over each nested element group.

Similarly, in response to the display partial overlap groups control 2204 being activated (e.g. toggled on), application 202 may identify and provide a visual indication of partial overlap element groups (e.g. by generating and displaying a partially transparent overlay of a particular colour—different to colours used to indicate other groups) over each partial overlap group.

Similarly, in response to the display rows control 2206 being activated (e.g. toggled on), application 202 may identify and provide a visual indication of element rows (e.g. by generating and displaying a partially transparent overlay of a particular colour—different to colours used to indicate other groups) over each element row.

Similarly, in response to the display columns control 2208 being activated (e.g. toggled on), application 202 may identify and provide a visual indication of element columns (e.g. by generating and displaying a partially transparent overlay of a particular colour—different to colours used to indicate other groups) over each element column.

Element groups may be visually identified in alternative ways, for example by generating/displaying visible group outlines (e.g. a heavy weight or otherwise stylised line, potentially of a particular colour, around the elements of an element group).

In response to the display element order control 2210 being activated (e.g. toggled on), application 202 may provide a visual indication of the element order as defined by the hierarchical design representation. This may be done, for example, by displaying an order indication (e.g. a number) atop each element—e.g. so a '1' is displayed atop the element that is first in the order, a '2' atop the element that is second in the order, etc. Element order may be determined by flatting the hierarchical representation of the design as described above with reference to FIG. 20 (which generates a flat (but ordered) list of design elements (or element panels that define design elements), the order of which defines the elements' reading order).

If a given display element groups control 2202-2208 or the display order control is activated again (e.g. toggled off), application 202 ceases to display the visual indication of the element groups/element order.

To illustrate the above, GUI 2200 displays a preview of a design 2220. In this example: the display element order control 2210 is toggled on and, accordingly, element order indicates are displayed (in this case numbers 1 to 9 positioned atop respective design elements); the display nested element groups control 2202 is toggled on and, accordingly, the nested element group that includes elements 1, 2, and 3 is indicated (in this case by a heavy dot-dash line around the elements); the display partial element groups control 2204 is toggled on and, accordingly, the partial element group that includes elements 4-8 is indicated (in this case by a heavy dot-dot line around the elements).

By displaying element order and/or different element groups, a user may choose to amend their design (e.g. by changing element positions and/or sizes). In this case the user may then re-trigger the automatic ordering and grouping process to generate a new hierarchical representation of the design in which the automatically determined element groups and/or order may have changed.

GUI 2200 also includes an export group and order control 2222. Activation of this control causes application 202 to launch an export interface allowing a user to select an export target (e.g. a local or remote storage location, an email (or other electronic communication) application, or an alternatively defined target) and export the hierarchal representation of the design to that destination.

Automatic Design Reflow

Figure 23:
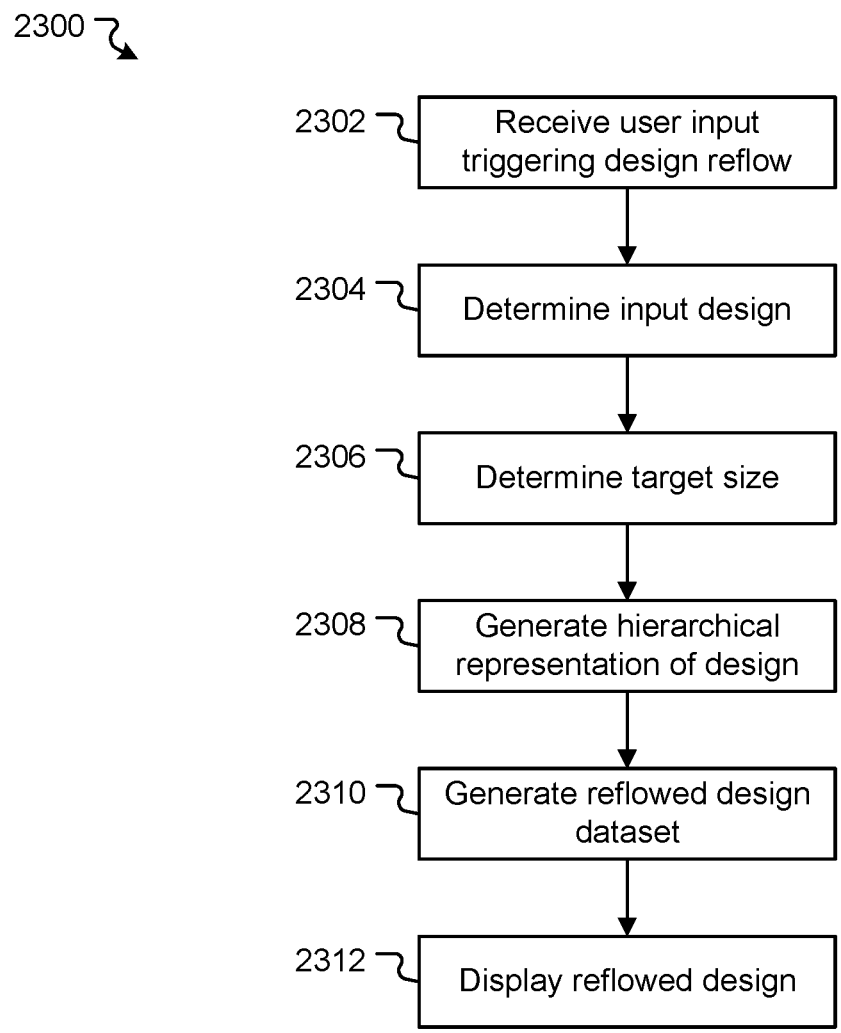
FIG. 23 is a flowchart depicting operations performed to automatically reflow a design.

Turning to FIG. 23, this section describes a method 2300 for reflowing a subject design.

Method 2300 is performed in respect of a single design page (referred to as the design). Where a design is a multi-page design, method 2300 may process the entire multi-page design by processing each page of the design separately.

At 2302, application 202 receives user input to trigger the design reflow process. This may, for example, be user activation of a user interface control such as control 324 of FIG. 3, though alternative user inputs are possible. This may be referred to as a second user input, or a reflow design user input.

At 2304, application 202 determines the input design. This operation may be the same as (or similar to) operation 2104 described above.

At 2306, application 202 determines a target size for the design reflow process. A target sizes may be determined in various ways. For example, on activation of control 324 application 202 may generate and display a target size selection interface which allows the user to select a target size from a set of predefined target sizes. The set of predefined target sizes may, for example, indicate target sizes "extra small", "small", "medium", "large", "extra-large", "smart phone", "tablet", "laptop", "desktop" (and/or alternative values), each value identifying a targetSize object as described above. Alternatively, or in addition, application 202 may allow a user to define a target size—e.g. by entering a desired width (or height).

At 2308, application 202 generates a hierarchical representation of the design. This may be done by processing the input design's design data according to method 500 as described above.

At 2310, application 202 generates a reflowed design dataset corresponding to the target size determined at 2306. In the present embodiments, this is done by application 202 processing the hierarchical representation of the design (generated at 2308) and a targetSize object (based on the target size determined at 2306) according to method 1400 as described above.

The reflowed design dataset may be used for various purposes—e.g. by exporting or communicating the reflowed design dataset (or data based thereon) to other applications or modules.

In the present example, at 2308, application 202 is configured to display the reflowed design in a user interface at 2312. In this example, the reflowed design is being displayed by the application 202 that was used to generate the original design. In this case, application 202 can display the reflowed design based directly on the size and position data of the panels in the reflowed design dataset. This may be done, for example, by traversing the panel hierarchy defined by the reflowed design dataset, ignoring structural (i.e. non-element) panels, and displaying the element of each element panel according to its panel's size and position data (and the element's original z-index/depth data).

Figure 24:
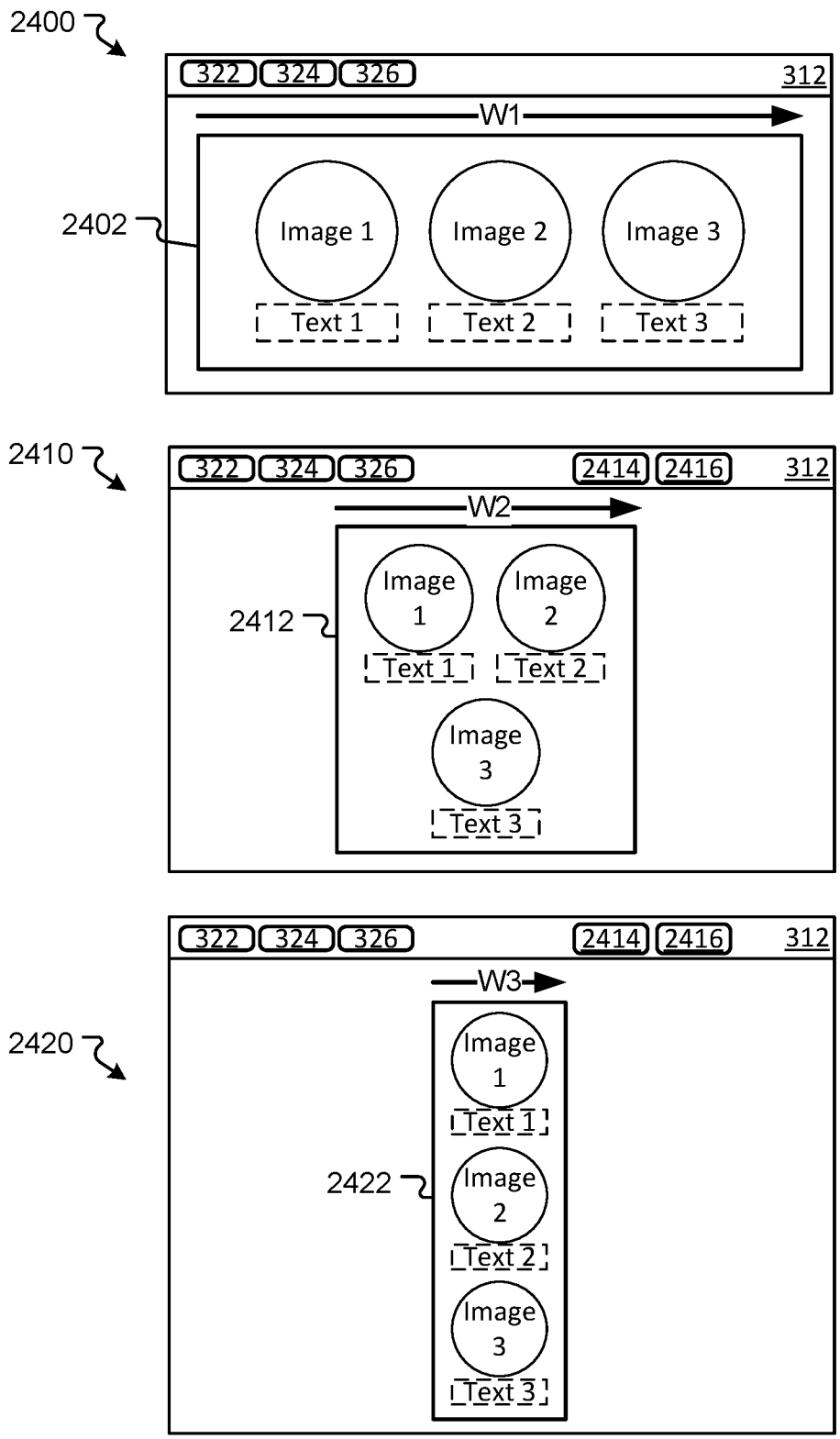
FIG. 24 depicts example graphical user interfaces.

Examples of this are depicted in FIG. 24. Reference 2400 depicts a first user interface showing an original design 2402 (with an original width indicated by W1). Reference 2410 depicts the user interface after the original design has been reflowed based on a first size. In this example, the original design was reflowed to a width as indicated by W2, leading to the generation of reflowed design data which application 202 has used to display reflowed design 2412. Reference 2420 depicts the user interface after the original design has been reflowed based on a second size. In this example, the original design was reflowed to a width as indicated by W3, leading to the generation of reflowed design data which application 202 has used to display reflowed design 2422.

GUIs 2410 and 2420 additionally include an original/reflowed design toggle control 2414 and a save/export reflowed design control 2416. On detecting activation of toggle control 2414, application 202 switches between displaying the original and reflowed design. On detecting activation of save/export control 2416, application 202 generates and displays a save/export interface by which a user can save and/or export the design as reflowed. The reflowed design may, for example, be saved as a set of design elements that are sized and positioned according to the reflowed design data (e.g. a design record format as described above). Alternatively, or in addition, the reflowed design may be converted to and saved/exported in another format—e.g. a raster image format, .pdf format, or an alternative format.

Automatic Webpage Generation

Figure 25:
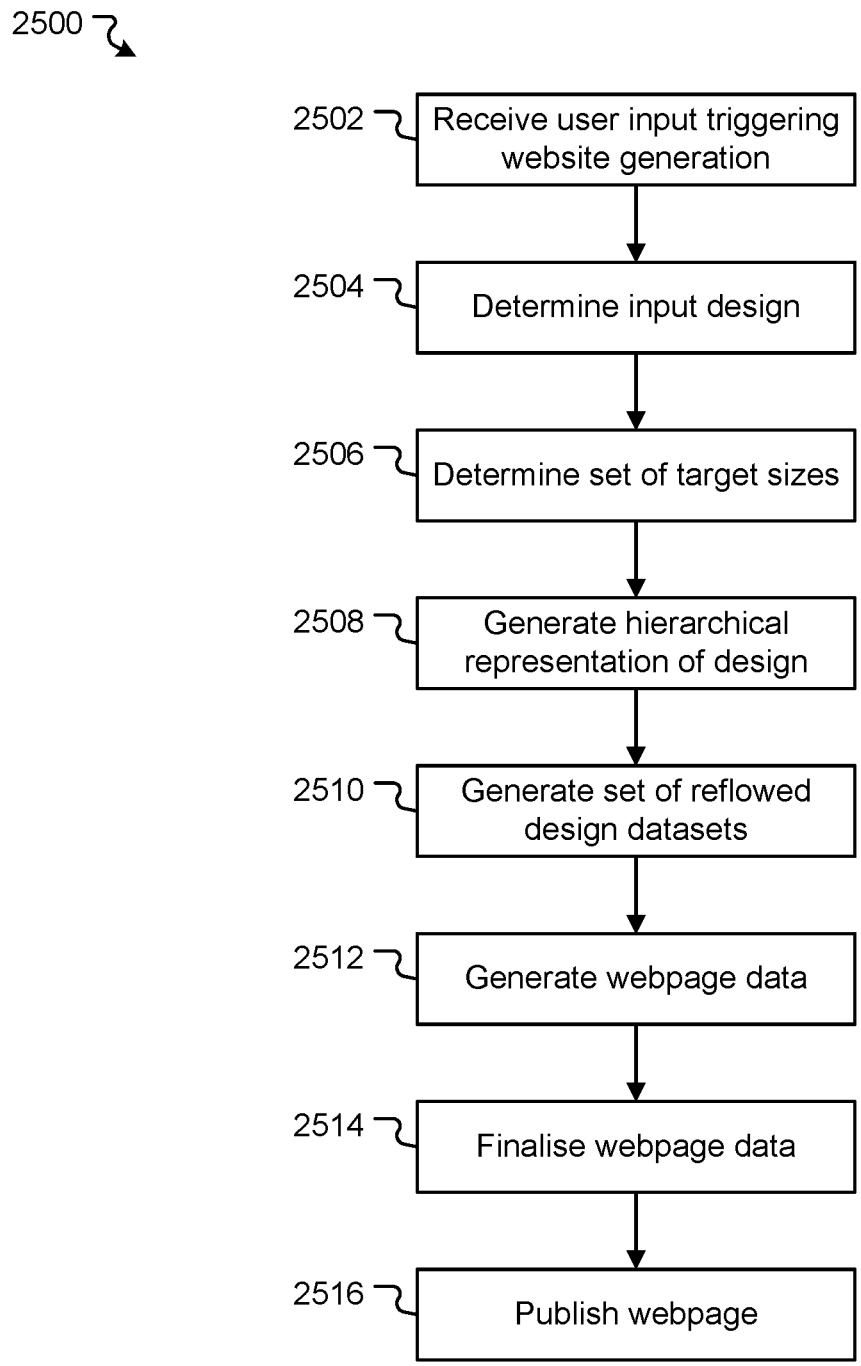
FIG. 25, is a flowchart depicting operations performed to automatically generate a dynamic webpage.

Turning to FIG. 25, this section describes a method 2500 for processing an original design to automatically generate a dynamic webpage. Dynamic is used in this sense to indicate that the webpage is generated so that alternative versions thereof are automatically displayed by a web browser depending on the size of the display window.

Method 2500 is performed in respect of a single design page (referred to as the design). Where a design is a multi-page design, method 2500 may process the entire multi-page design by processing each page of the design separately (each page of the design leading to generation of a separate webpage).

At 2502, application 202 receives user input to trigger the design reflow process. This may, for example, be user activation of a user interface control such as control 326 of FIG. 3, though alternative user inputs are possible. This may be referred to as a third user input, or a generate webpage user input.

At 2504, application 202 determines the input design. This operation may be the same as (or similar to) operation 2104 described above.

At 2506, application 202 determines a set of target sizes for the webpage generation process. In certain embodiments, application 202 is configured to use a predefined set of target sizes when performing automatic webpage generation. This set of target sizes include target sizes that are appropriate for common device/display resolutions. The set of target sizes may include some or all of the target sizes described above with reference to method 1400, and/or may include alternatively defined target sizes.

In alternative implementations, application 202 may generate and display a user interface via with a user selects a set of target sizes from a defined set (e.g. to select one or more of the target sizes as described above).

At 2508, application 202 generates a hierarchical representation of the original design by processing the input design's design data according to method 500 as described above.

At 2510, application 202 generates a set of reflowed design datasets. The set of reflowed design datasets includes a reflowed design dataset corresponding to each target size determined at 2506. Each reflowed design dataset may be generated by processing the hierarchical representation of the original design and one of the target sizes according to method 1400 as described above.

At 2512, application 202 generates webpage data. The webpage data includes a fragment that corresponds to each reflowed design dataset and that defines a CSS grid layout for the design elements defined by that reflowed design dataset.

At 2514, application 202 generates final webpage data. This will include supplementing the webpage data generated at 2512 with any additional HTML and/or CSS that is required to create a functioning webpage (and as will be known to those skilled in the art), and other HTML/CSS as desired.

Following 2514, a final webpage has been generated. The webpage is dynamic in the sense that the fragments of the webpage data generated at 2512 define different element layouts for different ranges of window sizes. The fragments will be selectively used by an application that renders the webpage (e.g. a web browser or other application capable of interpreting and rendering the webpage data) based on window size.

Accordingly, at 2514 the webpage can be published. Publication of the webpage may be achieved in any appropriate way. For example, application 202 may provide a publishing function that allows the user to upload (or otherwise communicate) the final webpage data to a web server which can then serve the webpage to client devices. Alternatively, or in addition, application 202 may provide an export type function which can be used to save the final webpage data to a storage location (local or remote) and/or attach the webpage data to an electronic communication (e.g. an email, an instant message, or any other appropriate electronic communication).

As a further example, application 202 may be configured to provide a preview function that allows a user to preview the final webpage. This may, for example, be launched by a 'preview webpage' user interface control which, on activation, launches a preview user interface.

Figure 26:
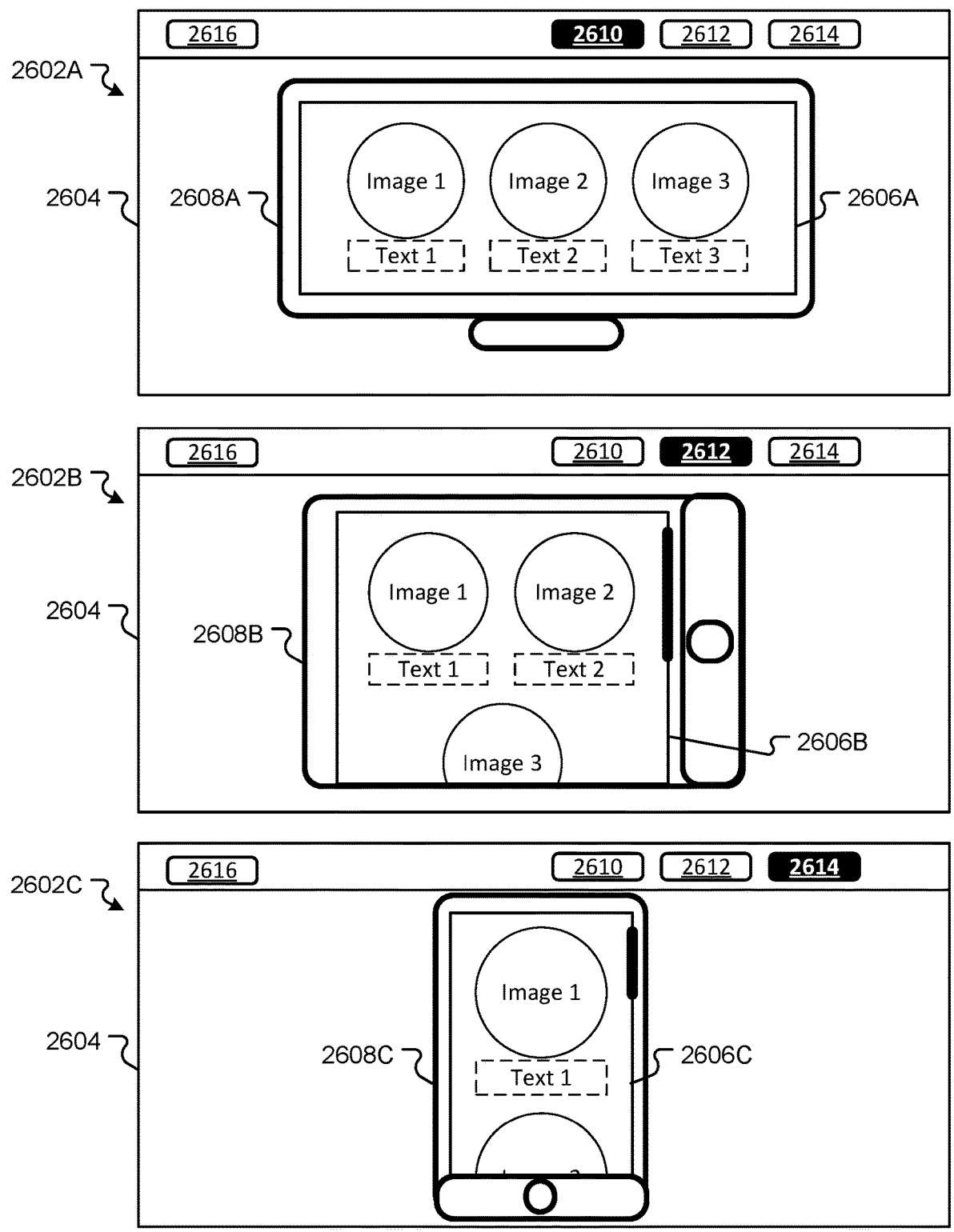
FIG. 26 depicts alternate states of a webpage preview graphical user interface.

FIG. 26 provides an example preview GUI 2602. Preview GUI 2602 includes a preview area 2604 in which a preview of the webpage 2606 is displayed. In the present example, application 202 displays the webpage 2606 in a virtual device 2608 on which the webpage may be displayed (the sizes of the virtual device 2608 and the webpage being previewed being relative to one another). Preview GUI 2602 also includes preview size controls 2610, 2612, 2614, and a close preview control 2616. In the present example, preview size controls 2610, 2612, and 2614 correspond to the LARGE, MEDIUM and SMALL screenSize objects as described above (or, more particularly, the maxWidthPx values thereof). Additional (or fewer) size controls could be provided permitting selection of different preview sizes.

In GUI 2602A, size control 2610 is selected. Size control 2610 corresponds, in this case, to an external monitor size. (This may, for example, correspond to the "LARGE" screenSize object). Accordingly, device representation 2608A depicts a virtual monitor with a screen resolution corresponding to the size being previewed (e.g. a virtual monitor having a resolution width equal to the maxWidthPx of the "LARGE" screenSize object). The webpage preview 2606A is displayed within the device 2608A as if it was being displayed on a device with that resolution—and, accordingly, uses the webpage fragment for that resolution (as defined by the media rule). When previewing at a screen size such as this it is unlikely application 202 will be able to display the virtual device 2608A (and webpage as if rendered thereon) at its actual size. Accordingly, application 202 may provide a preview in which the virtual device 2608 and webpage 2606A are both shrunk.

In GUI 2602B, size control 2612 is selected. Size control 2612 corresponds, in this case, to tablet size (in landscape orientation). (This may, for example, correspond to the "MEDIUM" screenSize object). Accordingly, device representation 2608B depicts a virtual tablet with a screen resolution corresponding to the size being previewed. The webpage preview 2606B is displayed within the device representation 2608B as if it was being displayed on a device with that resolution—and, accordingly, uses the webpage fragment for that resolution (as defined by the media rule).

In GUI 2602C, size control 2614 is selected. Size control 2614 corresponds, in this case, to a smart phone size (in portrait orientation). (This may, for example, correspond to the "SMALL" screenSize object). Accordingly, device representation 2608C depicts a virtual smartphone with a screen resolution corresponding to the size being previewed. The webpage preview 2606C is displayed within the device representation 2608C as if it was being displayed on a device with that resolution—and, accordingly, uses the webpage fragment for that resolution (as defined by the media rule).

If the display device that application 202 is displaying preview GUI 2602 on is sufficiently large (i.e. greater than the webpage size being previewed), application 202 may be able to display the virtual device 2608 (and webpage as if rendered thereon) at actual size. This will often be the case for the SMALL and MEDIUM screen sizes of preview GUI 2602B and 2602B (if GUI 2602 is being displayed on an external monitor). If the display device is not sufficiently large for the selected screen size, however, both the virtual device 2608 and webpage preview 2606 will need to be shrunk. In this case, however, application 202 still previews the webpage as if it was being displayed at the size selected.

Clauses

Further examples of specific feature combinations taught within the present disclosure are set out in the following sets of numbered clauses. Reference to a preceding clause within a given clause set is reference to a clause in that same clause set unless specified otherwise.

Clause Set 1:

Clause 1. A computer implemented method for generating a hierarchical set of nodes representing a design, the method including:
    accessing design data, the design data defining a plurality of elements of the design, each design element having an element size and an element position within the design;
    generating a root node;
    generating a plurality of element-type nodes, each element-type node corresponding to an element of the design and having a node size and node position based on its corresponding element's size and position;
    processing the plurality of element-type nodes to determine if any nested element groups exist, a nested element group including two or more nested element-type nodes; and
    for each nested element group identified, recording the nested element group by creating one or more parent-child relationships between the two or more nested element-type nodes.

Clause 2. The computer implemented method of clause 1, further including:
    processing the plurality of element-type nodes to determine if any partial overlap element groups exist, a partial overlap element group including two or more partially overlapping element-type nodes, the two or more partially overlapping element-type nodes being child nodes of a common parent node; and
    for each partial overlap element group identified, recording the partial overlap element group by:
        creating a new container-type node;
        recording the two or more partial overlap element nodes as children of the new container-type node instead of the common parent node; and
        recording the new container-type node as a child of the common parent node.

Clause 3. The computer implemented method of clause 1 or clause 2, further includes:
    determining if any nodes are scale-type nodes; and
    for each scale-type node:
        creating a new container-type node; and
        adding the new container-type node to the hierarchical set of nodes by recording the scale-type node as a child node of the new container-type node instead of the scale-type node's original parent node; and
        recording the new container-type node as a child of the scale-type node's original parent node.

Clause 4. The computer implemented method of clause 3, wherein determining if a node is a scale-type node includes determining if the node corresponds to a graphic design element.

Clause 5. The computer implemented method of any one of clauses 1 to 4, wherein processing the plurality of element-type nodes to determine if any nested element groups exist includes:
  processing a first element node's size and position and a second element node's size and position to determine whether the first element-type node is positioned entirely within the second element-type node; and
  in response to determining that the first element-type node is positioned entirely within the second element-type node, defining the first element-type node to be a child of the second element-type node.

Clause 6. The computer implemented method of any one of clauses 1 to 4, wherein processing the plurality of element-type nodes to determine if any nested element groups exist includes performing a first node insertion process on a current tree node and a first node, the first node insertion process including:
  determining whether the current tree node is positioned entirely within the first node;
  in response to determining that the current tree node is positioned entirely within the first node:
    recording the current tree node as a child of the first node; and
    returning the first node.

Clause 7. The computer implemented method of clause 6, wherein in response to determining that the current tree node is not positioned entirely within the first node, the first node insertion process includes:
  determining whether the first node is hierarchically related to any child node defined by the current tree node; and
  in response to determining that the first element is not hierarchically related to any child node defined by the current tree node:
    recording the first node as a new child node of the current tree node; and
    returning the current tree node.

Clause 8. The computer implemented method of clause 7, wherein the first node is determined to be hierarchically related to a child node defined by the current tree if either:
  the first node is positioned entirely within the child node; or
  the child node is positioned entirely within the first node.

Clause 9. The computer implemented method of clause 7 or clause 8, wherein in response to determining that the first node is hierarchically related to a particular child node defined by the current tree node, the insertion process includes:
  recursively performing a second node insertion process, the second node insertion process being performed on the particular child node and the first node.

Clause Set 2:

Clause 1. A computer implemented method for generating a hierarchal design representation of a design, the method including:
  accessing design data, the design data defining a plurality of elements of the design, each design element having an element size and an element position within the design;
  processing the design data to generate a hierarchical set of nodes, the hierarchical set of nodes including a root node and a plurality of element-type nodes, each element-type node corresponding to an element of the design and having a node size and node position based on the corresponding element's size and position, the hierarchy of nodes defining any nested element groups via node parent/child relationships; and
  processing the hierarchical set of nodes to generate a hierarchical set of panels, the hierarchical set of panels including an element panel corresponding to each element-type node,
  wherein processing the hierarchical set of nodes to generate the hierarchical set of panels includes:
    performing a recursive panel generation process, wherein each recursion of the panel generation process is performed on a given set of input nodes and with reference to an input dimension and returns a set of one or more sibling panels, each set of sibling panels indicating a band of elements running in the input dimension; and
    over successive recursive calls of the panel generation process the input dimension to each panel generation process alternates between a first dimension and a second dimension.

Clause 2. The computer implemented method of clause 1, wherein processing the hierarchical set of nodes to generate the hierarchical set of panels includes:
  generating a root panel;
  initiating the recursive panel generation process by calling a first panel generation process on a first set of input nodes, the first set of input nodes being child nodes of the root node; and
  recording each panel returned by the first panel generation process as a child panel of the root panel.

Clause 3. The computer implemented method of clause 1 or clause 2, wherein performing a given recursion of the panel generation process on a given set of input nodes that includes more than one node and a given input dimension includes:
  processing the given set of input nodes to identify one or bands that run in the given input dimension, each band encompassing a group of one or more input nodes from the given set of input nodes;
  generating a holding panel for each band that is identified; and
  returning the, or each, holding panel.

Clause 4. The computer implemented method of clause 3, wherein generating the holding panel for a particular band that encompasses a particular group of one or more input nodes includes:
  generating the holding panel for the particular node band;
  recursively calling a further panel generation process on the particular group of one or more input nodes; and
  recording each panel returned by the further panel generation process as a child panel of the holding panel.

Clause 5. The computer implemented method of clause 3 or clause 4, wherein processing the given set of input nodes to identify one or more bands that run in the given input dimension includes:
  assigning each input node that does not overlap any other input node in the given input dimension to its own separate band; and
  assigning each collection of input nodes that collectively overlap one another in the given input dimension to its own separate band.

Clause 6. The computer implemented method of any one of clauses 3 to 5, wherein after processing of the given set of input nodes to identify the one or more bands, performing the given recursion of the panel generation process includes:
  determining if any pairs of bands should be merged; and
  in response to determining that a pair of bands should be merged, merging the pair of bands into a single band.

Clause 7. The computer implemented method of clause 6, wherein determining if a given pair of bands that includes a first band and a second band should be merged includes:
  calculating a separation gap between the first band and the second band;
  determining if the separation gap is less than a separation threshold; and
  in response to determining that the separation gap is less than a separation threshold, determining that the first band and the second band should be merged.

Clause 8. The computer implemented method of clause 7, wherein the separation threshold is an adaptive separation threshold that is calculated based on a plurality of separation gaps defined by the one or more bands.

Clause 9. The computer implemented method of clause 1 or 2, wherein performing a given recursion of the panel generation process on a given set of input nodes that includes a single node includes:
  generating a new panel corresponding to the single node;
  determining if the single node defines one or more child nodes; and
  in response to determining that the single node defines one or more child nodes:
    recursively calling a further panel generation process on one or more child nodes;
    recording each panel returned by the further panel generation process as a child panel of the new panel; and
    returning the new panel.

Clause 10. The computer implemented method of any one of clauses 1 to 9, wherein the hierarchical set of nodes is generated by processing the design data in accordance with a method according to any one of clauses 1 to 9 of clause set 1.

Clause Set 3:

Clause 1. A computer implemented method for generating a reflowed design dataset in respect of a design, the design associated with a first dimension and a second dimension, the method including:
  accessing a hierarchal representation of the design that defines a hierarchy of panels, wherein:
    the hierarchy of panels includes a plurality of element panels, each element panel defining an element of the design;
    each panel in the hierarchy of panels is associated with an original panel size and an original panel position, the original panel size including a first dimension size and a second dimension size;
    each panel in the hierarchy of panels is associated with a first edge and a second edge, the second edge being opposite the first edge; and
    at least one panel in the hierarchy of panels is a parent panel to one or more subpanels;
  resizing a root panel of the hierarchy of panels so the root panel has a new size that is different to its original size; and
  performing a panel reflow process on the resized root panel to generate the reflowed design dataset,
wherein the panel reflow process includes processing each subpanel of the resized root panel by, for a selected subpanel:
  determining an action associated with the selected subpanel;
  in response to determining the action is a scale action, performing a scale action process on the selected subpanel, the scale action process including:
    performing a first resizing operation on the selected subpanel, the first resizing operation including uniformly scaling the selected subpanel to fit within the resized parent panel; and
    performing a first translation operation on the selected subpanel to position it within the resized parent panel;
  in response to determining the action is a reflow action, performing a reflow action process on the selected subpanel, the reflow action process including:
    determining if the selected subpanel fits within the resized parent panel; and
    in response to determining that the selected subpanel does not fit within the resized parent panel:
      performing a second translation operation on the selected subpanel to position it within the resized parent panel;
      performing a second resizing operation on the selected subpanel, the second resizing operation including scaling the selected subpanel to fit within the resized parent panel;
      determining if the selected subpanel is associated with one or more child panels; and
      in response to determining that the selected subpanel is associated with one or more children panels:
        recursively performing the panel reflow process on the resized selected subpanel; and
        after recursively performing the panel reflow process on the resized selected subpanel, performing a third resizing operation on the subpanel, the third resizing operation including calculating a new size for the subpanel based on the size data of each of the subpanel's one or more child panels;
  after performing the scale action process or reflow action process on the subpanel, determining if the subpanel overlaps a sibling panel; and
  in response to determining that the subpanel does overlap a sibling panel, performing a third translation operation on the subpanel so it no longer overlaps the sibling panel.

Clause 2. The computer implemented method of clause 1, wherein performing the first resizing operation includes:
  calculating a uniform scaling factor; and
  calculating a new width and a new height for the selected subpanel based on the uniform scaling factor.

Clause 3. The computer implemented method of clause 2, wherein the uniform scaling factor is calculated so the first dimension size of the selected subpanel is less than or equal to the first dimension size of the resized parent panel.

Clause 4. The computer implemented method of clause 2 or clause 3, wherein performing the first resizing operation includes resizing any child panels of the selected subpanel by applying the uniform scaling factor to each child panel of the selected subpanel.

Clause 5. The computer implemented method of any one of clauses 1 to 4, wherein performing the first translation operation includes translating the selected subpanel a first distance in the first dimension so the first edge of the selected subpanel is positioned on or within the first edge of the resized parent panel.

Clause 6. The computer implemented method of clause 5, wherein performing the first translation operation includes translating any child panels of the selected subpanel by the first distance in the first dimension.

Clause 7. The computer implemented method of any one of clauses 1 to 6, wherein performing the second translation operation includes translating the selected subpanel by a second distance in the first dimension so the second edge of the selected subpanel is positioned on or within the second edge of the resized parent panel.

Clause 8. The computer implemented method of clause 7, wherein performing the second translation operation includes translating any child panels of the selected subpanel by the second distance in the first dimension.

Clause 9. The computer implemented method of any one of clauses 1 to 8, wherein performing the second resizing operation includes calculating a new first dimension size for the selected subpanel, the new first dimension size being less than or equal to the first dimension size of the resized parent panel.

Clause 10. The computer implemented method of any one of clauses 1 to 9, wherein performing the third resizing operation includes calculating a new second dimension size for the selected subpanel, the new second dimension size being based on the second dimension sizes of each of the selected subpanel's one or more children panels.

Clause 11. The computer implemented method of any one of clauses 1 to 10, wherein performing the third translation operation includes translating the selected subpanel by a third distance in the first dimension so the second edge of the selected subpanel is positioned on or within the second edge of the resized parent panel.

Clause 12. The computer implemented method of clause 11, wherein performing the third translation operation includes translating any child panels of the selected subpanel by the third distance in the first dimension.

Clause 13. The computer implemented method of any one of clauses 1 to 10, wherein performing the third translation operation includes translating the selected subpanel by a fourth distance in the second dimension so the selected subpanel is does not overlap the sibling panel.

Clause 14. The computer implemented method of clause 13, wherein performing the third translation operation includes translating any child panels of the selected subpanel by the fourth distance in the second dimension.

Clause 15. The computer implemented method of any one of clauses 1 to 14, wherein in response to determining that the selected subpanel does fit within the resized parent panel in the reflow action process, the reflow action process includes performing a fourth translation operation on the selected subpanel, the fourth translation operation including translating the selected subpanel by a fifth distance in the first dimension so the first edge of the selected subpanel is positioned on or within the first edge of the resized parent panel.

Clause 16. The computer implemented method of clause 15, wherein performing the fourth translation operation includes translating any child panels of the selected subpanel by the fifth distance in the first dimension.

Clause 17. The computer implemented method of any one of clauses 1 to 16, wherein the panel reflow process is initially performed on a root panel of the of the hierarchy of panels, and wherein the new panel size of the root panel defines a maximum first dimension size for the reflowed design.

Clause 18. The computer implemented method of any one of clauses 1 to 17, wherein the first dimension is a horizontal dimension and the second dimension is a vertical dimension.

Clause 19. The computer implemented method of any one of clauses 1 to 18, wherein the first edge of a panel is a right edge of the panel and the second edge of a panel is a left edge of the panel.

Clause 20. The computer implemented method of any one of clauses 1 to 19, further including causing a reflowed design based on the reflowed design dataset to be displayed.

Clause 21. The computer implemented method of any one of clauses 1 to 20, wherein the hierarchical design representation is generated by a method according to any one of clauses 1 to 10 of clause set 2.

Clause Set 4:

Clause 1. A computer implemented method for generating webpage data corresponding to a design, wherein the webpage data is generated based on a webpage grid definition and the method includes:
- accessing a set of design element objects, each design element object corresponding to a design element of the design and including data allowing a horizontal start position, a horizontal end position, a vertical start position, and a vertical end position of that design element to be determined;
- processing the set of design element objects to generate a set of element-grid records, the set of element-grid records including an element-grid record corresponding to each design element, the element-grid record corresponding to a given design element including:
  - element data identifying the given design element;
  - a unique column start gridline for the given design element;
  - a unique column end gridline for the given design element;
  - a column start offset for the given design element; and
  - a column end offset for the given design element; and
- processing the set of element-grid records to generate the webpage grid definition, the webpage grid definition defining a grid including a plurality of columns and a plurality of rows, and wherein:
- a first design element and a second design element have a same horizontal start position; and
- the webpage grid definition defines:
  - a first column gridline as the unique column start gridline of the first design element;
  - a second column gridline as the unique column start gridline of the second design element; and
  - a first column between the first column gridline and the second column gridline, the first column having a column width of zero.

Clause 2. The computer implemented method of clause 1, wherein the webpage data is generated based on a set of webpage element definitions, and the method further includes processing the set of element-grid records to generate the set of webpage element definitions, the set of webpage element definitions including a webpage element definition for each design element, the webpage element definition for a given design element positioning the given design element within the grid defined by the webpage grid definition.

Clause 3. The computer implemented method of clause 2, wherein the webpage element definition for the given design element positions the given design element within the grid based on the given design element's unique column start gridline and unique column end gridline.

Clause 4. The computer implemented method of any one of clauses 1 to 3, wherein the plurality of columns is defined by an ordered set of column width values.

Clause 5. The computer implemented method of clause 4, further including generating the ordered set of column width values by:

processing the set of element-grid records to generate an ordered set of column offsets, the ordered set of column offsets including the column start offset of each element-grid record and the column end offset of each element-grid record, the ordered set of column offsets being ordered based on each column offset's corresponding column gridline; and generating the ordered set of column width values based on the ordered set of column offsets.

Clause 6. The computer implemented method of clause 4 or clause 5, wherein each column width value defines a fractional portion of a maximum width value.

Clause 7. The computer implemented method of any one of clauses 1 to 6, wherein processing the set of design element objects to generate the set of element-grid records includes:

processing each design element object to generate an ordered set of horizontal position records, each horizontal position record associated with a design element and defining a horizontal position value; and processing each horizontal position record in the ordered set of horizontal position records in order by, for a particular horizontal position record associated with a particular design element:

calculating a column offset value based on the particular horizontal position record's position value and a cumulative offset value;

determining a column gridline value based on the position of the particular horizontal position record in the ordered set of horizontal position records;

determining if the column offset value and the column gridline value are associated with the horizontal start of the particular design element; and in response to determining that the column offset value and the column gridline value are associated with the horizontal start of the particular design element:

recording the column offset value as the column start offset of the element-grid record corresponding to the particular design element; and recording the column gridline value as the unique column start gridline of the element-grid record corresponding to the particular design element.

Clause 8. The computer implemented method of clause 7, wherein in response to determining that the column offset value and the column gridline value are not associated with the horizontal start of the particular design element:

recording the column offset value as the column end offset of the element-grid record corresponding to the particular design element; and recording the column gridline value as the unique column end gridline of the element-grid record corresponding to the particular design element.

Clause 9. The computer implemented method of clause 7 or clause 8, wherein generating the ordered set of horizontal position records includes:

generating a horizontal start position record for each design element, the horizontal start position record for design element identifying that design element and defining that design element's horizontal start position; and generating a horizontal end position record for each design element, the horizontal end position record for a design element identifying that design element and defining that design element's horizontal end position.

Clause 10. The computer implemented method of any one of clauses 1 to 9, wherein:

a third design element and a fourth design element have a same horizontal end position; and the grid definition defines:

a third column gridline as the unique column end gridline of the third design element;

a fourth column gridline as the unique column end gridline of the fifth design element; and a second column between the third column gridline and the fourth column gridline, the second column having a column width of zero.

Clause 11. The computer implemented method of any one of clauses 1 to 10, wherein:

the element-grid record corresponding to the given design element further includes:

a unique row start gridline for the given design element;

a unique row end gridline for the given design element;

a row start offset for the given design element; and a row end offset for the given design element;

a fifth design element and a sixth design element have a same vertical start position; and the grid definition defines:

a first row gridline as the unique row start gridline of the fifth design element;

a second row gridline as the unique row start gridline of the sixth design element; and a first row between the first row gridline and the second row gridline, the first row having a row height of zero.

Clause 12. The computer implemented method of clause 11, wherein:

a seventh design element and an eighth design element have a same vertical end position; and the grid definition defines:

a third row gridline as the unique row end gridline of the seventh design element;

a fourth row gridline as the unique row end gridline of the eighth design element; and a second row between the third row gridline and the fourth row gridline, the second row having a row height of zero.

Clause 13. The computer implemented method of any one of clauses 1 to 12, wherein the set of design element objects is a set of design element records defined by a design dataset which represents the design.

Clause 14. The computer implemented method of any one of clauses 1 to 12, wherein the set of design element objects is a set of panels defined by a hierarchical representation of the design, the hierarchical representation of the design generated according to a method as described in any one of clauses 1 to 10 of clause set 2.

Clause 15. The computer implemented method of any one of clauses 1 to 12, wherein the set of design element objects is a set of panels defined by a reflowed design dataset, the reflowed design dataset generated according to a method as described in any one of clauses 1 to 21 of clause set 3.

Clause 16. The computer implemented method of any one of clauses 1 to 15, wherein the data allowing the horizontal start position, the horizontal end position, the vertical start position, and the vertical end position of a design element includes a height, a width, a horizontal origin coordinate, and a vertical origin coordinate.

Clause 17. The computer implemented method of any one of clauses 1 to 16, further including causing a webpage to be rendered in accordance with the webpage data by a web browser application.

Clause Set 5:

Clause 1. A computer processing system including:
  a processing unit; and
  a non-transient computer-readable storage medium storing instructions, which when executed by the processing unit, cause the processing unit to perform a method according to: any one of clauses 1 to 9 of clause set 1; any one of clauses 1 to 10 of clause set 2; any one of clauses 1 to 21 of clause set 3; any one of clauses 1 to 17 of clause set 4.

Clause Set 6:

Clause 1. A non-transient storage medium storing instructions executable by processing unit to cause the processing unit to perform a method according to: any one of clauses 1 to 9 of clause set 1; any one of clauses 1 to 10 of clause set 2; any one of clauses 1 to 21 of clause set 3; any one of clauses 1 to 17 of clause set 4.

In the above embodiments, operations are described as being performed by specific applications or modules (e.g. application 202, module 204, module 206, module 208). Variations are possible, and generally speaking an operation that is described as being performed by one particular application or module could be performed by an alternative application or module.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

In the above description, certain operations and features are explicitly described as being optional. This should not be interpreted as indicating that if an operation or feature is not explicitly described as being optional it should be considered essential. Even if an operation or feature is not explicitly described as being optional it may still be optional.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text, drawings, or clauses. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for generating webpage data corresponding to a design, wherein the webpage data is generated based on a webpage grid definition and the method comprises:
  accessing a set of design element objects, each design element object corresponding to a design element of the design and including data allowing a horizontal start position, a horizontal end position, a vertical start position, and a vertical end position of that design element to be determined;
  processing the set of design element objects to generate a set of element-grid records, the set of element-grid records including an element-grid record corresponding to each design element, the element-grid record corresponding to a given design element including:
    element data identifying the given design element;
    a unique column start gridline for the given design element;
    a unique column end gridline for the given design element;
    a column start offset for the given design element; and
    a column end offset for the given design element;
  processing the set of element-grid records to generate an ordered set of column offsets, the ordered set of column offsets including the column start offset of each element-grid record and the column end offset of each element-grid record, the ordered set of column offsets being ordered based on each column offset's corresponding column gridline;
  generating an ordered set of column width values based on the ordered set of column offsets; and
  processing the set of element-grid records to generate the webpage grid definition, the webpage grid definition defining a grid including a plurality of columns and a plurality of rows, the plurality of columns defined by the ordered set of column width values, and
  wherein:
    a first design element and a second design element have a same horizontal start position; and
    the webpage grid definition defines:
      a first column gridline as the unique column start gridline of the first design element;
      a second column gridline as the unique column start gridline of the second design element; and
      a first column between the first column gridline and the second column gridline, the first column having a column width of zero.

2. The computer implemented method of claim 1, wherein the webpage data is generated based on a set of webpage element definitions, and the method further comprises processing the set of element-grid records to generate the set of webpage element definitions, the set of webpage element definitions including a webpage element definition for each design element, the webpage element definition for a given design element positioning the given design element within the grid defined by the webpage grid definition.

3. The computer implemented method of claim 2, wherein the webpage element definition for the given design element positions the given design element within the grid based on the given design element's unique column start gridline and unique column end gridline.

4. The computer implemented method of claim 1, wherein each column width value in the ordered set of column width values defines a fractional portion of a maximum width value.

5. The computer implemented method of claim 1, wherein processing the set of design element objects to generate the set of element-grid records includes:

processing each design element object to generate an ordered set of horizontal position records, each horizontal position record associated with a design element and defining a horizontal position value; and processing each horizontal position record in the ordered set of horizontal position records in order by, for a particular horizontal position record associated with a particular design element:

calculating a column offset value based on the particular horizontal position record's position value and a cumulative offset value;

determining a column gridline value based on the position of the particular horizontal position record in the ordered set of horizontal position records;

determining if the column offset value and the column gridline value are associated with the horizontal start of the particular design element; and in response to determining that the column offset value and the column gridline value are associated with the horizontal start of the particular design element:

recording the column offset value as the column start offset of the element-grid record corresponding to the particular design element; and recording the column gridline value as the unique column start gridline of the element-grid record corresponding to the particular design element.

6. The computer implemented method of claim 5, wherein in response to determining that the column offset value and the column gridline value are not associated with the horizontal start of the particular design element:

recording the column offset value as the column end offset of the element-grid record corresponding to the particular design element; and recording the column gridline value as the unique column end gridline of the element-grid record corresponding to the particular design element.

7. The computer implemented method of claim 5, wherein generating the ordered set of horizontal position records includes:

generating a horizontal start position record for each design element, the horizontal start position record for design element identifying that design element and defining that design element's horizontal start position; and generating a horizontal end position record for each design element, the horizontal end position record for a design element identifying that design element and defining that design element's horizontal end position.

8. The computer implemented method of claim 1, wherein:

a third design element and a fourth design element have a same horizontal end position; and the grid definition defines:

a third column gridline as the unique column end gridline of the third design element;

a fourth column gridline as the unique column end gridline of the fifth design element; and a second column between the third column gridline and the fourth column gridline, the second column having a column width of zero.

9. The computer implemented method of claim 1, wherein:

the element-grid record corresponding to the given design element further includes:

a unique row start gridline for the given design element;

a unique row end gridline for the given design element;

a row start offset for the given design element; and a row end offset for the given design element;

a fifth design element and a sixth design element have a same vertical start position; and the grid definition defines:

a first row gridline as the unique row start gridline of the fifth design element;

a second row gridline as the unique row start gridline of the sixth design element; and a first row between the first row gridline and the second row gridline, the first row having a row height of zero.

10. The computer implemented method of claim 9, wherein:

a seventh design element and an eighth design element have a same vertical end position; and the grid definition defines:

a third row gridline as the unique row end gridline of the seventh design element;

a fourth row gridline as the unique row end gridline of the eighth design element; and a second row between the third row gridline and the fourth row gridline, the second row having a row height of zero.

11. The computer implemented method of claim 1, further comprising causing a webpage to be rendered in accordance with the webpage data by a web browser application.

12. A computer processing system comprising:

a processing unit; and a non-transient computer-readable storage medium storing instructions, which when executed by the processing unit, cause the processing unit to perform a method for generating webpage data corresponding to a design, wherein the webpage data is generated based on a webpage grid definition and the method comprises:

accessing a set of design element objects, each design element object corresponding to a design element of the design and including data allowing a horizontal start position, a horizontal end position, a vertical start position, and a vertical end position of that design element to be determined;

processing the set of design element objects to generate a set of element-grid records, the set of element-grid records including an element-grid record corresponding to each design element, the element-grid record corresponding to a given design element including:

element data identifying the given design element;

a unique column start gridline for the given design element;

a unique column end gridline for the given design element;

a column start offset for the given design element; and a column end offset for the given design element;

processing the set of element-grid records to generate an ordered set of column offsets, the ordered set of column offsets including the column start offset of each element-grid record and the column end offset of each element-grid record, the ordered set of column offsets being ordered based on each column offset's corresponding column gridline;

generating an ordered set of column width values based on the ordered set of column offsets; and processing the set of element-grid records to generate the webpage grid definition, the webpage grid definition defining a grid including a plurality of columns and a plurality of rows, the plurality of columns defined by the ordered set of column width values, and wherein:
- a first design element and a second design element have a same horizontal start position; and
- the webpage grid definition defines:
  - a first column gridline as the unique column start gridline of the first design element;
  - a second column gridline as the unique column start gridline of the second design element; and
  - a first column between the first column gridline and the second column gridline, the first column having a column width of zero.

13. The computer processing system of claim 12, wherein the webpage data is generated based on a set of webpage element definitions, and the method further comprises processing the set of element-grid records to generate the set of webpage element definitions, the set of webpage element definitions including a webpage element definition for each design element, the webpage element definition for a given design element positioning the given design element within the grid defined by the webpage grid definition.

14. The computer processing system of claim 13, wherein the webpage element definition for the given design element positions the given design element within the grid based on the given design element's unique column start gridline and unique column end gridline.

15. The computer processing system of claim 12, wherein processing the set of design element objects to generate the set of element-grid records includes:
   processing each design element object to generate an ordered set of horizontal position records, each horizontal position record associated with a design element and defining a horizontal position value; and
   processing each horizontal position record in the ordered set of horizontal position records in order by, for a particular horizontal position record associated with a particular design element:
      calculating a column offset value based on the particular horizontal position record's position value and a cumulative offset value;
      determining a column gridline value based on the position of the particular horizontal position record in the ordered set of horizontal position records;
      determining if the column offset value and the column gridline value are associated with the horizontal start of the particular design element; and
      in response to determining that the column offset value and the column gridline value are associated with the horizontal start of the particular design element:
         recording the column offset value as the column start offset of the element-grid record corresponding to the particular design element; and
         recording the column gridline value as the unique column start gridline of the element-grid record corresponding to the particular design element.

16. The computer processing system of claim 15, wherein in response to determining that the column offset value and the column gridline value are not associated with the horizontal start of the particular design element:
   recording the column offset value as the column end offset of the element-grid record corresponding to the particular design element; and
   recording the column gridline value as the unique column end gridline of the element-grid record corresponding to the particular design element.

17. The computer processing system of claim 15, wherein generating the ordered set of horizontal position records includes:
   generating a horizontal start position record for each design element, the horizontal start position record for design element identifying that design element and defining that design element's horizontal start position; and
   generating a horizontal end position record for each design element, the horizontal end position record for a design element identifying that design element and defining that design element's horizontal end position.

18. A computer implemented method for generating webpage data corresponding to a design, wherein the webpage data is generated based on a webpage grid definition and the method comprises:
   accessing a set of design element objects, each design element object corresponding to a design element of the design and including data allowing a horizontal start position, a horizontal end position, a vertical start position, and a vertical end position of that design element to be determined;
   processing the set of design element objects to generate a set of element-grid records, the set of element-grid records including an element-grid record corresponding to each design element, the element-grid record corresponding to a given design element including:
      element data identifying the given design element;
      a unique column start gridline for the given design element;
      a unique column end gridline for the given design element;
      a column start offset for the given design element; and
      a column end offset for the given design element; and
   processing the set of element-grid records to generate the webpage grid definition, the webpage grid definition defining a grid including a plurality of columns and a plurality of rows,
wherein processing the set of design element objects to generate the set of element-grid records includes:
   processing each design element object to generate an ordered set of horizontal position records, each horizontal position record associated with a design element and defining a horizontal position value; and
   processing each horizontal position record in the ordered set of horizontal position records in order by, for a particular horizontal position record associated with a particular design element:
      calculating a column offset value based on the particular horizontal position record's position value and a cumulative offset value;
      determining a column gridline value based on the position of the particular horizontal position record in the ordered set of horizontal position records;
      determining if the column offset value and the column gridline value are associated with the horizontal start of the particular design element; and in response to determining that the column offset value and the column gridline value are associated with the horizontal start of the particular design element:
recording the column offset value as the column start offset of the element-grid record corresponding to the particular design element; and
recording the column gridline value as the unique column start gridline of the element-grid record corresponding to the particular design element, and wherein:
a first design element and a second design element have a same horizontal start position; and
the webpage grid definition defines:
a first column gridline as the unique column start gridline of the first design element;
a second column gridline as the unique column start gridline of the second design element; and
a first column between the first column gridline and the second column gridline, the first column having a column width of zero.

19. A computer processing system comprising:
a processing unit; and
a non-transient computer-readable storage medium storing instructions, which when executed by the processing unit, cause the processing unit to perform a method for generating webpage data corresponding to a design, wherein the webpage data is generated based on a webpage grid definition and the method comprises:
accessing a set of design element objects, each design element object corresponding to a design element of the design and including data allowing a horizontal start position, a horizontal end position, a vertical start position, and a vertical end position of that design element to be determined;
processing the set of design element objects to generate a set of element-grid records, the set of element-grid records including an element-grid record corresponding to each design element, the element-grid record corresponding to a given design element including:
element data identifying the given design element;
a unique column start gridline for the given design element;
a unique column end gridline for the given design element;
a column start offset for the given design element; and
a column end offset for the given design element; and
processing the set of element-grid records to generate the webpage grid definition, the webpage grid definition defining a grid including a plurality of columns and a plurality of rows,
wherein processing the set of design element objects to generate the set of element-grid records includes:
processing each design element object to generate an ordered set of horizontal position records, each horizontal position record associated with a design element and defining a horizontal position value; and
processing each horizontal position record in the ordered set of horizontal position records in order by, for a particular horizontal position record associated with a particular design element:
calculating a column offset value based on the particular horizontal position record's position value and a cumulative offset value;
determining a column gridline value based on the position of the particular horizontal position record in the ordered set of horizontal position records;
determining if the column offset value and the column gridline value are associated with the horizontal start of the particular design element; and
in response to determining that the column offset value and the column gridline value are associated with the horizontal start of the particular design element:
recording the column offset value as the column start offset of the element-grid record corresponding to the particular design element; and
recording the column gridline value as the unique column start gridline of the element-grid record corresponding to the particular design element, and wherein:
a first design element and a second design element have a same horizontal start position; and
the webpage grid definition defines:
a first column gridline as the unique column start gridline of the first design element;
a second column gridline as the unique column start gridline of the second design element; and
a first column between the first column gridline and the second column gridline, the first column having a column width of zero.

* * * * *